(12) United States Patent
Brodsky et al.

(10) Patent No.: US 12,545,669 B2
(45) Date of Patent: Feb. 10, 2026

(54) CYCLOALKYL AND HETEROCYCLOALKYL BENZISOXAZOLE SULFONAMIDE DERIVATIVES

(71) Applicants: Pfizer Inc., New York, NY (US); CTXT PTY LTD, Melbourne (AU)

(72) Inventors: Oleg Brodsky, San Diego, CA (US); Samantha Elizabeth Greasley, San Diego, CA (US); Robert Louis Hoffman, San Diego, CA (US); Pei-Pei Kung, San Diego, CA (US); Paul Francis Richardson, San Diego, CA (US); Paul Anthony Stupple, Parkville (AU)

(73) Assignees: Pfizer Inc., New York, NY (US); CTXT PTY LTD, Melbourne (AU)

( * ) Notice: Subject to any disclaimer, the term of this patent is extended or adjusted under 35 U.S.C. 154(b) by 1090 days.

(21) Appl. No.: 17/620,188

(22) PCT Filed: Jun. 17, 2020

(86) PCT No.: PCT/IB2020/055667
§ 371 (c)(1),
(2) Date: Dec. 17, 2021

(87) PCT Pub. No.: WO2020/254989
PCT Pub. Date: Dec. 24, 2020

(65) Prior Publication Data
US 2022/0251075 A1    Aug. 11, 2022

Related U.S. Application Data

(60) Provisional application No. 62/953,473, filed on Dec. 24, 2019, provisional application No. 62/863,802, filed on Jun. 19, 2019.

(51) Int. Cl.
| | |
|---|---|
| C07D 413/14 | (2006.01) |
| A61P 35/00 | (2006.01) |
| C07D 413/06 | (2006.01) |
| C07D 471/08 | (2006.01) |

(52) U.S. Cl.
CPC .......... C07D 413/14 (2013.01); A61P 35/00 (2018.01); C07D 413/06 (2013.01); C07D 471/08 (2013.01)

(58) Field of Classification Search
None
See application file for complete search history.

(56) References Cited

U.S. PATENT DOCUMENTS

2020/0399258 A1 * 12/2020 Bozikis ............... C07D 413/06

FOREIGN PATENT DOCUMENTS

| WO | 2018102419 A1 | 6/2018 |
|---|---|---|
| WO | 2019243491 A1 | 12/2019 |

OTHER PUBLICATIONS

Zugazagoitia et. al. ((2016), Current Challenges in Cancer Treatment, Clinical Therapeutics, 38, 1551-1566 (Year: 2016).*
International Search Report and Written Opinion for PCT/IB2020/055667 dated Sep. 7, 2020, 11 pages.
Stein et al., "Discovery and Structure-Activity Relationships of Sulfonamide ETA-Selective Antagonists," J. Med. Chem. 38, 1344-54, 1995.

* cited by examiner

*Primary Examiner* — Juliet C Switzer
*Assistant Examiner* — Dawanna Shar-Day White
(74) *Attorney, Agent, or Firm* — Banner & Witcoff, Ltd.

(57) ABSTRACT

The present invention relates to compounds of formula (I) or pharmaceutically acceptable salts thereof, wherein Ring A, Y, $R^1$-$R^8$, m, n and p are defined herein. The novel cycloalkyl and heterocycloalkyl benzisoxazole sulfonamide derivatives are useful in the treatment of abnormal cell growth, such as cancer, in patients. Additional embodiments relate to pharmaceutical compositions containing the compounds and to methods of using the compounds and compositions in the treatment of abnormal cell growth in patients.

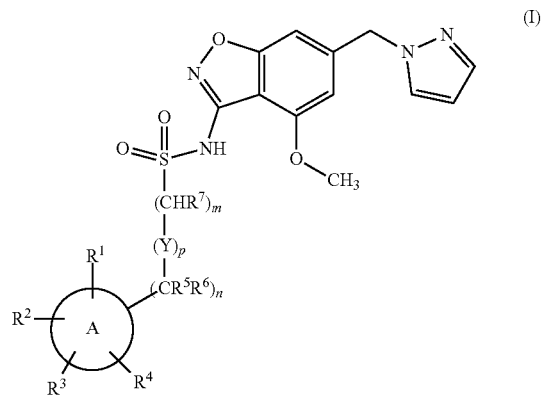

19 Claims, No Drawings
Specification includes a Sequence Listing.

US 12,545,669 B2

CYCLOALKYL AND HETEROCYCLOALKYL BENZISOXAZOLE SULFONAMIDE DERIVATIVES

This application incorporates by reference the contents of a 16.0 KB (16,384 bytes) text file created on Dec. 15, 2021 and named "00912100045_SequenceListing.txt," which is the sequence listing for this application.

This application claims the benefit of U.S. Provisional Application No. 62/863,802 filed Jun. 19, 2019, and U.S. Provisional Application No. 62/953,473 filed Dec. 24, 2019, the contents of which are hereby incorporated by reference in their entireties.

FIELD OF THE INVENTION

The present invention relates to novel cycloalkyl and heterocycloalkyl benzisoxazole sulfonamide derivatives, which act as Lysine Acetyl Transferase (KAT) inhibitors of the MYST family. and are useful in the treatment of abnormal cell growth, such as cancer, in patients. The present invention also relates to pharmaceutical compositions containing the compounds and to methods of using the compounds and compositions in the treatment of abnormal cell growth in patients.

BACKGROUND OF THE INVENTION

The MYST family is the largest family of KATs and is named after the founding members in yeast and mammals: MOZ, Ybf2/Sas3, Sas2 and TIP60 (Dekker 2014). MYST proteins mediate many biological functions including gene regulation, DNA repair, cell-cycle regulation and development (Avvakumov 2007; Voss 2009). The KAT proteins of the MYST family play key roles in post-translational modification of histones and thus have a profound effect on chromatin structure in the eukaryotic nucleus (Avvakumov 2007). The family currently comprises five mammalian KATs: TIP60 (KAT5; HTATIP; MIM 601409), MOZ (KAT6A; MIM 601408; MYST3), MORF (KAT6b; QKF; MYST4), HBO (KAT7; HBO1; MYST2) and MOF (KAT8; MYST1) (Voss 2009). These five members of the MYST family are present in humans and malfunction of MYST proteins is known to be associated with cancer (Avvakumov 2007). The most frequently used names for members of the MYST family are:

| Common name | MYST name | Systematic name |
|---|---|---|
| MOF | MYST1 | KAT8 |
| HBO | MYST2 | KAT7 |
| MOZ | MYST3 | KAT6A |
| MORF | MYST4 | KAT6B |
| TIP60 |  | KAT5 |

MYST Functional Domains

MYST proteins function in multisubunit protein complexes including adaptors such as ING proteins that mediate DNA binding (Avvakumov 2007). For instance, TIP60 is affiliated to the NuA4 multiprotein complex (which embraces more than 16 members) (Zhang 2017). However, there have also been some reports of a helix-turn-helix DNA-binding motif within the structure of the MOZ protein itself (Holbert 2007), which suggests the capacity to bind directly to DNA.

The acetyltransferase activity of MYST proteins is effected by the MYST domain (the catalytic domain). The MYST domain contains an acetyl-coenzyme A binding motif, which is structurally conserved with other HATs, and an unusual $C_2HC$-type zinc finger (Voss 2009). The highly conserved MYST domain, including the acetyl-CoA binding motif and zinc finger, is considered to be the defining feature of this family of enzymes (Avvakumov 2007).

Role of MYST Proteins

Acetylation of histone residues is generally associated with transcriptional activation. However, in some instances, transcriptional repression has also been attributed to MYST proteins (Voss 2009). The individual members of the MYST family are known to participate in a broad range of important biochemical interactions:

HBO1 positively regulates initiation of DNA replication (Avvakumov 2007; Aggarwal 2004; Doyon 2006; Iizuka 2006) via acetylation of histone substrates, which presumably leads to a more accessible chromatin conformation (Avvakumov 2007, Iizuka 2006). HBO1 is also known to play a role in the pathogenesis of breast cancer by promoting an enrichment of cancer stem-like cells (Duong 2013) and by destabilising the estrogen receptor α (ERα) through ubiquinitiation, which proceeds via the histone-acetylating activity of HBO1 (Iizuka 2013). HBO1 has also been implicated in Acute myeloid leukaemia (AML) (Shi 2015).

TIP60 (KAT5) is the most studied member of the MYST family. TIP60 plays an important role not only in the regulation of transcription but also in the process of DNA damage repair, particularly in DNA double-strand breaks (DSB) (Gil 2017). TIP60 can acetylate p53, ATM and c-Myc. TIP60 and MOF specifically acetylate lysine 120 (K120) of p53 upon DNA damage (Avvakumov 2007). TIP60 has also been implicated in being important for regulatory T-cell (Treg) biology. FOXP3 is the master regulator in the development and function of Tregs and it has been shown that acetylation of FOXP3 by TIP60 is essential for FOXP3 activity (Li 2007, Xiao 2014). Underscoring this, conditional TIP60 deletion in mice leads to a scurfy-like fatal autoimmune disease, mimicking a phenotype seen in FOXP3 knock out mice (Xiao 2014). In cancer, Treg cells can facilitate tumour progression by suppressing adaptive immunity against the tumour.

MOF ("males absent on the first") was originally identified as one of the components of the dosage compensation in *Drosophila*, and was classified as a member of the MYST family based on functional studies and sequence analysis (Su 2016). The human ortholog exhibits significant similarity to *drosophila* MOF; containing an acetyl-CoA-binding site, a chromodomain (which binds histones) and a $C_2HC$-type zinc finger (Su 2016). MOF is a key enzyme for acetylating histone H4K16, and MOF-containing complexes are implicated in various essential cell functions with links to cancer (Su 2016). Besides the global reduction of histone acetylation, depletion of MOF in mammalian cells can result in abnormal gene transcription, particularly causing abnormal expression of certain tumor suppressor genes or oncogenes, suggesting a critical role of MOF in tumorigenesis (Su 2016). For example, KAT activity of MOF has been shown to be required to sustain MLL-AF9 leukemia and may be important for multiple AML subtypes (Valerio 2017).

KAT6B (Querkopf) was first identified in a mutation screen for genes regulating the balance between proliferation and differentiation during embryonic development (Thomas 2000). Mice homozygous for the KAT6B mutant allele have severe defects in cerebral cortex development resulting from a severe reduction in both proliferation and differentiation of specifically the cortical progenitor population during embryonic development. KAT6B is required for the maintenance of the adult neural stem cell population and is part of a system regulating differentiation of stem cells into neurons (Merson 2006). KAT6B is also mutated in rare forms of leukaemia (Vizmanos 2003).

The MOZ locus ranks as the 12th most commonly amplified region across all cancer types (Zack 2013). MOZ is within the 8p11-p12 amplicon, which is seen at frequencies around 10-15% in various cancers, especially breast and ovarian (Turner-Ivey 2014). MOZ was first identified as a fusion partner of the CREB-binding protein (CBP) during examination of a specific chromosomal translocation in acute myeloid leukaemia (AML) (Avvakumov 2007; Borrow 1996). MOZ KAT activity is necessary for promoting the expression of MEIS1 and HOXa9, proteins that are typically seen overexpressed in some lymphomas and leukaemias. Increased survival of MOZ$^{+/-}$ heterozygote mice in the Eμ-Myc transgenic model of B-cell lymphoma is seen, where loss of a single MOZ allele leads to a biologically relevant reduction in Meis1 and Hoxa9 levels in pre-B-cells (Sheikh 2015).

Inhibitors of some MYSTs are known. For example, the following Anacardic acid derivative is reported (Ghizzoni 2012) as inhibiting TIP60 ($IC_{50}$=74 μM) and MOF ($IC_{50}$=47 μM):

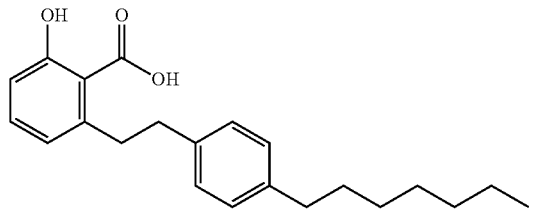 [SMILES: CCCCCCCc1ccc(CCc2cccc(O)c2C(=O)O)cc1]

Other known inhibitors include (Zhang 2017):

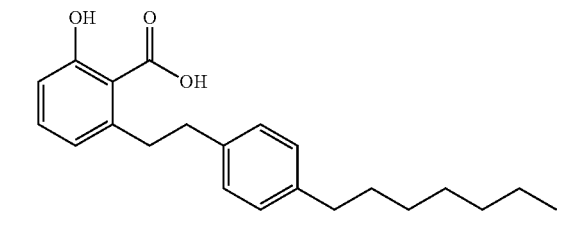

MG149

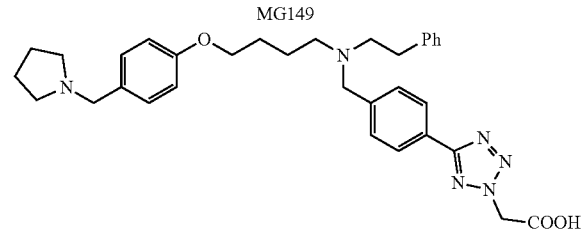

TH1834

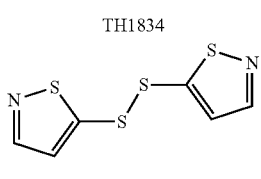

NU9056

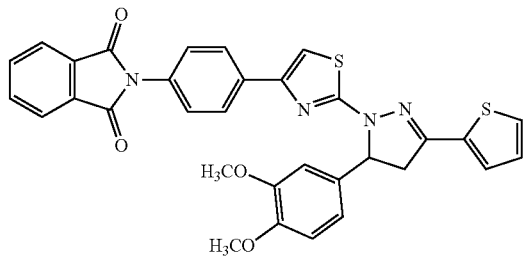

compound a

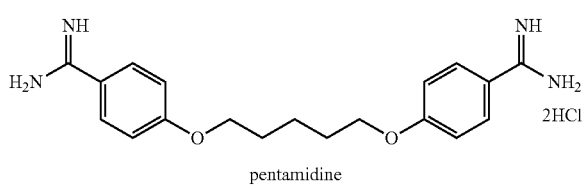

pentamidine

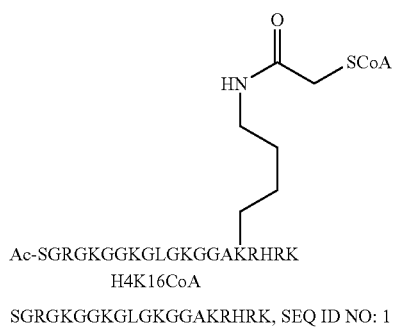

Ac-SGRGKGGKGLGKGGAKRHRK
H4K16CoA

SGRGKGGKGLGKGGAKRHRK, SEQ ID NO: 1

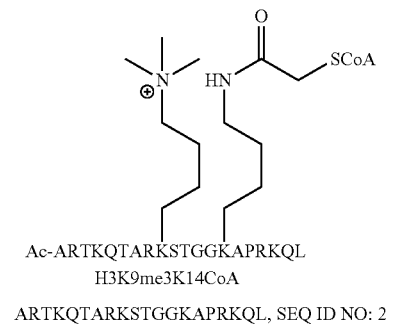

Ac-ARTKQTARKSTGGKAPRKQL
H3K9me3K14CoA

ARTKQTARKSTGGKAPRKQL, SEQ ID NO: 2

In light of the established role of KATs in general, and MYSTs in particular, in diseases such as cancer, a need exists for new inhibitors of these proteins.

SUMMARY OF THE INVENTION

Each of the embodiments of the present invention described below may be combined with one or more other embodiments of the present invention described herein which is not inconsistent with the embodiment(s) with which it is combined. In addition, each of the embodiments below describing the invention envisions within its scope the pharmaceutically acceptable salts of the compounds of the invention. Accordingly, the phrase "or a pharmaceutically acceptable salt thereof" is implicit in the description of all compounds described herein.

This invention relates to a compound of formula (I)

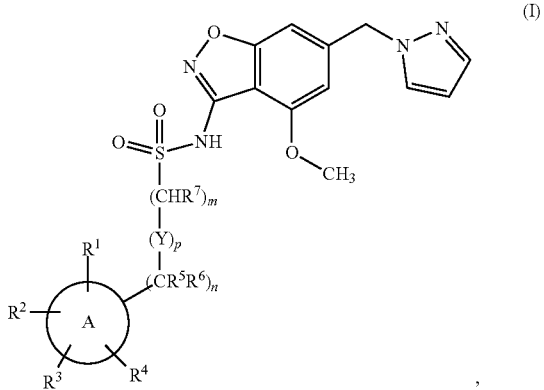

or a pharmaceutically acceptable salt thereof,
wherein
Ring A is absent, $C_3$-$C_9$ cycloalkyl or 4-9 membered heterocycloalkyl,
provided that when Ring A is absent, p is 0;
Y is O or $NR^8$,
provided that when Y is $NR^8$, both of m and n are 0;
$R^1$ is hydrogen, fluoro, cyano, $C_1$-$C_3$ alkyl, —$CH_2CN$, —$CH_2F$, —$CHF_2$, —$CF_3$, oxo, $C_1$-$C_3$ alkoxy, —$CH_2OCH_3$, —$C(O)CH_3$, —$C(O)OCH_2$-phenyl, —$S(O)_2CH_3$, or phenyl, wherein the phenyl is optionally substituted by fluoro;
$R^2$, $R^3$, and $R^4$ are each independently selected from the group consisting of hydrogen, fluoro, and methyl;
$R^5$ is hydrogen, methyl, or methoxy;
each $R^6$, $R^7$ and $R^8$ are hydrogen or methyl;
m is 0, 1, 2 or 3; and
n is 0 or 1; and
p is 0 or 1.

One embodiment of the present invention relates to a compound of formula (I), or a pharmaceutically acceptable salt thereof, wherein Ring A is 5-9 membered cycloalkyl.

One embodiment of the present invention relates to a compound of formula (I), or a pharmaceutically acceptable salt thereof, wherein Ring A is 3-6 membered cycloalkyl.

One embodiment of the present invention relates to a compound of formula (I), or a pharmaceutically acceptable salt thereof, wherein Ring A is 5-6 membered heterocycloalkyl.

One embodiment of the present invention relates to a compound of formula (I), or a pharmaceutically acceptable salt thereof, wherein Ring A is cyclopropyl, cyclobutyl, cyclopentyl, cyclohexyl, cycloheptanyl, cyclooctanyl, azetidinyl, tetrahydrofuranyl, tetrahydropyranyl, piperidinyl, morpholinyl, bicyclo[2.2.2]octanyl, bicyclo[3.1.0]hexanyl, bicyclo[2.2.1]heptanyl, spiro[2.2]pentanyl, spiro[3.3]heptanyl, 1-azabicyclo[2.2.1]heptanyl, 1-oxaspiro[4.4]nonanyl, 6-oxaspiro[3.4]octanyl, 3-oxabicyclo[3.1.0]hexanyl, 5-oxaspiro[3.5]nonanyl, or 5-oxaspiro[3.4]octane.

One embodiment of the present invention relates to a compound of formula (I), or a pharmaceutically acceptable salt thereof, wherein Ring A is cyclopropyl, cyclobutyl, cyclopentyl, cyclohexyl, cycloheptanyl, or cyclooctanyl.

One embodiment of the present invention relates to a compound of formula (I), or a pharmaceutically acceptable salt thereof, wherein Ring A is cyclopropyl, cyclobutyl, cyclopentyl, or cyclohexyl.

One embodiment of the present invention relates to a compound of formula (I), or a pharmaceutically acceptable salt thereof, wherein Ring A is bicyclo[2.2.2]octanyl, bicyclo[3.1.0]hexanyl, bicyclo[2.2.1]heptanyl, spiro[2.2]pentanyl, or spiro[3.3]heptanyl.

One embodiment of the present invention relates to a compound of formula (I), or a pharmaceutically acceptable salt thereof, wherein Ring A is azetidinyl, tetrahydrofuranyl, tetrahydropyranyl, piperidinyl, or morpholinyl.

One embodiment of the present invention relates to a compound of formula (I), or a pharmaceutically acceptable salt thereof, wherein Ring A is 1-azabicyclo[2.2.1]heptanyl, 1-oxaspiro[4.4]nonanyl, 6-oxaspiro[3.4]octanyl, 3-oxabicyclo[3.1.0]hexanyl, 5-oxaspiro[3.5]nonanyl, or 5-oxaspiro[3.4]octanyl.

One embodiment of the present invention relates to a compound of formula (I), or a pharmaceutically acceptable salt thereof, wherein Ring A is absent and p is 0.

One embodiment of the present invention relates to a compound of formula (I), or a pharmaceutically acceptable salt thereof, wherein Y is O.

One embodiment of the present invention relates to a compound of formula (I), or a pharmaceutically acceptable salt thereof, wherein Y is $NR^8$, m is 0 and n is 0.

One embodiment of the present invention relates to a compound of formula (I), or a pharmaceutically acceptable salt thereof, wherein $R^1$ is hydrogen, fluoro, methyl, ethyl, methoxy, or ethoxy.

One embodiment of the present invention relates to a compound of formula (I), or a pharmaceutically acceptable salt thereof, wherein $R^1$ is hydrogen, fluoro, or methyl.

One embodiment of the present invention relates to a compound of formula (I), or a pharmaceutically acceptable salt thereof, wherein $R^1$ is hydrogen.

One embodiment of the present invention relates to a compound of formula (I), or a pharmaceutically acceptable salt thereof, wherein $R^1$ is fluoro.

One embodiment of the present invention relates to a compound of formula (I), or a pharmaceutically acceptable salt thereof, wherein $R^1$ is methyl.

One embodiment of the present invention relates to a compound of formula (I), or a pharmaceutically acceptable salt thereof wherein $R^2$ is hydrogen, fluoro, or methyl.

One embodiment of the present invention relates to a compound of formula (I), or a pharmaceutically acceptable salt thereof, wherein $R^2$ is hydrogen.

One embodiment of the present invention relates to a compound of formula (I), or a pharmaceutically acceptable salt thereof, wherein $R^2$ is fluoro.

One embodiment of the present invention relates to a compound of formula (I), or a pharmaceutically acceptable salt thereof, wherein $R^2$ is methyl.

One embodiment of the present invention relates to a compound of formula (I), or a pharmaceutically acceptable salt thereof, wherein $R^3$ is hydrogen, fluoro, or methyl.

One embodiment of the present invention relates to a compound of formula (I), or a pharmaceutically acceptable salt thereof, wherein $R^3$ is hydrogen.

One embodiment of the present invention relates to a compound of formula (I), or a pharmaceutically acceptable salt thereof, wherein $R^3$ is fluoro.

One embodiment of the present invention relates to a compound of formula (I), or a pharmaceutically acceptable salt thereof wherein $R^3$ is methyl.

One embodiment of the present invention relates to a compound of formula (I), or a pharmaceutically acceptable salt thereof, wherein $R^4$ is hydrogen, fluoro, or methyl.

One embodiment of the present invention relates to a compound of formula (I), or a pharmaceutically acceptable salt thereof, wherein $R^4$ is hydrogen.

One embodiment of the present invention relates to a compound of formula (I), or a pharmaceutically acceptable salt thereof wherein $R^4$ is fluoro.

One embodiment of the present invention relates to a compound of formula (I), or a pharmaceutically acceptable salt thereof, wherein $R^4$ is methyl.

One embodiment of the present invention relates to a compound of formula (I), or a pharmaceutically acceptable salt thereof, wherein $R^1$ is fluoro, $R^2$ is fluoro, $R^3$ is hydrogen, and $R^4$ is hydrogen.

One embodiment of the present invention relates to a compound of formula (I), or a pharmaceutically acceptable salt thereof, wherein $R^1$ is fluoro, $R^2$ is hydrogen, $R^3$ is hydrogen, and $R^4$ is hydrogen.

One embodiment of the present invention relates to a compound of formula (I), or a pharmaceutically acceptable salt thereof, wherein $R^1$ is methyl, $R^2$ is methyl, $R^3$ is hydrogen, and $R^4$ is hydrogen.

One embodiment of the present invention relates to a compound of formula (I), or a pharmaceutically acceptable salt thereof wherein $R^1$ is methyl, $R^2$ is hydrogen, $R^3$ is hydrogen, and $R^4$ is hydrogen.

One embodiment of the present invention relates to a compound of formula (I), or a pharmaceutically acceptable salt thereof, wherein $R^1$ is hydrogen, $R^2$ is hydrogen, $R^3$ is hydrogen, and $R^4$ is hydrogen.

One embodiment of the present invention relates to a compound of formula (I), or a pharmaceutically acceptable salt thereof wherein $R^5$ is methoxy and $R^6$ is hydrogen.

One embodiment of the present invention relates to a compound of formula (I), or a pharmaceutically acceptable salt thereof, wherein $R^5$ is methyl and $R^6$ is methyl.

One embodiment of the present invention relates to a compound of formula (I), or a pharmaceutically acceptable salt thereof, wherein $R^5$ is methyl and $R^6$ is hydrogen.

One embodiment of the present invention relates to a compound of formula (I), or a pharmaceutically acceptable salt thereof, wherein $R^5$ is hydrogen and $R^6$ is hydrogen.

One embodiment of the present invention relates to a compound of formula (I), or a pharmaceutically acceptable salt thereof, wherein m is 0.

One embodiment of the present invention relates to a compound of formula (I), or a pharmaceutically acceptable salt thereof, wherein m is 1.

One embodiment of the present invention relates to a compound of formula (I), or a pharmaceutically acceptable salt thereof, wherein m is 2.

One embodiment of the present invention relates to a compound of formula (I), or a pharmaceutically acceptable salt thereof, wherein n is 0.

One embodiment of the present invention relates to a compound of formula (I), or a pharmaceutically acceptable salt thereof, wherein n is 1.

One embodiment of the present invention relates to a compound of formula (I), or a pharmaceutically acceptable salt thereof, wherein p is 0.

One embodiment of the present invention relates to a compound of formula (I), or a pharmaceutically acceptable salt thereof, wherein p is 1.

One embodiment of the present invention relates to a compound of formula (I), or a pharmaceutically acceptable salt thereof, wherein m is 0, n is 0, and p is 0.

One embodiment of the present invention relates to a compound of formula (I), or a pharmaceutically acceptable salt thereof, wherein m is 1, n is 0, and p is 0.

One embodiment of the present invention relates to a compound of formula (I), or a pharmaceutically acceptable salt thereof, wherein m is 1, n is 1, and p is 0.

One embodiment of the present invention relates to a compound of formula (I), or a pharmaceutically acceptable salt thereof, wherein m is 2, n is 0, and p is 0.

One embodiment of the present invention relates to a compound of formula (I), or a pharmaceutically acceptable salt thereof, wherein m is 2, n is 1, and p is 0.

One embodiment of the present invention relates to a compound of formula (I), or a pharmaceutically acceptable salt thereof, wherein m is 0, n is 0, and p is 0.

One embodiment of the present invention relates to a compound of formula (I), or a pharmaceutically acceptable salt thereof, wherein m is 2, n is 1, and p is 1.

This invention relates to a compound of formula (II)

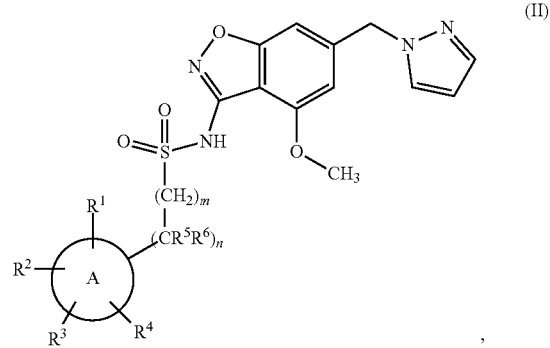

or a pharmaceutically acceptable salt thereof,
wherein
Ring A is $C_3$-$C_9$ cycloalkyl or 4-9 membered heterocycloalkyl;
$R^1$ is hydrogen, fluoro, cyano, $C_1$-$C_3$ alkyl, —$CH_2CN$, —$CH_2F$, —$CHF_2$, —$CF_3$, oxo, $C_1$-$C_3$ alkoxy, —$CH_2OCH_3$, —$C(O)CH_3$, —$C(O)OCH_2$-phenyl, —$S(O)_2CH_3$, or phenyl, wherein the phenyl is optionally substituted by fluoro;
$R^2$, $R^3$, and $R^4$ are each independently selected from the group consisting of hydrogen, fluoro, and methyl;
$R^5$ is hydrogen, methyl, or methoxy;
$R^6$ is hydrogen or methyl;
m is 0, 1 or 2; and
n is 0 or 1.

One embodiment of the present invention relates to a compound of formula (II), or a pharmaceutically acceptable salt thereof, wherein Ring A is 5-9 membered cycloalkyl.

One embodiment of the present invention relates to a compound of formula (II), or a pharmaceutically acceptable salt thereof, wherein Ring A is 3-6 membered cycloalkyl.

One embodiment of the present invention relates to a compound of formula (II), or a pharmaceutically acceptable salt thereof, wherein Ring A is 5-6 membered heterocycloalkyl.

One embodiment of the present invention relates to a compound of formula (II), or a pharmaceutically acceptable salt thereof, wherein Ring A is cyclopropyl, cyclobutyl, cyclopentyl, cyclohexyl, cycloheptanyl, cyclooctanyl, azetidinyl, tetrahydrofuranyl, tetrahydropyranyl, piperidinyl, morpholinyl, bicyclo[2.2.2]octanyl, bicyclo[3.1.0]hexanyl, bicyclo[2.2.1]heptanyl, spiro[2.2]pentanyl, spiro[3.3]heptanyl, 1-azabicyclo[2.2.1]heptanyl, 1-oxaspiro[4.4]nonanyl, 6-oxaspiro[3.4]octanyl, 3-oxabicyclo[3.1.0]hexanyl, 5-oxaspiro[3.5]nonanyl, or 5-oxaspiro[3.4]octane.

One embodiment of the present invention relates to a compound of formula (II), or a pharmaceutically acceptable salt thereof, wherein Ring A is cyclopropyl, cyclobutyl, cyclopentyl, cyclohexyl, cycloheptanyl, or cyclooctanyl.

One embodiment of the present invention relates to a compound of formula (II), or a pharmaceutically acceptable salt thereof, wherein Ring A is cyclopropyl, cyclobutyl, cyclopentyl, or cyclohexyl.

One embodiment of the present invention relates to a compound of formula (II), or a pharmaceutically acceptable salt thereof, wherein Ring A is bicyclo[2.2.2]octanyl, bicyclo[3.1.0]hexanyl, bicyclo[2.2.1]heptanyl, spiro[2.2]pentanyl, or spiro[3.3]heptanyl.

One embodiment of the present invention relates to a compound of formula (II), or a pharmaceutically acceptable salt thereof, wherein Ring A is azetidinyl, tetrahydrofuranyl, tetrahydropyranyl, piperidinyl, or morpholinyl.

One embodiment of the present invention relates to a compound of formula (II), or a pharmaceutically acceptable salt thereof, wherein Ring A is 1-azabicyclo[2.2.1]heptanyl, 1-oxaspiro[4.4]nonanyl, 6-oxaspiro[3.4]octanyl, 3-oxabicyclo[3.1.0]hexanyl, 5-oxaspiro[3.5]nonanyl, or 5-oxaspiro[3.4]octanyl.

One embodiment of the present invention relates to a compound of formula (II), or a pharmaceutically acceptable salt thereof, wherein $R^1$ is hydrogen, fluoro, methyl, ethyl, methoxy, or ethoxy.

One embodiment of the present invention relates to a compound of formula (II), or a pharmaceutically acceptable salt thereof, wherein $R^1$ is hydrogen, fluoro, or methyl.

One embodiment of the present invention relates to a compound of formula (II), or a pharmaceutically acceptable salt thereof, wherein $R^1$ is hydrogen.

One embodiment of the present invention relates to a compound of formula (II), or a pharmaceutically acceptable salt thereof, wherein $R^1$ is fluoro.

One embodiment of the present invention relates to a compound of formula (II), or a pharmaceutically acceptable salt thereof, wherein $R^1$ is methyl.

One embodiment of the present invention relates to a compound of formula (II), or a pharmaceutically acceptable salt thereof wherein $R^2$ is hydrogen, fluoro, or methyl.

One embodiment of the present invention relates to a compound of formula (II), or a pharmaceutically acceptable salt thereof, wherein $R^2$ is hydrogen.

One embodiment of the present invention relates to a compound of formula (II), or a pharmaceutically acceptable salt thereof, wherein $R^2$ is fluoro.

One embodiment of the present invention relates to a compound of formula (II), or a pharmaceutically acceptable salt thereof, wherein $R^2$ is methyl.

One embodiment of the present invention relates to a compound of formula (II), or a pharmaceutically acceptable salt thereof, wherein $R^3$ is hydrogen, fluoro, or methyl.

One embodiment of the present invention relates to a compound of formula (II), or a pharmaceutically acceptable salt thereof, wherein $R^3$ is hydrogen.

One embodiment of the present invention relates to a compound of formula (II), or a pharmaceutically acceptable salt thereof, wherein $R^3$ is fluoro.

One embodiment of the present invention relates to a compound of formula (II), or a pharmaceutically acceptable salt thereof wherein $R^3$ is methyl.

One embodiment of the present invention relates to a compound of formula (II), or a pharmaceutically acceptable salt thereof, wherein $R^4$ is hydrogen, fluoro, or methyl.

One embodiment of the present invention relates to a compound of formula (II), or a pharmaceutically acceptable salt thereof 22, wherein $R^4$ is hydrogen.

One embodiment of the present invention relates to a compound of formula (II), or a pharmaceutically acceptable salt thereof wherein $R^4$ is fluoro.

One embodiment of the present invention relates to a compound of formula (II), or a pharmaceutically acceptable salt thereof, wherein $R^4$ is methyl.

One embodiment of the present invention relates to a compound of formula (II), or a pharmaceutically acceptable salt thereof, wherein $R^1$ is fluoro, $R^2$ is fluoro, $R^3$ is hydrogen, and $R^4$ is hydrogen.

One embodiment of the present invention relates to a compound of formula (II), or a pharmaceutically acceptable salt thereof, wherein $R^1$ is fluoro, $R^2$ is hydrogen, $R^3$ is hydrogen, and $R^4$ is hydrogen.

One embodiment of the present invention relates to a compound of formula (II), or a pharmaceutically acceptable salt thereof, wherein $R^1$ is methyl, $R^2$ is methyl, $R^3$ is hydrogen, and $R^4$ is hydrogen.

One embodiment of the present invention relates to a compound of formula (II), or a pharmaceutically acceptable salt thereof wherein $R^1$ is methyl, $R^2$ is hydrogen, $R^3$ is hydrogen, and $R^4$ is hydrogen.

One embodiment of the present invention relates to a compound of formula (II), or a pharmaceutically acceptable salt thereof, wherein $R^1$ is hydrogen, $R^2$ is hydrogen, $R^3$ is hydrogen, and $R^4$ is hydrogen.

One embodiment of the present invention relates to a compound of formula (II), or a pharmaceutically acceptable salt thereof wherein $R^5$ is methoxy and $R^6$ is hydrogen.

One embodiment of the present invention relates to a compound of formula (II), or a pharmaceutically acceptable salt thereof, wherein $R^5$ is methyl and $R^6$ is methyl.

One embodiment of the present invention relates to a compound of formula (II), or a pharmaceutically acceptable salt thereof, wherein $R^5$ is methyl and $R^6$ is hydrogen.

One embodiment of the present invention relates to a compound of formula (II), or a pharmaceutically acceptable salt thereof, wherein $R^5$ is hydrogen and $R^6$ is hydrogen.

One embodiment of the present invention relates to a compound of formula (II), or a pharmaceutically acceptable salt thereof, wherein m is 0.

One embodiment of the present invention relates to a compound of formula (II), or a pharmaceutically acceptable salt thereof, wherein m is 1.

One embodiment of the present invention relates to a compound of formula (II), or a pharmaceutically acceptable salt thereof, wherein m is 2.

One embodiment of the present invention relates to a compound of formula (II), or a pharmaceutically acceptable salt thereof, wherein n is 0.

One embodiment of the present invention relates to a compound of formula (II), or a pharmaceutically acceptable salt thereof, wherein n is 1.

One embodiment of the present invention relates to a compound of formula (II), or a pharmaceutically acceptable salt thereof, wherein m is 0 and n is 0.

One embodiment of the present invention relates to a compound of formula (II), or a pharmaceutically acceptable salt thereof, wherein m is 1 and n is 0.

One embodiment of the present invention relates to a compound of formula (II), or a pharmaceutically acceptable salt thereof, wherein m is 1 and n is 1.

One embodiment of the present invention relates to a compound of formula (II), or a pharmaceutically acceptable salt thereof, wherein m is 2 and n is 0.

One embodiment of the present invention relates to a compound of formula (II), or a pharmaceutically acceptable salt thereof, wherein m is 2 and n is 1.

It is to be understood that any of the above-mentioned embodiment(s) for Formula (I) or (II) can be combined together with any other embodiment(s) for formula (I) or (II) above respectively to the extent they are not incompatible.

This invention relates to a pharmaceutical composition comprising a compound of any of the embodiments of the compounds of formula (II), or a pharmaceutically acceptable salt thereof, and a pharmaceutically acceptable carrier or diluent.

This invention relates to a pharmaceutical composition comprising a compound of any of the embodiments of the compounds of formula (I) and formula (II), or a pharmaceutically acceptable salt thereof, and a pharmaceutically acceptable carrier or diluent, for treating cancer.

This invention relates to a method of treating cancer in a patient comprising administering to the patient an amount of a compound of any of the embodiments of the compounds of formula (I) and formula (II), or a pharmaceutically acceptable salt thereof, that is effective in treating cancer.

This invention relates to a compound of any of the embodiments of the compounds of formula (I) and formula (II), or a pharmaceutically acceptable salt thereof, for use in the treatment of cancer in a patient.

This invention relates to a use of a compound of any of the embodiments of the compounds of formula (I) and formula (II), or a pharmaceutically acceptable salt thereof, in the manufacture of a medicament for the treatment of cancer.

This invention relates to a combination of a compound of any of the embodiments of the compounds of formula (I) and formula (II), or a pharmaceutically acceptable salt thereof, with an anti-tumor agent or with radiation therapy, for the treatment of cancer.

This invention relates to a combination of a compound of any of the embodiments of the compounds of formula (I) and formula (II), or a pharmaceutically acceptable salt thereof, with an anti-tumor agent, for the treatment of cancer.

In one embodiment of the present invention the cancer is breast cancer.

In one embodiment of the present invention the cancer is breast cancer, which breast cancer is ER positive breast cancer.

DETAILED DESCRIPTION OF THE INVENTION

For convenience, many chemical moieties and compounds are represented using well known abbreviations, including but not limited to, Ac (acetyl), AcOH (acetic acid), CN (cyano), DCM (dichloromethane or methylene chloride), DMF (N,N-dimethylformamide), DMSO (dimethylsulfoxide), dppp (1,3-bis(diphenylphosphino)propane), Et (ethyl), ethyl acetate (EtOAc), EtOH (ethanol), (Me (methyl), MeOH (methanol), MeCN (acetonitrile), Ms (methanesulfonyl), MsCl (methanesulfonyl chloride), N/D (not determined); NaOMe (sodium methoxide), NaOtPn (sodium tert-pentoxide), Pd(OAc)$_2$ (palladium(II) acetate), Pd(PPh$_3$)$_4$ (tetrakis(triphenylphosphine)palladium(0)), Pet. Ether (petroleum ether), Ph (phenyl), TEA (triethylamine), THF (tetrahydrofuran).

In addition, TLC refers to thin layer chromatography, HPLC refers to high-performance liquid chromatography, LCMS refers to liquid chromatography-mass spectrometry, and SFC (supercritical fluid chromatography).

Other abbreviations: rt or Rt (retention time), min (minute or minutes), h (hour or hours), RT (room temperature), aq. (aqueous), satd. (saturated), eq or eq. (equivalent(s)).

As used herein, the terms fluorine, fluoro and F are understood to be equivalent herein. Similarly, the terms chloride, chloro and Cl are understood to be equivalent herein.

The term "alkyl", as used herein, refers to saturated monovalent hydrocarbon radicals containing, in certain embodiments, from one to six, or from one to three carbon atoms, having straight or branched moieties. The term "$C_1$-$C_6$ alkyl" refers to an alkyl radical containing from one to six carbon atoms, having straight or branched moieties. The term "$C_1$-$C_6$ alkyl" includes within its definition the terms "$C_1$-$C_3$ alkyl" and "$C_1$-$C_4$ alkyl". Examples of alkyl groups include, but are not limited to, methyl, ethyl, propyl, isopropyl, butyl, isobutyl, sec-butyl, tert-butyl, pentyl, 2-pentyl, 3-pentyl, isopentyl, neopentyl, (R)-2-methylbutyl, (S)-2-methylbutyl, 3-methylbutyl, 2,3-dimethylpropyl, 2,3-dimethylbutyl, hexyl, and the like.

The term "alkoxy", as used herein, refers to an alkyl radical that is single bonded to an oxygen atom. The attachment point of an alkoxy radical to a molecule is through the oxygen atom. An alkoxy radical may be depicted as alkyl-O—. The terms "$C_1$-$C_4$ alkoxy" and "$C_1$-$C_3$ alkoxy", refer to an alkoxy radical containing from one to four carbon atoms and from one to three carbon atoms, respectively, having straight or branched moieties. Alkoxy groups, include, but are not limited to, methoxy, ethoxy, propoxy, isopropoxy, butoxy, and the like.

The term "cycloalkyl", as used herein, refers to a non-aromatic, monocyclic, fused or bridged bicyclic or tricyclic carbocyclic ring group containing, in certain embodiments, from three to nine carbon atoms. The term "cycloalkyl" also includes spiro cycloalkyl groups, including multi-ring systems joined by a single atom. The terms "$C_3$-$C_9$ cycloalkyl", "$C_3$-$C_6$ cycloalkyl", "$C_3$-$C_5$ cycloalkyl", "$C_3$-$C_4$ cycloalkyl", and "$C_5$-$C_7$ cycloalkyl" contain from from three to nine, from three to six, from three to five, from three to four, and from five to seven carbon atoms, respectively. Cycloalkyl groups include, but are not limited to, cyclopropyl, cyclobutyl, cyclopentyl, cyclohexyl, cycloheptyl, bicyclo[2.2.1]heptanyl, bicyclo[3.1.0]hexanyl, bicyclo[3.2.1]octanyl, bicyclo[5.2.0]nonanyl, spiro[2.2]pentanyl, spiro[3.3]heptanyl, and the like.

The term "heterocycloalkyl", as used herein, refers to a non-aromatic, monocyclic ring, fused or bridged bicyclic ring, or spirocyclic ring group containing, in certain embodiments, a total of four to nine ring atoms, in which one to three ring atoms are heteroatoms independently selected from nitrogen and oxygen, with the proviso that such ring systems may not contain two adjacent nitrogen or oxygen atoms. Furthermore, such groups may be bonded to the remainder of the compounds of embodiments disclosed herein through either a carbon atom or a heteroatom. The terms "4-9 membered heterocycloalkyl", "5-9 membered heterocycloalkyl", "5-6 membered heterocycloalkyl", and "4-6 membered heterocycloalkyl" contain from four to nine, from five to nine, five to six and from four to six atoms, respectively. Examples of heterocycloalkyl groups include, but are not limited to:

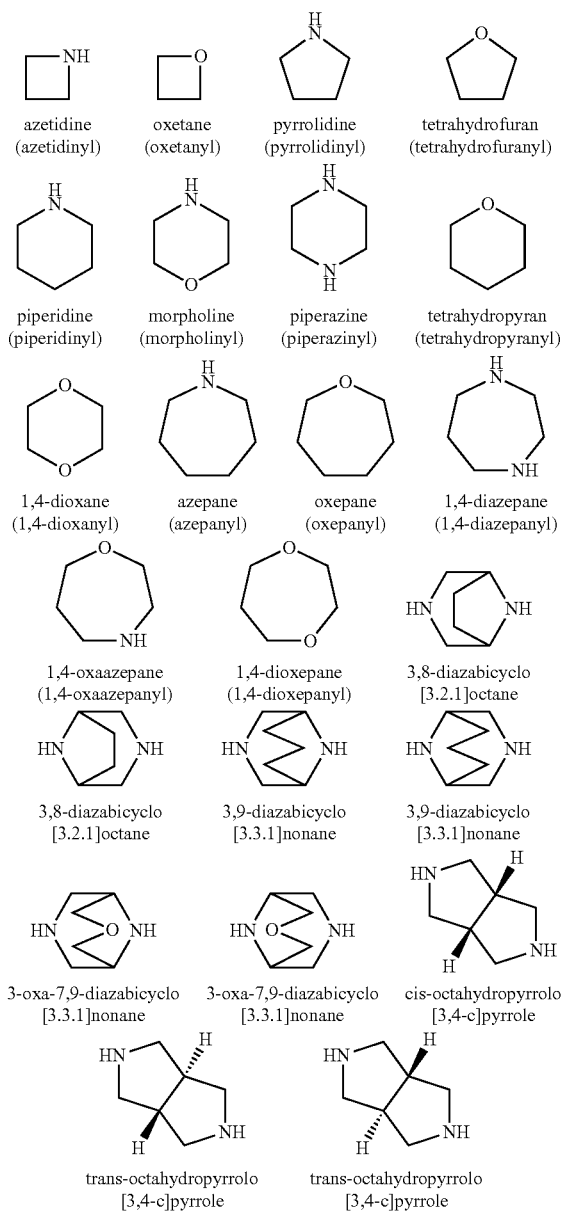

The term "treating", as used herein, unless otherwise indicated, means reversing, alleviating, inhibiting the progress of, or preventing the disease, disorder or condition to which such term applies, or one or more symptoms of such disease, disorder or condition. The term "treatment", as used herein, unless otherwise indicated, refers to the act of treating as "treating" is defined immediately above.

The term "combination", as used herein, unless otherwise indicated, means a fixed-dose combination or a combination of agents that is administered intermittently, concurrently or sequentially, according to the same or different route of administration. As used herein, an "effective" amount refers to an amount of a substance, agent, compound, or composition that is of sufficient quantity to result in a decrease in severity of disease symptoms, an increase in frequency and duration of disease symptom-free periods, or a prevention of impairment or disability due to the disease affliction—either as a single dose or according to a multiple dose regimen, alone or in combination with other agents or substances. One of ordinary skill in the art would be able to determine such amounts based on such factors as the patient's size, the severity of the patient's symptoms, and the particular combination, composition or route of administration selected. The patient or subject may be a human or non-human mammal in need of treatment. In one embodiment, the patient is human.

Unless indicated otherwise, all references herein to the inventive compounds include references to salts, solvates, hydrates and complexes thereof, and to solvates, hydrates and complexes of salts thereof, including polymorphs, stereoisomers, and isotopically labelled versions thereof.

Embodiments disclosed herein include isotopically-labeled compounds, which are identical to those recited in formula (I) and formula (II) but for the fact that one or more atoms are replaced by an atom having an atomic mass or mass number different from the atomic mass or mass number usually found in nature. Examples of isotopes that can be incorporated into compounds of the embodiments disclosed herein include isotopes of hydrogen, carbon, nitrogen, oxygen, phosphorous, sulfur, fluorine and chlorine, such as, but not limited to, $^2$H, $^3$H, $^{13}$C, $^{14}$C, $^{15}$N, $^{18}$O, $^{17}$O, $^{31}$P, $^{32}$P, $^{35}$S, $^{18}$F, and $^{36}$Cl, respectively. In one embodiment, the isotope incorporated into compounds of formula (I) and formula (II) is $^2$H. Compounds described herein and pharmaceutically acceptable salts of said compounds which contain the aforementioned isotopes and/or other isotopes of other atoms are within the scope of the present embodiments. Certain isotopically-labeled compounds of the embodiments disclosed herein, for example, those into which radioactive isotopes such as $^3$H and $^{14}$C are incorporated, are useful in drug and/or substrate tissue distribution assays. Tritiated, i.e., $^3$H, and carbon-14, i.e., $^{14}$C, isotopes are particularly preferred for their ease of preparation and detectability. Further, substitution with heavier isotopes such as deuterium, i.e., $^2$H, can afford certain therapeutic advantages resulting from greater metabolic stability, for example, increased in vivo half-life or reduced dosage requirements and, hence, may be preferred in some circumstances. Isotopically-labeled compounds of embodiments disclosed herein can generally be prepared by carrying out the procedures disclosed in the Schemes and/or in the Examples below, by substituting a readily available isotopically-labeled reagent for a non-isotopically-labeled reagent. In one embodiment, the compounds of formula (I) and formula (II) are deuterium-labeled.

Some embodiments relate to the pharmaceutically acceptable salts of the compounds described herein. The compounds described herein that are basic in nature are capable of forming a wide variety of salts with various inorganic and organic acids. The acids that may be used to prepare pharmaceutically acceptable acid addition salts of such basic compounds described herein are those that form non-toxic acid addition salts, e.g., salts containing pharmacologically acceptable anions, such as the hydrochloride, hydrobromide, hydroiodide, nitrate, sulfate, bisulfate, phosphate, acid phosphate, isonicotinate, acetate, lactate, salicylate, citrate, acid citrate, tartrate, pantothenate, bitartrate, ascorbate, succinate, maleate, gentisinate, fumarate, gluconate, glucuronate, saccharate, formate, benzoate, glutamate, methanesulfonate, ethanesulfonate, benzenesulfonate, p-toluenesulfonate and pamoate [i.e., 1,1'-methylene-bis-(2-hydroxy-3-naphthoate)] salts. The compounds described herein that include a basic moiety, such as an amino group, may form pharmaceutically acceptable salts with various amino acids, in addition to the acids mentioned above.

Hemisalts of acids and bases may also be formed, for example, hemisulphate and hemicalcium salts.

For a review on suitable salts, see Handbook of Pharmaceutical Salts: Properties, Selection, and Use by Stahl and Wermuth (Wiley-VCH, 2002). Methods for making pharmaceutically acceptable salts of compounds described herein are known to one of skill in the art.

The term "solvate" is used herein to describe a molecular complex comprising a compound described herein and one or more pharmaceutically acceptable solvent molecules, for example, ethanol.

The compounds described herein may also exist in unsolvated and solvated forms. Accordingly, some embodiments relate to the hydrates and solvates of the compounds described herein. When the solvent or water is tightly bound, the complex will have a well-defined stoichiometry independent of humidity. When, however, the solvent or water is weakly bound, as in channel solvates and hygroscopic compounds, the water/solvent content will be dependent on humidity and drying conditions. In such cases, non-stoichiometry will be the norm. The term 'solvate' is used herein to describe a molecular complex comprising the compound of the invention and one or more pharmaceutically acceptable solvent molecules, for example, ethanol. The term 'hydrate' is employed when the solvent is water. Pharmaceutically acceptable solvates in accordance with the invention include hydrates and solvates wherein the solvent of crystallization may be isotopically substituted, e.g. $D_2O$, $d_6$-acetone, $d_6$-DMSO.

Also included within the scope of the invention are complexes such as clathrates, drug-host inclusion complexes wherein, in contrast to the aforementioned solvates, the drug and host are present in stoichiometric or non-stoichiometric amounts. Also included are complexes of the drug containing two or more organic and/or inorganic components which may be in stoichiometric or non-stoichiometric amounts. The resulting complexes may be ionized, partially ionized, or non-ionized. For a review of such complexes, see J Pharm Sci, 64 (8), 1269-1288 by Haleblian (August 1975), the disclosure of which is incorporated herein by reference in its entirety.

The invention also relates to prodrugs of the compounds of the formulae provided herein. Thus, certain derivatives of compounds of the invention which may have little or no pharmacological activity themselves can, when administered to a patient, be converted into the inventive compounds, for example, by hydrolytic cleavage. Such derivatives are referred to as 'prodrugs. Further information on the use of prodrugs may be found in 'Pro-drugs as Novel Delivery Systems, Vol. 14, ACS Symposium Series (T Higuchi and W Stella) and 'Bioreversible Carriers in Drug Design', Pergamon Press, 1987 (ed. E B Roche, American Pharmaceutical Association), the disclosures of which are incorporated herein by reference in their entireties.

Prodrugs in accordance with the invention can, for example, be produced by replacing appropriate functionalities present in the inventive compounds with certain moieties known to those skilled in the art as 'pro-moieties' as described, for example, in "Design of Prodrugs" by H Bundgaard (Elsevier, 1985), the disclosure of which is incorporated herein by reference in its entirety.

Some non-limiting examples of prodrugs in accordance with the invention include:
(i) where the compound contains a carboxylic acid functionality (—COOH), an ester thereof, for example, replacement of the hydrogen with $(C_1-C_8)$alkyl;
(ii) where the compound contains an alcohol functionality (—OH), an ether thereof, for example, replacement of the hydrogen with $(C_1-C_6)$alkanoyloxymethyl, or with a phosphate ether group; and
(iii) where the compound contains a primary or secondary amino functionality (—$NH_2$ or —NHR where R≠H), an amide thereof, for example, replacement of one or both hydrogens with a suitably metabolically labile group, such as an amide, carbamate, urea, phosphonate, sulfonate, etc.

Further examples of replacement groups in accordance with the foregoing examples and examples of other prodrug types may be found in the aforementioned references. Finally, certain inventive compounds may themselves act as prodrugs of other of the inventive compounds.

Also included within the scope of the invention are metabolites of compounds of the formulae described herein, i.e., compounds formed in vivo upon administration of the drug.

Compounds described herein containing one or more asymmetric carbon atoms can exist as two or more stereoisomers. Where a compound described herein contains an alkenyl or alkenylene group, geometric cis/trans (or Z/E) isomers are possible. Where structural isomers are interconvertible via a low energy barrier, tautomeric isomerism ('tautomerism') can occur. This can take the form of proton tautomerism in compounds described herein containing, for example, an imino, keto, or oxime group, or so-called valence tautomerism in compounds which contain an aromatic moiety. A single compound may exhibit more than one type of isomerism.

The compounds of the embodiments described herein include all stereoisomers (e.g., cis and trans isomers) and all optical isomers of compounds described herein (e.g., R and S enantiomers), as well as racemic, diastereomeric and other mixtures of such isomers. While all stereoisomers are encompassed within the scope of our claims, one skilled in the art will recognize that particular stereoisomers may be preferred.

In some embodiments, the compounds described herein can exist in several tautomeric forms, including the enol and imine form, and the keto and enamine form and geometric isomers and mixtures thereof. All such tautomeric forms are included within the scope of the present embodiments. Tautomers exist as mixtures of a tautomeric set in solution. In solid form, usually one tautomer predominates. Even though one tautomer may be described, the present embodiments include all tautomers of the present compounds.

The present embodiments also include atropisomers of the compounds described herein. Atropisomers refer to compounds that can be separated into rotationally restricted isomers.

Included within the scope of the present embodiments are all stereoisomers, geometric isomers and tautomeric forms of the compounds described herein, including compounds exhibiting more than one type of isomerism, and mixtures of one or more thereof.

Cis/trans isomers may be separated by conventional techniques well known to those skilled in the art, for example, chromatography and fractional crystallisation.

Conventional techniques for the preparation/isolation of individual enantiomers include chiral synthesis from a suitable optically pure precursor or resolution of the racemate (or the racemate of a salt or derivative) using, for example, chiral high performance liquid chromatography (HPLC) or SFC.

Alternatively, the racemate (or a racemic precursor) may be reacted with a suitable optically active compound, for example, an alcohol, or, in the case where a compound described herein contains an acidic or basic moiety, a base or acid such as 1-phenylethylamine or tartaric acid. The resulting diastereomeric mixture may be separated by chromatography and/or fractional crystallization and one or both of the diastereoisomers converted to the corresponding pure enantiomer(s) by means well known to a skilled person.

"Abnormal cell growth" or "cancer" as used herein, unless otherwise indicated, refers to cell growth that is independent of normal regulatory mechanisms (e.g., loss of contact inhibition). This includes the abnormal growth of: (1) tumor cells (tumors) that proliferate by expressing a mutated tyrosine kinase or overexpression of a receptor tyrosine kinase; (2) benign and malignant cells of other proliferative diseases in which aberrant tyrosine kinase activation occurs; (3) any tumors that proliferate by receptor tyrosine kinases; (4) any tumors that proliferate by aberrant serine/threonine kinase activation; (5) benign and malignant cells of other proliferative diseases in which aberrant serine/threonine kinase activation occurs; (6) any tumors that proliferate by aberrant signaling, metabolic, epigenetic and transcriptional mechanism; and (7) benign and malignant cells of other proliferative diseases in which aberrant signaling, metabolic, epigenetic and transcriptional mechanism.

Further embodiments relate to methods of treating abnormal cell growth in a patient. Additional embodiments relate to a method of treating abnormal cell growth in a patient comprising administering to the patient an amount of a compound described herein that is effective in treating abnormal cell growth.

In other embodiments, the abnormal cell growth is cancer.

In some embodiments, the cancer is selected from the group consisting of lung cancer, mesothelioma, bone cancer, pancreatic cancer, skin cancer, cancer of the head or neck, cutaneous or intraocular melanoma, uterine cancer, ovarian cancer, rectal cancer, cancer of the anal region, stomach cancer, hepatic carcinoma, colon cancer, breast cancer, uterine cancer, carcinoma of the fallopian tubes, carcinoma of the endometrium, carcinoma of the cervix, carcinoma of the vagina, carcinoma of the vulva, Hodgkin's disease, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, prostate cancer, hematology malignancy, chronic or acute leukemia, lymphocytic lymphomas, cancer of the bladder, cancer of the kidney or ureter, renal cell carcinoma, carcinoma of the renal pelvis, neoplasms of the central nervous system (CNS), primary CNS lymphoma, spinal axis tumors, glioblastoma, brain stem glioma, pituitary adenoma, or a combination of two or more of the foregoing cancers.

Additional embodiments relate to methods of treating solid tumors in a patient. Some embodiments relate to the treatment of solid tumors in a patient comprising administering to the patient an amount of a compound described herein that is effective in treating the solid tumor.

In one embodiment, the solid tumor is breast, lung, colon, brain, prostate, stomach, pancreatic, ovarian, melanoma, endocrine, uterine, testicular, or bladder.

In one embodiment, the solid tumor is breast, lung, prostate, pancreatic, or ovarian.

In one embodiment, the breast cancer is ER positive breast cancer.

In one embodiment, the lung cancer is non-small cell lung cancer.

Additional embodiments relate to methods of treating hematologic tumors in a patient. Some embodiments relate to the treatment of hematologic tumors in a patient comprising administering to the patient an amount of a compound described herein that is effective in treating the hematologic tumor.

In one embodiment, the hematologic tumor is leukemia, lymphoma or multiple myeloma.

In one embodiment, the hematologic tumor is leukemia or lymphoma.

Additional embodiments relate to methods of treating cancer in a patient comprising administering to the patient an amount of a compound described herein that is effective in treating cancer.

In one embodiment, the cancer is breast, lung, colon, brain, prostate, stomach, pancreatic, ovarian, melanoma, endocrine, uterine, testicular, bladder, or hematologic.

In one embodiment, the cancer is breast, lung, prostate, pancreatic, ovarian, or hematologic.

In one embodiment, the cancer is breast, lung, prostate, pancreatic, or ovarian.

In one embodiment, the breast cancer is ER positive breast cancer.

In one embodiment, the lung cancer is non-small cell lung cancer.

In one embodiment, the cancer is hematologic.

In one embodiment, the hematologic tumor is leukemia or lymphoma.

Further embodiments relate to methods of treating cancer in a patient which comprises administering to the patient an amount of a compound described herein that is effective in treating cancer in combination with an anti-tumor agent selected from the group consisting of mitotic inhibitors, alkylating agents, anti-metabolites, intercalating antibiotics, growth factor inhibitors, radiation, cell cycle inhibitors, enzymes, topoisomerase inhibitors, biological response modifiers, antibodies, cytotoxics, anti-hormones, and anti-androgens.

More embodiments relate to pharmaceutical compositions for treating cancer in a patient comprising an amount of a compound described herein that is effective in treating cancer, and a pharmaceutically acceptable carrier.

Additional embodiments relate to a method of treating cancer in a patient, and in particular a human, comprising administering to the patient an amount of a compound described herein, or a pharmaceutically acceptable salt, solvate, hydrate or prodrug thereof, that is effective in treating cancer. In one embodiment of this method, the cancer, includes, but is not limited to, lung cancer, bone cancer, pancreatic cancer, skin cancer, cancer of the head or neck, cutaneous or intraocular melanoma, uterine cancer, ovarian cancer, rectal cancer, cancer of the anal region, stomach cancer, colon cancer, breast cancer, uterine cancer, carcinoma of the fallopian tubes, carcinoma of the endometrium, carcinoma of the cervix, carcinoma of the vagina, carcinoma of the vulva, Hodgkin's Disease, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, prostate cancer, chronic or acute leukemia, lymphocytic lymphomas, cancer of the bladder, cancer of the kidney or ureter, renal cell carcinoma, carcinoma of the renal pelvis, neoplasms of the central nervous system (CNS), primary CNS lymphoma, spinal axis tumors, brain stem glioma, pituitary adenoma, or a combination of one or more of the foregoing cancers. In one embodiment the method comprises comprising administering to a patient an amount of a compound described herein that is effective in treating said cancer solid tumor. In one preferred embodiment the solid tumor is breast, lung, colon, brain, prostate, stomach, pancreatic, ovarian, skin (melanoma), endocrine, uterine, testicular, and bladder cancer.

In another embodiment of said method, said cancer is a benign proliferative disease, including, but not limited to, psoriasis, benign prostatic hypertrophy or restinosis.

Some embodiments relate to a method of treating cancer in a patient which comprises administering to said patient an amount of a compound described herein, or a pharmaceutically acceptable salt, solvate, hydrate or prodrug thereof, that is effective in treating cancer in combination with an anti-tumor agent selected from the group consisting of mitotic inhibitors, alkylating agents, anti-metabolites, intercalating antibiotics, growth factor inhibitors, cell cycle inhibitors, enzymes, topoisomerase inhibitors, biological response modifiers, antibodies, cytotoxics, anti-hormones, and anti-androgens.

Additional embodiments relate to a pharmaceutical composition for treating cancer in a patient, and in particular a human, comprising an amount of a compound described herein, or a pharmaceutically acceptable salt, solvate, hydrate or prodrug thereof, that is effective in treating cancer, and a pharmaceutically acceptable carrier. In one embodiment of said composition, the cancer, includes, but not limited to, lung cancer, bone cancer, pancreatic cancer, skin cancer, cancer of the head or neck, cutaneous or intraocular melanoma, uterine cancer, ovarian cancer, rectal cancer, cancer of the anal region, stomach cancer, colon cancer, breast cancer, uterine cancer, carcinoma of the fallopian tubes, carcinoma of the endometrium, carcinoma of the cervix, carcinoma of the vagina, carcinoma of the vulva, Hodgkin's Disease, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, prostate cancer, chronic or acute leukemia, lymphocytic lymphomas, cancer of the bladder, cancer of the kidney or ureter, renal cell carcinoma, carcinoma of the renal pelvis, neoplasms of the central nervous system (CNS), primary CNS lymphoma, spinal axis tumors, brain stem glioma, pituitary adenoma, or a combination of one or more of the foregoing cancers. In another embodiment of said pharmaceutical composition, said abnormal cell growth is a benign proliferative disease, including, but not limited to, psoriasis, benign prostatic hypertrophy or restinosis.

Further embodiments relate to a method of treating cancer in a patient which comprises administering to said patient an amount of a compound described herein, or a pharmaceutically acceptable salt, solvate, or hydrate thereof, that is effective in treating cancer in combination with another anti-tumor agent selected from the group consisting of mitotic inhibitors, alkylating agents, anti-metabolites, intercalating antibiotics, growth factor inhibitors, cell cycle inhibitors, enzymes, topoisomerase inhibitors, biological response modifiers, antibodies, cytotoxics, anti-hormones, and anti-androgens. Some embodiments contemplate a pharmaceutical composition for treating abnormal cell growth wherein the composition includes a compound described herein, or a pharmaceutically acceptable salt, solvate, or hydrate thereof, that is effective in treating abnormal cell growth, and another anti-tumor agent selected from the group consisting of mitotic inhibitors, alkylating agents, anti-metabolites, intercalating antibiotics, growth factor inhibitors, cell cycle inhibitors, enzymes, topoisomerase inhibitors, biological response modifiers, antibodies, cytotoxics, anti-hormones, and anti-androgens.

Yet more embodiments relate to a method of treating a disorder associated with angiogenesis in a patient, including a human, comprising administering to said patient an amount of a compound described herein, as defined above, or a pharmaceutically acceptable salt, solvate, hydrate or prodrug thereof, that is effective in treating said disorder in combination with one or more anti-tumor agents listed above. Such disorders include cancerous tumors such as melanoma; ocular disorders such as age-related macular degeneration, presumed ocular histoplasmosis syndrome, and retinal neovascularization from proliferative diabetic retinopathy; rheumatoid arthritis; bone loss disorders such as osteoporosis, Paget's disease, humoral hypercalcemia of malignancy, hypercalcemia from tumors metastatic to bone, and osteoporosis induced by glucocorticoid treatment; coronary restenosis; and certain microbial infections including those associated with microbial pathogens selected from adenovirus, hantaviruses, *Borrelia burgdorferi, Yersinia* spp., *Bordetella pertussis*, and group A *Streptococcus*.

Some embodiments relate to a method of (and to a pharmaceutical composition for) treating cancer in a patient which comprise an amount of a compound described herein, or a pharmaceutically acceptable salt, solvate, or hydrate thereof, in combination with an amount of one or more substances selected from anti-angiogenesis agents, signal transduction inhibitors (e.g., inhibiting the means by which regulatory molecules that govern the fundamental processes of cell growth, differentiation, and survival communicated within the cell), and antiproliferative agents, which amounts are together effective in treating said abnormal cell growth.

Anti-angiogenesis agents, such as MMP-2 (matrix-metalloprotienase 2) inhibitors, MMP-9 (matrix-metalloprotienase 9) inhibitors, and COX-II (cyclooxygenase II) inhibitors, can be used in conjunction with a compound described herein in the methods and pharmaceutical compositions described herein.

Tyrosine kinase inhibitors can also be combined with a compound described herein.

VEGF inhibitors, for example, sutent and axitinib, can also be combined with a compound described herein.

ErbB2 receptor inhibitors may be administered in combination with a compound described herein. Various other compounds, such as styrene derivatives, have also been shown to possess tyrosine kinase inhibitory properties, and some of tyrosine kinase inhibitors have been identified as erbB2 receptor inhibitors.

Epidermal growth factor receptor (EGFR) inhibitors may be administered in combination with a compound of the presentation invention.

PI3K inhibitors, such as PI3K alpha or PI3K beta inhibitors, may be administered in combination with a compound of the presentation invention.

Mammalian target of rapamycin (mTOR) inhibitors may be administered in combination with a compound of the presentation invention.

c-Met inhibitors may be administered in combination with a compound of the presentation invention.

CDK inhibitors may be administered in combination with a compound of the presentation invention.

MEK inhibitors may be administered in combination with a compound of the presentation invention.

PARP inhibitors may be administered in combination with a compound of the presentation invention.

JAK inhibitors may be administered in combination with a compound of the presentation invention.

An antagonist of a Programmed Death 1 protein (PD-1) may be administered in combination with a compound of the presentation invention.

An antagonist of Programmed Death-Ligand 1 (PD-L1) may be administered in combination with a compound of the presentation invention.

Other antiproliferative agents that may be used with the compounds described herein include inhibitors of the enzyme farnesyl protein transferase and inhibitors of the receptor tyrosine kinase PDGFr.

A compound described herein may also be used with other agents useful in treating abnormal cell growth or cancer, including, but not limited to, agents capable of enhancing antitumor immune responses, such as CTLA4 (cytotoxic lymphocyte antigen 4) antibodies, and other agents capable of blocking CTLA4; and anti-proliferative agents such as other farnesyl protein transferase inhibitors, for example the farnesyl protein transferase.

A compound described herein may be applied as a sole therapy or may involve one or more other anti-tumor substances, for example those selected from, for example, mitotic inhibitors, alkylating agents, anti-metabolites, growth factor inhibitors, cell cycle inhibitors, intercalating antibiotics, enzymes, and anti-hormones.

The compounds described herein may be used alone or in combination with one or more of a variety of anti-cancer agents or supportive care agents. For example, the compounds described herein may be used with cytotoxic agents. Some embodiments also contemplate the use of the compounds described herein together with hormonal therapy. Further, some embodiments provide a compound described herein alone or in combination with one or more supportive care products, e.g., a product selected from the group consisting of Filgrastim (Neupogen), ondansetron (Zofran), Fragmin, Procrit, Aloxi, Emend, or combinations thereof. Such conjoint treatment may be achieved by way of the simultaneous, sequential or separate dosing of the individual components of the treatment.

The compounds described herein may be used with antitumor agents, alkylating agents, antimetabolites, antibiotics, plant-derived antitumor agents, camptothecin derivatives, tyrosine kinase inhibitors, antibodies, interferons, and/or biological response modifiers. In this regard, the following is a non-limiting list of examples of secondary agents that may be used with the compounds described herein.

Some embodiments also relate to a pharmaceutical composition comprising a compound of formula (I) and formula (II), or a pharmaceutically acceptable salt or solvate thereof, as hereinbefore defined in association with a pharmaceutically acceptable adjuvant, diluent or carrier.

Further embodiments relate to a pharmaceutical composition which comprises mixing a compound of formula (I) and formula (II), or a pharmaceutically acceptable salt or solvate thereof, as hereinbefore defined with a pharmaceutically acceptable adjuvant, diluent or carrier.

For the above-mentioned therapeutic uses the dosage administered will, of course, vary with the compound employed, the mode of administration, the treatment desired and the disorder indicated. The daily dosage of the compound formula (I) and formula (II), or pharmaceutically acceptable salt thereof, may be in the range from 1 mg to 1 gram, preferably 1 mg to 250 mg, more preferably 1 mg to 100 mg.

The present embodiments also encompass sustained release compositions.

Administration of the compounds described herein (hereinafter the "active compound(s)") can be affected by any method that enables delivery of the compounds to the site of action. These methods include oral routes, intraduodenal routes, parenteral injection (including intravenous, subcutaneous, intramuscular, intravascular or infusion), topical, and rectal administration.

The active compound may be applied as a sole therapy or may involve one or more other anti-tumor substances, for example those selected from, for example, mitotic inhibitors, for example vinblastine; alkylating agents, for example cis-platin, carboplatin and cyclophosphamide; anti-metabolites, for example 5-fluorouracil, cytosine arabinoside and hydroxyurea, or, for example, one of the preferred anti-metabolites disclosed in European Patent Application No. 239362 such as N-(5-[N-(3,4-dihydro-2-methyl-4-oxoquinazolin-6-ylmethyl)-N-methylamino]-2-thenoyl)-L-glutamic acid; growth factor inhibitors; cell cycle inhibitors; intercalating antibiotics, for example adriamycin and bleomycin; enzymes, for example interferon; and anti-hormones, for example anti-estrogens such as Nolvadex® (tamoxifen) or, for example anti-androgens such as Casodex® (4'-cyano-3-(4-fluorophenylsulphonyl)-2-hydroxy-2-methyl-3'-(trifluoromethyl)propionanilide). Such conjoint treatment may be achieved by way of the simultaneous, sequential or separate dosing of the individual components of the treatment.

The pharmaceutical composition may, for example, be in a form suitable for oral administration as a tablet, capsule, pill, powder, sustained release formulations, solution, suspension, for parenteral injection as a sterile solution, suspension or emulsion, for topical administration as an ointment or cream or for rectal administration as a suppository. The pharmaceutical composition may be in unit dosage forms suitable for single administration of precise dosages. The pharmaceutical composition will include a conventional pharmaceutical carrier or excipient and a compound described herein as an active ingredient. In addition, it may include other medicinal or pharmaceutical agents, carriers, adjuvants, etc.

Exemplary parenteral administration forms include solutions or suspensions of active compounds in sterile aqueous solutions, for example, aqueous propylene glycol or dextrose solutions. Such dosage forms can be suitably buffered, if desired.

Suitable pharmaceutical carriers include inert diluents or fillers, water and various organic solvents. The pharmaceutical compositions may, if desired, contain additional ingredients such as flavorings, binders, excipients and the like. Thus for oral administration, tablets containing various excipients, such as citric acid may be employed together with various disintegrants such as starch, alginic acid and certain complex silicates and with binding agents such as sucrose, gelatin and acacia. Additionally, lubricating agents such as magnesium stearate, sodium lauryl sulfate and talc are often useful for tableting purposes. Solid compositions of a similar type may also be employed in soft and hard filled gelatin capsules. Preferred materials, therefor, include lactose or milk sugar and high molecular weight polyethylene glycols. When aqueous suspensions or elixirs are desired for oral administration the active compound therein may be combined with various sweetening or flavoring agents, coloring matters or dyes and, if desired, emulsifying agents or suspending agents, together with diluents such as water, ethanol, propylene glycol, glycerin, or combinations thereof.

The examples and preparations provided below further illustrate and exemplify the compounds described herein and methods of preparing such compounds. The scope of the embodiments described herein is not limited in any way by the following examples and preparations. In the following examples, molecules with a single chiral center, unless otherwise noted, exist as a racemic mixture. Those molecules with two or more chiral centers, unless otherwise noted, exist as a racemic mixture of diastereomers. Single enantiomers/diastereomers may be obtained by methods known to those skilled in the art.

In the examples shown, salt forms were occasionally isolated as a consequence of the mobile phase additives during HPLC based chromatographic purification. In these cases, salts such as formate, trifluorooacetate and acetate were isolated and tested without further processing. It will be recognized that one of ordinary skill in the art will be able to realize the free base form by standard methodology (such as using ion exchange columns, or performing simple basic extractions using a mild aqueous base).

In general, the compounds described herein may be prepared by processes known in the chemical arts, particularly in light of the description contained herein. Certain processes for the manufacture of the compounds described herein are provided as further features of the embodiments and are illustrated in the reaction schemes provided below and in the experimental section.

EXAMPLES

The following examples are provided solely to illustrate the present invention and are not intended to limit the scope of the invention, as described herein.

General Experimental Details

Unless otherwise stated the following generalizations apply. $^1$H NMR spectra were recorded on a Bruker Ultrashield Plus (400 MHz) or a Bruker AVANCE III (400 MHz). The multiplicity of a signal is designated by the following abbreviations: s, singlet; d, doublet; t, triplet; q, quartet; p, pentet; dd, doublet of doublets; dt, doublet of triplets; tt, triplet of triplets; br, broad; m, multiplet. All observed coupling constants, J, are reported in Hertz (Hz). Exchangeble protons are not always observed.

LCMS data was generated using either an Agilent 6100 Series Single Quad, an Agilent 1260 Infinity Series UPLC/MS, an Agilent 1200 (LCMS-A), a Waters 2695 alliance, an Agilent 6120 Single Quad or mass-directed HPLC-MS. Chlorine isotopes are reported as $^{35}$Cl, Bromine isotopes are reported as either $^{79}$Br or $^{81}$Br or both $^{79}$Br/$^{81}$Br.

Representative LCMS methodology is provided below:
Instrument: Agilent 6100 Series Single Quad LC/MS
Agilent 1200 Series HPLC
Pump: 1200 Series G1311A Quaternary pump
Autosampler: 1200 Series G1329A Thermostatted Autosampler
Detector: 1200 Series G1314B Variable Wavelength Detector
LC conditions: Reverse Phase HPLC analysis, Column: Luna C8 (2) 5 μm 50×4.6 mm 100 Å, Column temperature: 30° C., Injection Volume: 5 μL, Solvent A: Water 0.1% Formic Acid, Solvent B: MeCN 0.1% Formic Acid, Gradient: 5-100% solvent B over 10 min, Detection: 254 nm or 214 nm MS conditions: Ion Source: Quadrupole, Ion Mode: Multimode-ES, Drying gas temp: 300° C., Vaporizer temperature: 200° C., Capillary voltage (V): 2000 (positive), Capillary voltage (V): 4000 (negative), Scan Range: 100-1000, Step size: 0.1 sec, Acquisition time: 10 min LCMS Method C (LCMS-C):
LC model: Agilent 1200
(Pump type: Binary Pump, Detector type: DAD)
MS model: Agilent G6110A Quadrupole
LC conditions: Column: Xbridge-C18, 2.5 μm, 2.1×30 mm, Column temperature: 30° C., Acquisition of wavelength: 214 nm, 254 nm, Mobile phase: A: 0.07% HCOOH aqueous solution, B: MeOH MS conditions: MS: Ion source: ES+ (or ES−) MS range: 50-900 m/z, Fragmentor: 60, Drying gas flow: 10 L/min, Nebulizer pressure: 35 psi Drying gas temperature: 350° C., Vcap: 3.5 kV Gradient Table:

| Flow (mL/min) | T (min) | A (%) | B (%) |
|---|---|---|---|
| 0.5 | 0.0 | 70 | 30 |
| 0.5 | 0.2 | 70 | 30 |
| 0.5 | 1.8 | 5 | 95 |
| 0.5 | 2.4 | 5 | 95 |
| 0.5 | 2.6 | 70 | 30 |
| 0.5 | 3.5 | 70 | 30 |

Sample Preparation:

The sample was dissolved in methanol, the concentration about 0.11-1 mg/mL, then filtered through syringe filter with 0.22 μm. (Injection volume: 1-10 μL)

General Methods:

Unless stated otherwise, the variables in Scheme I have the same meanings as defined herein.

Scheme I

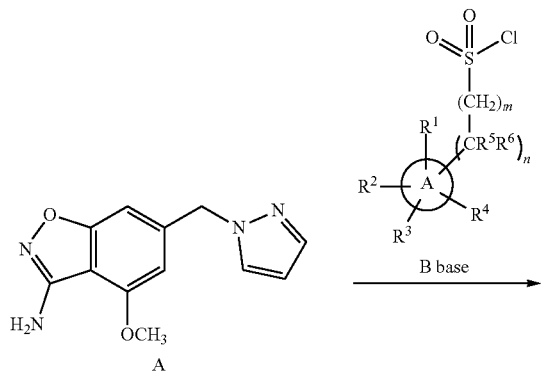

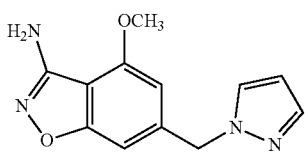 [SMILES: COc1cc(Cn2cccn2)cc2onc(N)c12]

formula (II)

As shown in Scheme I, a compound of Type A can be reacted with a compound of Type B in the presence of an effective base (such as TEA or NaO$^t$Pn) in a suitable solvent (such as DCM or toluene) to provide a compound of formula (II).

Synthesis of Intermediates

Preparation of 4-methoxy-6-[(1H-pyrazol-1-yl)methyl]-1,2-benzoxazol-3-amine (Int-01) According to Scheme 1

Step 1: Synthesis of 4-bromo-2-fluoro-6-methoxybenzonitrile (1b)

To a solution of 4-bromo-2,6-difluorobenzonitrile (1a) (40.0 g, 183.5 mmol) in THF (210.0 mL) and MeOH (30.0 mL) was added NaOMe (11.9 g, 220 mmol) portion-wise at 0° C. The mixture was stirred at room temperature for 16 h. TLC analysis (1:4 EtOAc/petroleum ether) showed consumption of the starting material. The mixture was transferred to a separatory funnel and washed with H$_2$O (150 mL). The aqueous layer was extracted with EtOAc (300 mL). The combined organic layers were dried over Na$_2$SO$_4$, filtered, and concentrated. The crude product was purified by flash chromatography (330 g SiO$_2$, 10% EtOAc/petroleum ether) to provide 4-bromo-2-fluoro-6-methoxybenzonitrile (1 b) (15.7 g, 52% yield) as a white solid. $^1$H NMR (400 MHz, DMSO-d$_6$) δ 7.49 (dd, J=1.5, 8.8 Hz, 1H), 7.41 (s, 1H), 3.98 (s, 3H).

Step 2: Synthesis of methyl 4-cyano-3-fluoro-5-methoxybenzoate (1c)

A solution of 4-bromo-2-fluoro-6-methoxybenzonitrile (1b) (15.7 g, 68.2 mmol), TEA (20.7 g, 205 mmol), dppp (2.8 g, 6.8 mmol), and Pd(OAc)$_2$ (766 mg, 3.4 mmol) in MeOH (150 mL) was stirred at 80° C. under an atmosphere of CO for 16 h. TLC analysis (1:4 EtOAc/petroleum ether) showed consumption of the starting material. The reaction was concentrated to dryness. The residue was purified by flash chromatography (120 g SiO$_2$, 1:4 EtOAc/petroleum ether) to provide methyl 4-cyano-3-fluoro-5-methoxybenzoate (1c) (10.0 g, 70% yield) as a yellow solid. $^1$H NMR (400 MHz, DMSO-d$_6$) δ 7.53-7.47 (m, 2H), 4.03 (s, 3H), 3.91 (s, 3H).

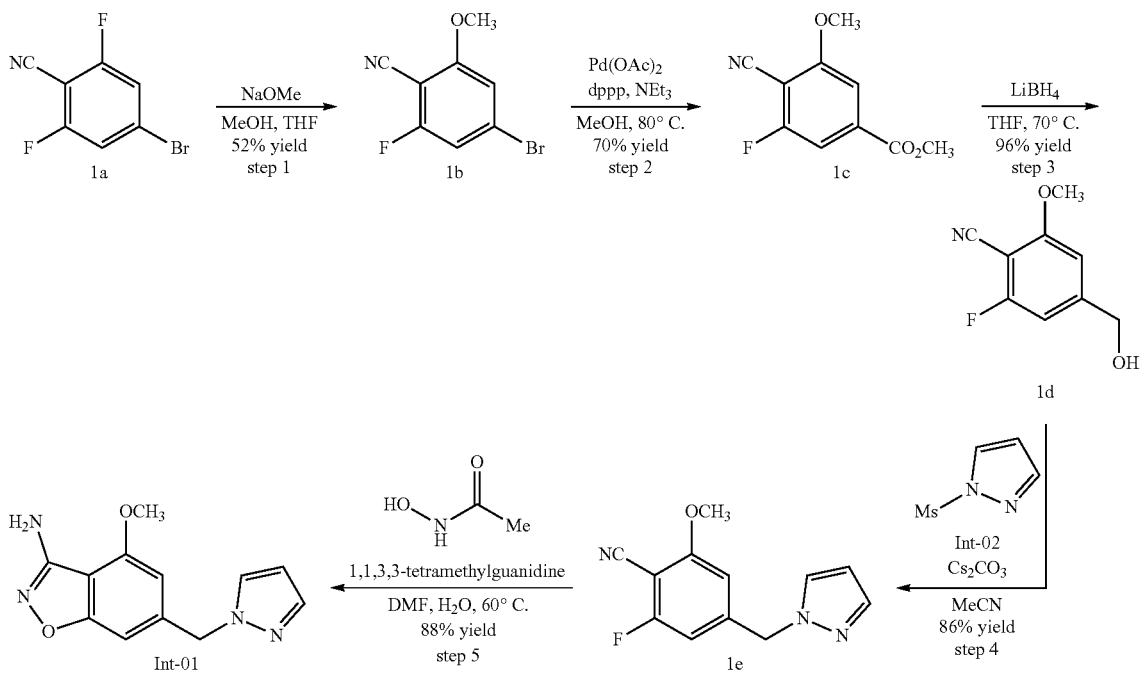

Scheme 1

Step 3: Synthesis of 2-fluoro-4-(hydroxymethyl)-6-methoxybenzonitrile (1d)

To a solution of methyl 4-cyano-3-fluoro-5-methoxybenzoate (1c) (9.5 g, 45.4 mmol) in THF (50 mL) was added LiBH$_4$ (2.0 g, 90.8 mmol) portion-wise at 0° C. The mixture was stirred at 70° C. for 2 h. LCMS analysis showed consumption of the starting material with formation of the desired product mass. The reaction was quenched by slow addition of H$_2$O (100 mL). The mixture was transferred to a separatory funnel and extracted with EtOAc (2×150 mL). The combined organic extracts were washed with brine and saturated aqueous NaHCO$_3$, dried over Na$_2$SO$_4$, filtered, and concentrated to provide 2-fluoro-4-(hydroxymethyl)-6-methoxybenzonitrile (1d) (7.9 g, 96% yield) as a brown oil. $^1$H NMR (400 MHz, DMSO-d$_6$) δ 7.05 (s, 1H), 6.98 (d, J=10.0 Hz, 1H), 4.58 (d, J=5.7 Hz, 2H), 3.95 (s, 3H).

Step 4: Synthesis of 2-fluoro-6-methoxy-4-[(1H-pyrazol-1-yl)methyl]benzonitrile (1e)

To a solution of 2-fluoro-4-(hydroxymethyl)-6-methoxybenzonitrile (1d) (18.6 g, 103 mmol) and 1-(methylsulfonyl)-1H-pyrazole (Int-02) (18.0 g, 123 mmol) in MeCN (342 mL) was added Cs$_2$CO$_3$ (40.1 g, 123 mmol) and the mixture heated to 70° C. for 1 h. After cooling to room temperature the solution was diluted with EtOAc (200 mL), filtered, and concentrated. The residual oil was split into two portions, and each half was purified by flash chromatography (330 g SiO$_2$, 0-70% EtOAc/heptanes) to provide 2-fluoro-6-methoxy-4-[(1H-pyrazol-1-yl)methyl]benzonitrile (1e) (20.3 g, 86% yield) as a yellow oil. $^1$H NMR (400 MHz, CDCl$_3$) δ 7.62 (d, J=1.7 Hz, 1H), 7.49 (d, J=2.2 Hz, 1H), 6.52-6.59 (m, 2H), 6.38 (t, J=2.1 Hz, 1H), 5.37 (s, 2H), 3.90 (s, 3H); m/z (ESI+) 231.8 (M+H)$^+$.

Step 5: Synthesis of 4-methoxy-6-[(1H-pyrazol-1-yl)methyl]-1,2-benzoxazol-3-amine (Int-01)

A suspension of 2-fluoro-6-methoxy-4-(1H-pyrazol-1-ylmethyl)benzonitrile (1e) (15.43 g, 66.7 mmol), N-hydroxyacetamide (15.0 g, 200 mmol), and 1,1,3,3-tetramethylguanidine (46.1 g, 400 mmol) in MeCN (270 mL) and H$_2$O (30 mL) was stirred at 60° C. for 7 h. The MeCN was removed under vacuum and the residual oil was partitioned between EtOAc (300 mL) and H$_2$O (250 mL). The aqueous layer was extracted with EtOAc (2×150 mL). The combined organic layers were washed with brine, dried over Na$_2$SO$_4$, filtered, and concentrated. The residue was suspended in EtOAc (125 mL) and heated briefly to reflux. The suspension was allowed to cool to room temperature. The resulting solids were collected by filtration and the filter cake was washed with heptane. The combined filtrate was concentrated to dryness. The solid was suspended in EtOAc (15 mL). The suspension briefly heated to reflux and then allow to cool to room temperature. The resultant precipitate was collected by filtration and the filter cake was washed with heptane. The combined solids were dried under vacuum to provide 4-methoxy-6-(1H-pyrazol-1-ylmethyl)-1,2-benzoxazol-3-amine (Int-01) (11.86 g, 73% yield) as a pale-yellow solid. $^1$H NMR (400 MHz, DMSO-d$_6$) δ=7.87 (d, J=1.8 Hz, 1H), 7.49 (d, J=1.2 Hz, 1H), 6.69 (s, 1H), 6.62 (s, 1H), 6.30 (t, J=2.1 Hz, 1H), 5.93 (s, 2H), 5.41 (s, 2H), 3.86 (s, 3H); m/z (ESI+) 244.8 (M+H)±.

Alternative Preparation of 2-fluoro-4-(hydroxymethyl)-6-methoxybenzonitrile (1d) According to Scheme 2

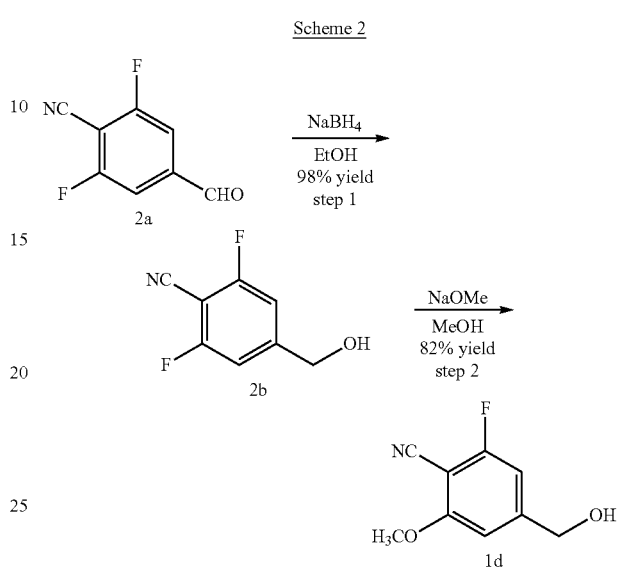

Step 1: Synthesis of 2,6-difluoro-4-(hydroxymethyl)benzonitrile (2b)

A solution of 2,6-difluoro-4-formylbenzonitrile (2a) (21.5 g, 129 mmol) in absolute EtOH (400 mL) was cooled in an ice-water bath to −3° C. (internal). Solid NaBH$_4$ (5×1 g pellets, 5.0 g, 130 mmol) was added, causing slight gas evolution. The mixture was stirred with ice-water bath cooling for 2 h and then quenched at the same temperature by drop-wise addition of deionized H$_2$O (100 mL over 5 min). Aqueous HCl (2.0 N, 50 mL over 30 min) was added slowly, maintaining the temperature <10° C. (internal). The solution was concentrated under vacuum to remove the EtOH. The aqueous residue was transferred to a separatory funnel, leaving behind a gummy white solid. The aqueous phase was extracted with EtOAc (2×). The combined organic extracts were washed with brine (2×), dried over MgSO$_4$, filtered, and concentrated. The crude material was triturated with heptane, filtered, and dried under vacuum to provide 2,6-difluoro-4-(hydroxymethyl)benzonitrile (2b) (21.3 g, 98%) as a free-flowing white solid. $^1$H NMR (400 MHz, DMSO-d$_6$) δ 7.34 (d, J=9.3 Hz, 2H), 5.69 (br s, 1H), 4.60 (br s, 2H).

Step 2: Synthesis of 2-fluoro-4-(hydroxymethyl)-6-methoxybenzonitrile (1d)

A solution of 2,6-difluoro-4-(hydroxymethyl)benzonitrile (2b) (21.3 g, 126 mmol) in anhydrous MeOH (400 mL) was cooled to −40° C. (internal) with a dry ice/acetonitrile bath. A solution of NaOMe (5.0 M in MeOH, 100 mL, 500 mmol) was added over a period of 10 min via dropping funnel addition. After addition was complete the cooling bath was removed. The mixture was allowed to warm naturally to room temperature and stirred for a further 8 h. The reaction mixture was cooled to 0° C. (internal) and HCl (2.0 N, 200 mL) was added dropwise to provide a solution with pH ~5-6. The mixture was concentrated under vacuum to remove the MeOH. The aqueous solution was extracted with EtOAc (3×). The combined organic extracts were washed with brine (2×), dried over MgSO$_4$, and filtered. The mixture was concentrated to ~150 mL on the rotovap (bath temperature ~35° C.) and the resulting slurry was allowed to cool to room temperature. The solids were collected by filtration. The filter cake was washed with heptane (2×). The filtrate and heptane washes were further concentrated to afford a second crop of solids, which were collected by filtration. The combined solids were dried under vacuum to provide 2-fluoro-4-(hydroxymethyl)-6-methoxybenzonitrile (1d) (18.6 g, 82%) as a pale yellow solid. $^1$H NMR (400 MHz, CDCl$_3$) δ 6.82 (s, 1H), 6.79 (d, J=9.2 Hz, 1H), 4.76 (s, 2H), 3.97 (s, 3H).

Preparation of 1-(methanesulfonyl)-1H-pyrazole (Int-02) according to Scheme 3

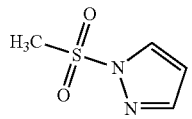

Scheme 3

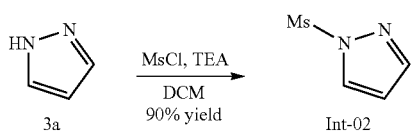

To a solution of 1H-pyrazole (3a) (33.0 g, 485 mmol) and TEA (73.6 mg, 727 mmol) in DCM was added MsCl (73.9 g, 645 mmol) slowly at 0° C. The mixture was stirred at 0° C. for 10 min and then room temperature for 1 h. TLC analysis (1:1 EtOAc/petroleum ether) showed consumption of the starting material. The reaction was diluted with saturated aqueous NH$_4$Cl (200 mL) and the mixture was separated. The aqueous layer was extracted with DCM (200 mL). The combined organic layers were washed with brine (300 mL) and saturated aqueous Na$_2$CO$_3$ (300 mL), dried over anhydrous Na$_2$SO$_4$, filtered, and concentrated to provide 1-(methanesulfonyl)-1H-pyrazole (Int-05) (64 g, 90% yield) as a pale-yellow oil. $^1$H NMR (400 MHz, CDCl$_3$) δ 8.04 (d, J=2.6 Hz, 1H), 7.86-7.79 (m, 1H), 6.46 (dd, J=1.6, 2.7 Hz, 1H), 3.33 (s, 3H).

Preparation of Cyclohexylmethanesulfonyl Chloride (Int-03) According to Scheme 4

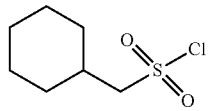 [SMILES: O=S(=O)(Cl)CC1CCCCC1]

Scheme 4

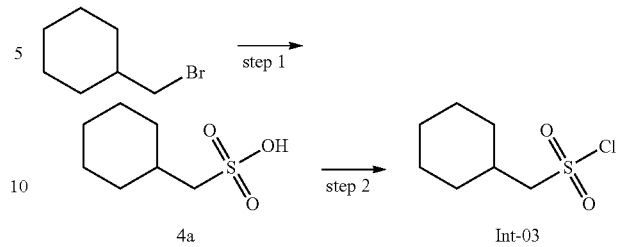

Step 1: Synthesis of Cyclohexylmethanesulfonic Acid (4a)

A suspension of (bromomethyl)cyclohexane (5.0 g, 28.1 mmol) and sodium sulfite (3.8 g, 30.0 mmol) in water (80 mL) and acetone (30 mL) was heated at 90° C. for 16 h. The mixture was allowed to cool to RT, toluene was added and the mixture was concentrated under reduced pressure to give the title compound (4.95 g, 99%) as a white solid, which was used in the next step without further purification. LCMS-C: R$_t$ 0.36 min; m/z 177.0 [M−H]$^-$.

Step 2: Synthesis of Cyclohexylmethanesulfonyl Chloride (Int-03)

To a stirred solution of cyclohexylmethanesulfonic acid 1135 (1.5 g, 8.4 mmol) in DCM (45 mL) was added DMF (12 drops) and the mixture was cooled to −20° C. Oxalyl chloride (10.7 g, 84.2 mmol) was added and the mixture was stirred at −20° C. for 30 min, then allowed to warm to RT and stirred for 2 h. DCM (20 mL) was added and the mixture was washed with water and brine. The organic layer was dried over Na$_2$SO$_4$, filtered and concentrated under reduced pressure to give the title compound (300 mg, 19%) as a yellow oil, which was used in the next step without further purification.

Preparation 4-(bromomethyl)-2-fluoro-6-methoxybenzonitrile (Int-04) According to Scheme 5

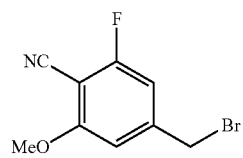

Scheme 5

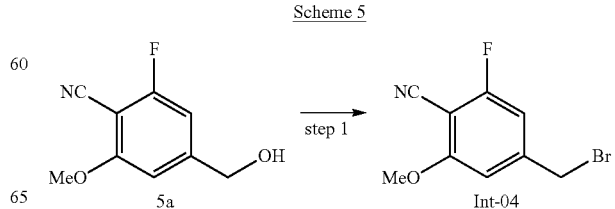

Step 1: Synthesis of 4-(bromomethyl)-2-fluoro-6-methoxybenzonitrile (Int-04)

To a solution of 2-fluoro-4-(hydroxymethyl)-6-methoxybenzonitrile (5a) (8.0 g, 44.2 mmol) and $PPh_3$ (18.7 g, 71.2 mmol) in acetonitrile (400 mL) was added $Br_2$ (11.8 g, 73.8 mmol) and the mixture was heated at 55° C. for 2 h. Water and excess $Na_2SO_3$ were added and the mixture was extracted with EtOAc. The combined organic layers were washed with brine, dried over anhydrous $Na_2SO_4$, filtered and concentrated under reduced pressure. The residue was purified by column chromatography (Pet. Ether/EtOAc=10/1) to give the title compound (9.7 g, 91%) as a white solid.

Preparation of 6-((1H-pyrazol-1-yl)methyl)-4-methoxybenzo[d]isoxazol-3-amine (Int-05) According to Scheme 6

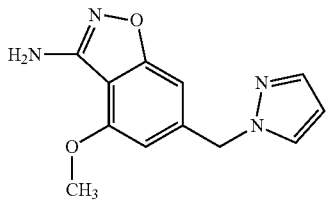

Scheme 6

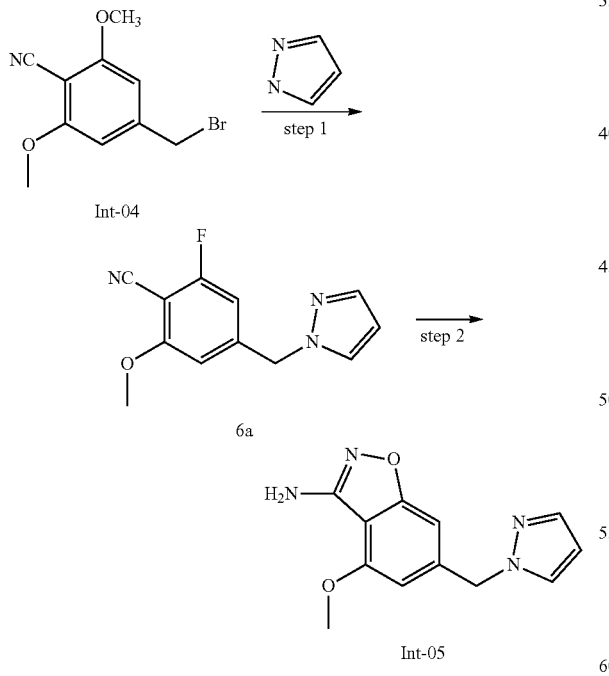

Step 1: Synthesis of 4-((1H-pyrazol-1-yl)methyl)-2-fluoro-6-methoxybenzonitrile (6a)

A solution of 1H-pyrazole (2.0 g, 29.6 mmol) and NaH (60% w/w dispersion in mineral oil, 1.5 g, 37.1 mmol) in DMF (520 mL) was stirred at 0° C. for 1 h. A solution of 4-(bromomethyl)-2-fluoro-6-methoxybenzonitrile (Int-04) (6.0 g, 24.7 mmol) in DMF (80 mL) was then added and the mixture was stirred at RT overnight. The reaction was quenched with water and the mixture was extracted with EtOAc. The combined organic layers were washed with brine, dried over anhydrous $Na_2SO_4$, filtered and concentrated under reduced pressure. The residue was purified by column chromatography (Pet. Ether/EtOAc=6/1) to give the title compound (2.4 g, 42%) as a yellow solid, m/z 232.0. $[M+H]^+$.

Step 2: Synthesis of 6-((1H-pyrazol-1-yl)methyl)-4-methoxybenzo[d]isoxazol-3-amine (Int-05)

To a solution of acetohydroxamic acid (3.7 g, 49.5 mmol) in anhydrous DMF (150 mL) at RT was added potassium tert-butoxide (5.6 g, 49.5 mmol) and the mixture was stirred at RT for 1 h. 4-((1H-Pyrazol-1-yl)methyl)-2-fluoro-6-methoxybenzonitrile (6a) (3.8 g, 16.5 mmol) was then added and stirring was continued at 60° C. for 4 h. Water was added and the mixture was extracted with EtOAc. The combined organic layers were dried over anhydrous $Na_2SO_4$, filtered and concentrated under reduced pressure. The residue was purified by column chromatography (Pet. Ether/EtOAc=5/1) to give the title compound (2.1 g, 53%) as a yellow solid. $^1H$ NMR (400 MHz, DMSO-$d_6$) δ 7.87 (dd, J=1.6, 0.4 Hz, 1H), 7.50 (dd, J=1.6, 0.4 Hz, 1H), 6.69 (s, 1H), 6.62 (s, 1H), 6.30 (t, J=2.1 Hz, 1H), 5.93 (s, 2H), 5.41 (s, 2H), 3.86 (s, 3H); m/z 245.0 $[M+H]^+$.

Sulfonamide Formation Methods:

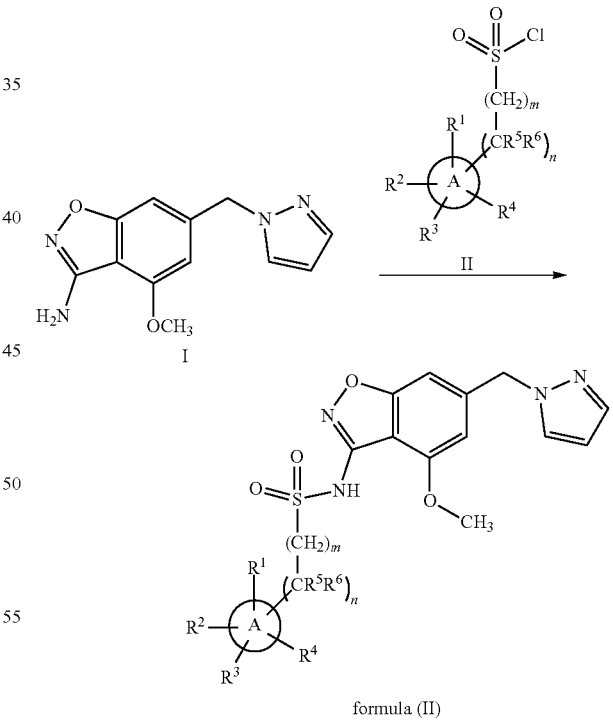

formula (II)

Method A:

To a solution of compound I (1.0 eq) in DCM (c=0.08 M) was added TEA (2.0 eq) and compound II (1.2 eq). The mixture was stirred at ambient temperature for 16 h. The reaction was concentrated to dryness and purified by standard methods known to those in the art to provide a compound of formula (II).

Method B:

A solution of NaOtPn in THF or PhMe (c=0.6 M) was added to a solution of a solution of compound I (1.0 eq) in THF (c=0.2 M). After 10 min a solution of compound II (1.2 eq) in THF (c=1.2 M) was added. The mixture was stirred at 30-60° C. for 17 h. The reaction was cooled to room temperature, diluted with 1:1 MeOH/DCM, filtered, concentrated to dryness, and purified by standard methods known to those in the art to provide compound of formula (II).

PREPARATION OF EXAMPLES

Example 01: Preparation of (+)-N-{4-methoxy-6-[(1H-pyrazol-1-yl)methyl]-1,2-benzoxazol-3-yl}-1-(oxan-2-yl)methanesulfonamide According to Scheme A

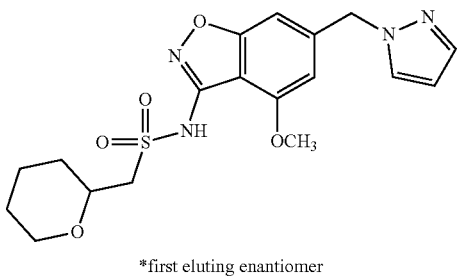 [SMILES: COc1cc(Cn2cccn2)cc2onc(NS(=O)(=O)CC3CCCCO3)c12]

*first eluting enantiomer

Example 02: Preparation of (−)-N-{4-methoxy-6-[(1H-pyrazol-1-yl)methyl]-1,2-benzoxazol-3-yl}-1-(oxan-2-yl)methanesulfonamide According to Scheme A

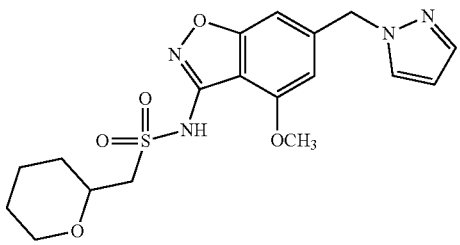

*second eluting enantiomer

Scheme A

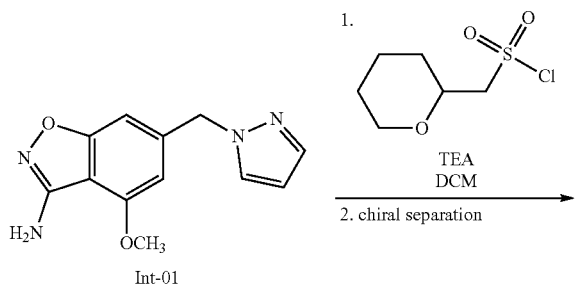

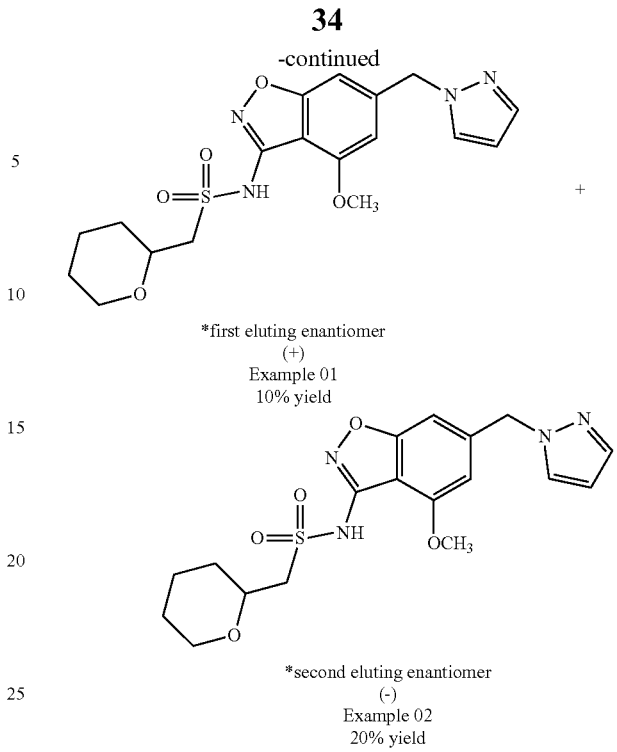

*first eluting enantiomer
(+)
Example 01
10% yield

*second eluting enantiomer
(−)
Example 02
20% yield

To a solution of 4-methoxy-6-[(1H-pyrazol-1-yl)methyl]-1,2-benzoxazol-3-amine (Int-01) (100 mg, 0.409 mmol) in DCM (5.0 mL) was added TEA (82.9 mg, 0.819 mmol) and (oxan-2-yl)methanesulfonyl chloride (97.6 mg, 0.491 mmol). The solution was stirred at room temperature for 16 h. The reaction was concentrated to dryness and purified by flash chromatography (20 g SiO$_2$, 60-70% EtOAc/petroleum ether). The racemic mixture was purified by chiral preparative SFC with a Diacel CHIRALPK AS-H column (250×30 mm, 5 µm particle size), which was eluted with 25% EtOH (+0.1% NH$_4$OH) with flow rate of 60 mL/min. (+)-5-Ethyl-2-methoxy-N-{4-methoxy-6-[(1H-pyrazol-1-yl)methyl]-1,2-benzoxazol-3-yl}benzene-1-sulfonamide (8.2 mg, 10% yield) was obtained as the first-eluting peak as a white solid. $^1$H NMR (400 MHz, DMSO-d$_6$) δ 10.24 (br s, 1H), 7.89 (d, J=2.0 Hz, 1H), 7.51 (d, J=1.3 Hz, 1H), 6.87 (s, 1H), 6.75 (s, 1H), 6.31 (t, J=2.1 Hz, 1H), 5.46 (s, 2H), 3.89 (s, 3H), 3.86-3.79 (m, 1H), 3.75 (br d, J=11.4 Hz, 1H), 3.63-3.49 (m, 2H), 1.80-1.65 (m, 2H), 1.54-1.21 (m, 5H); m/z (ESI+) 407.1 (M+H)$^+$; $[α]_D^{24}$=33.6 (c=0.002, MeOH). (−)-5-Ethyl-2-methoxy-N-{4-methoxy-6-[(1H-pyrazol-1-yl)methyl]-1,2-benzoxazol-3-yl}benzene-1-sulfonamide (16.1 mg, 20% yield) was obtained as the second-eluting peak as a white solid. $^1$H NMR (400 MHz, DMSO-d$_6$) δ 10.23 (br s, 1H), 7.89 (d, J=1.8 Hz, 1H), 7.51 (d, J=1.2 Hz, 1H), 6.86 (s, 1H), 6.75 (s, 1H), 6.31 (t, J=2.0 Hz, 1H), 5.46 (s, 2H), 3.88 (s, 3H), 3.81 (br dd, J=5.3, 10.2 Hz, 1H), 3.77-3.72 (m, 1H), 3.63-3.46 (m, 2H), 1.74 (br s, 2H), 1.54-1.19 (m, 5H); m/z (ESI+) 407.1 (M+H)$^+$; $[α]_D^{24}$=−10.5 (c=0.002, MeOH).

The examples in Table 1 below were synthesized according to the methods used for the synthesis of (+)-5-ethyl-2-methoxy-N-{4-methoxy-6-[(1H-pyrazol-1-yl)methyl]-1,2-benzoxazol-3-yl}benzene-1-sulfonamide (Example 01), (−)-5-ethyl-2-methoxy-N-{4-methoxy-6-[(1H-pyrazol-1-yl)methyl]-1,2-benzoxazol-3-yl}benzene-1-sulfonamide (Example 02), and sulfonamide formation Method A. The following examples were synthesized with non-critical changes or substitutions to the exemplified procedures that someone who is skilled in the art would be able to realize. If necessary, separation of racemic mixtures to afford enantioenriched products was carried out under standard methods known in the art, such as SFC or HPLC, and was conducted at any suitable step in the synthetic sequence.

TABLE 1

| Example Number | Structure and Name | Analytical Data |
| --- | --- | --- |
| 03 | 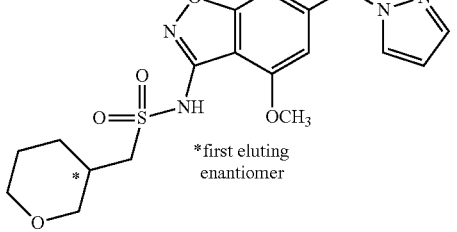<br>*first eluting enantiomer<br><br>(+)-N-{4-methoxy-6-[(1H-pyrazol-1-yl)methyl]-1,2-benzoxazol-3-yl}-1-(oxan-3-yl)methanesulfonamide | $^1$H NMR (400 MHz, DMSO-$d_6$) δ 10.55 (br s, 1H), 7.90 (d, J = 2.3 Hz, 1H), 7.52 (d, J = 1.8 Hz, 1H), 6.88 (s, 1H), 6.77 (s, 1H), 6.32 (t, J = 2.1 Hz, 1H), 5.47 (s, 2H), 3.95-3.82 (m, 4H), 3.69 (dt, J = 11.4, 3.8 Hz, 1H), 3.21 (dd, J = 11.2, 9.0 Hz, 1H), 2.23-2.07 (m, 1H), 1.96-1.85 (m, 1H), 1.64-1.31 (m, 3H), (*3H obscured by solvent peak); m/z (ESI+) 407.1 (M + H)$^+$; $[\alpha]_D^{24}$ = 3.16 (c = 0.003, MeOH) |
| 04 | 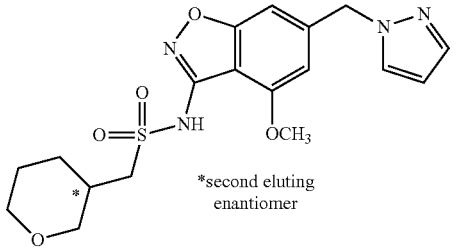<br>*second eluting enantiomer<br><br>(−)-N-{4-methoxy-6-[(1H-pyrazol-1-yl)methyl]-1,2-benzoxazol-3-yl}-1-(oxan-3-yl)methanesulfonamide | $^1$H NMR (400 MHz, DMSO-$d_6$) δ 10.55 (br s, 1H), 7.90 (d, J = 2.2 Hz, 1H), 7.52 (d, J = 1.8 Hz, 1H), 6.88 (s, 1H), 6.77 (s, 1H), 6.32 (d, J = 2.1 Hz, 1H), 5.47 (s, 2H), 3.95-3.83 (m, 4H), 3.69 (dt, J = 11.4, 3.9 Hz, 1H), 3.21 (dd, J = 11.1, 9.0 Hz, 1H), 2.18 (dd, J = 9.2, 4.6 Hz, 1H), 2.00-1.85 (m, 1H), 1.62-1.33 (m, 3H), (*3H obscured by solvent peak); m/z (ESI+) 407.1 (M + H)$^+$; $[\alpha]_D^{24}$ = −5.00 (c = 0.005, MeOH) |
| 05 | 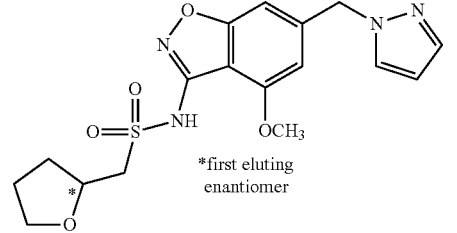<br>*first eluting enantiomer<br><br>(+)-N-{4-methoxy-6-[(1H-pyrazol-1-yl)methyl]-1,2-benzoxazol-3-yl}-1-(oxan-3-yl)methanesulfonamide | $^1$H NMR (400 MHz, DMSO-$d_6$) δ 10.36 (br s, 1H), 7.89 (br s, 1H), 7.51 (br s, 1H), 6.87 (br s, 1H), 6.76 (br s, 1H), 6.31 (br d, J = 1.7 Hz, 1H), 5.46 (br s, 2H), 4.30-4.21 (m, 1H), 3.88 (br s, 3H), 3.73-3.65 (m, 2H), 3.64-3.56 (m, 2H), 2.07 (s, 1H), 1.89-1.76 (m, 2H), 1.73-1.63 (m, 1H); m/z (ESI+) 393.0 (M + H)$^+$; $[\alpha]_D^{24}$ = 2.7 (c = 0.002, MeOH) |

| Example Number | Structure and Name | Analytical Data |
|---|---|---|
| 06 | 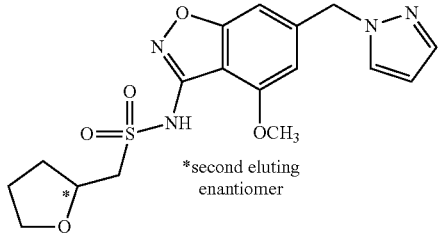<br>*second eluting enantiomer<br><br>(−)-N-{4-methoxy-6-[(1H-pyrazol-1-yl)methyl]-1,2-benzoxazol-3-yl}-1-(oxan-3-yl)methanesulfonamide | $^1$H NMR (400 MHz, DMSO-d$_6$) δ 10.36 (br s, 1H), 7.89 (d, J = 1.8 Hz, 1H), 7.51 (d, J = 1.3 Hz, 1H), 6.87 (s, 1H), 6.76 (s, 1H), 6.31 (t, J = 2.0 Hz, 1H), 5.46 (s, 2H), 4.25 (quin, J = 6.4 Hz, 1H), 3.88 (s, 3H), 3.74-3.64 (m, 2H), 3.63-3.54 (m, 2H), 2.12-2.03 (m, 1H), 1.90-1.75 (m, 2H), 1.74-1.63 (m, 1H); m/z (ESI+) 393.0 (M + H)$^+$; [α]$_D^{24}$ = −11.7 (c = 0.002, MeOH) |

Example 07: Preparation of N-{4-methoxy-6-[(1H-pyrazol-1-yl)methyl]-1,2-benzoxazol-3-yl}-1-(oxan-4-yl)methanesulfonamide According to Scheme B

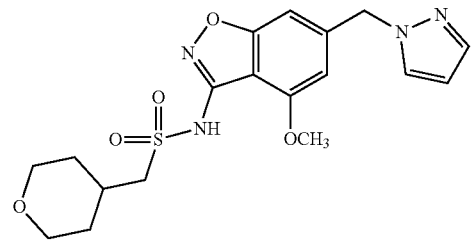 [SMILES: COc1cc(Cn2cccn2)cc2onc(NS(=O)(=O)CC3CCOCC3)c12]

Scheme B

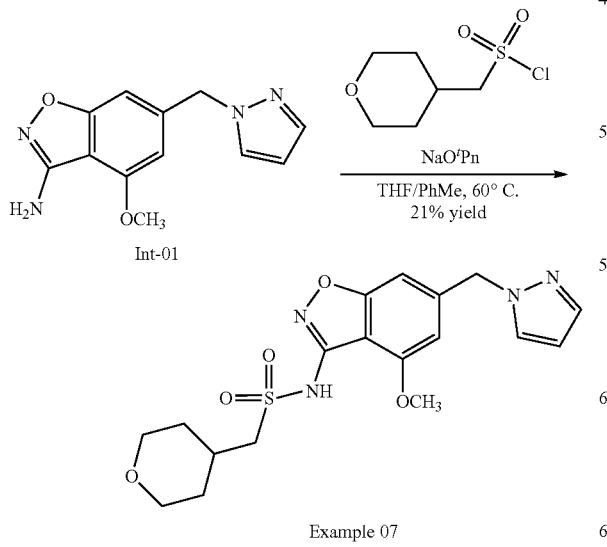

To a solution of 4-methoxy-6-[(1H-pyrazol-1-yl)methyl]-1,2-benzoxazol-3-amine (Int-01) (80 mg, 0.33 mmol) in THF (3.0 mL) was added a solution of NaO$^t$Pn (40% in PhMe, 400 μL, 0.33 mmol). The mixture was stirred for 10 min and then a solution of (oxan-4-yl)methanesulfonyl chloride (125 mg, 0.63 mmol) in THF (0.5 mL) was added. The mixture was stirred at 60° C. for 16 h. AcOH was added and then the mixture was concentrated to dryness. The residue was purified by preparative SFC with a Zymor SPHER pyridine-diol column (21.1×150 mmol, 5 μm particle size), which was eluted with 10-50% MeOH/CO$_2$ with a flow rate of 80 g/min to provide N-{4-methoxy-6-[(1H-pyrazol-1-yl)methyl]-1,2-benzoxazol-3-yl}-1-(oxan-4-yl)methanesulfonamide (Example 07) (37.9 mg, 27% yield) as a white solid. $^1$H NMR (400 MHz, DMSO-d$_6$) δ 10.44 (s, 1H), 7.89 (d, J=2.3 Hz, 1H), 7.52 (d, J=1.8 Hz, 1H), 6.90 (s, 1H), 6.78 (s, 1H), 6.32 (t, J=2.1 Hz, 1H), 5.47 (s, 2H), 3.91 (s, 3H), 3.88-3.67 (m, 2H), 3.43 (d, J=6.4 Hz, 2H), 2.32-2.12 (m, 1H), 1.89-1.67 (m, 2H), 1.52-1.29 (m, 2H). (2H obscured by solvent peak); m/z (ESI+) 407.1 (M+H)$^+$.

The examples in Table 2 below were synthesized according to the methods used for the synthesis of N-{4-methoxy-6-[(1H-pyrazol-1-yl)methyl]-1,2-benzoxazol-3-yl}-1-(oxan-4-yl)methanesulfonamide (Example 07) and sulfonamide formation Method B. The following examples were synthesized with non-critical changes or substitutions to the exemplified procedures that someone who is skilled in the art would be able to realize.

TABLE 2

| Example Number | Structure and Name | Analytical Data |
|---|---|---|
| 08 | 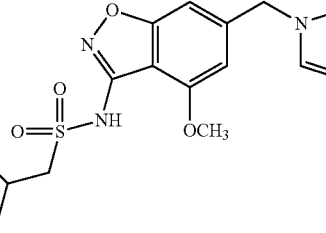<br>1-(4-fluorocyclohexyl)-N-{4-methoxy-6-[(1H-pyrazol-1-yl)methyl]-1,2-benzoxazol-3-yl}methanesulfonamide | $^1$H NMR (400 MHz, DMSO-$d_6$) δ 7.86 (d, J = 2.3 Hz, 1H), 7.50 (d, J = 1.8 Hz, 1H), 6.66 (br s, 1H), 6.52 (br s, J = 27.1 Hz, 1H), 6.30 (t, J = 2.0 Hz, 1H), 5.40 (s, 2H), 3.82 (s, 3H), 3.29-3.27 (m, 1H), 3.16-2.91 (m, 2H), 2.09-1.10 (m, 9H); m/z (ESI+) 423.3 (M + H)$^+$. |
| 09 | 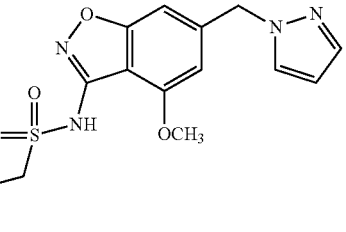<br>1-cyclopentyl-N-{4-methoxy-6-[(1H-pyrazol-1-yl)methyl]-1,2-benzoxazol-3-yl}methanesulfonamide | $^1$H NMR (400 MHz, DMSO-$d_6$) δ 7.89-7.73 (m, 1H), 7.41 (s, 1H), 6.51 (s, 1H), 6.42 (s, 1H), 6.22 (s, 1H), 5.30 (s, 2H), 3.72 (s, 3H), 2.96 (d, J = 6.8 Hz, 2H), 2.18-1.95 (m, 1H), 1.85-1.59 (m, 2H), 1.56-1.26 (m, 4H), 1.14 (dt, J = 13.4, 6.5 Hz, 2H); m/z (ESI+) 391.3 (M + H)$^+$. |
| 10 | 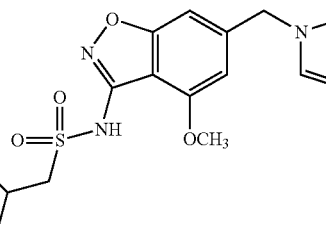<br>1-(4,4-difluorocyclohexyl)-N-{4-methoxy-6-[(1H-pyrazol-1-yl)methyl]-1,2-benzoxazol-3-yl}methanesulfonamide | $^1$H NMR (400 MHz, DMSO-$d_6$) δ 7.85 (dd, J = 2.2, 0.7 Hz, 1H), 7.49 (dd, J = 1.9, 0.7 Hz, 1H), 6.59 (d, J = 1.0 Hz, 1H), 6.49 (d, J = 1.1 Hz, 1H), 6.29 (t, J = 2.0 Hz, 1H), 5.37 (s, 2H), 3.79 (s, 3H), 2.98 (d, J = 6.1 Hz, 2H), 2.36 (d, J = 6.3 Hz, 2H), 2.11-1.58 (m, 7H); m/z (ESI+) 441.3 (M + H)$^+$. |

The examples in the Table 3 below were synthesized according to the methods used for the synthesis of N-{4-methoxy-6-[(1H-pyrazol-1-yl)methyl]-1,2-benzoxazol-3-yl}-1-(oxan-4-yl)methanesulfonamide (Example 07) and sulfonamide formation Method B in high-throughput library format. The following examples were synthesized with non-critical changes or substitutions to the exemplified procedures that someone who is skilled in the art would be able to realize.

TABLE 3

| Example Number | Structure and Name | Analytical Data |
| --- | --- | --- |
| 11 | 1-(1-ethoxycyclobutyl)-N-{4-methoxy-6-[(1H-pyrazol-1-yl)methyl]-1,2-benzoxazol-3-yl}methanesulfonamide | m/z (ESI+) 421.3 (M + H)+. |
| 12 | N-{4-methoxy-6-[(1H-pyrazol-1-yl)methyl]-1,2-benzoxazol-3-yl}cyclobutanesulfonamide | m/z (ESI+) 363.3 (M + H)+. |
| 13 | N-{4-methoxy-6-[(1H-pyrazol-1-yl)methyl]-1,2-benzoxazol-3-yl}cyclopropanesulfonamide | m/z (ESI+) 349.1 (M + H)+. |
| 14 | 3-(cyaomethyl)-N-{4-methoxy-6-[(1H-pyrazol-1-yl)methyl]-1,2-benzoxazol-3-yl}cyclobutane-1-sulfonamide | m/z (ESI+) for ($C_{18}H_{19}N_5O_4S$), 402.1 (M + H)+. |

TABLE 3-continued

| Example Number | Structure and Name | Analytical Data |
|---|---|---|
| 15 | 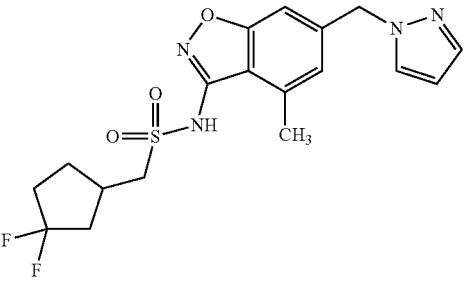<br>1-(3,3-difluorocyclopentyl)-N-{4-methoxy-6-[(1H-pyrazol-1-yl)methyl]-1,2-benzoxazol-3-yl}methanesulfonamide | m/z (ESI+) for 427.3 (M + H)+. |
| 16 | 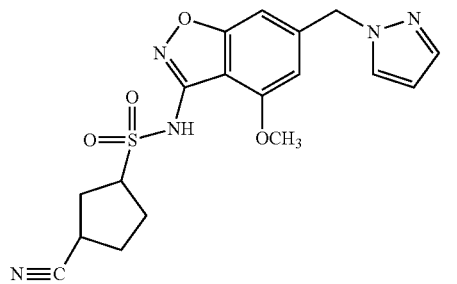<br>3-cyano-N-{4-methoxy-6-[(1H-pyrazol-1-yl)methyl]-1,2-benzoxazol-3-yl}cyclopentane-1-sulfonamide | m/z (ESI+) 402.3 (M + H)+. |
| 17 | 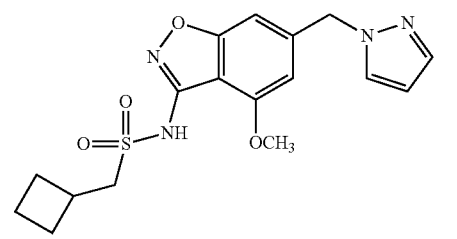<br>1-cyclobutyl-N-{4-methoxy-6-[(1H-pyrazol-1-yl)methyl]-1,2-benzoxazol-3-yl}methanesulfonamide | m/z (ESI+) 377.3 (M + H)+. |
| 18 | 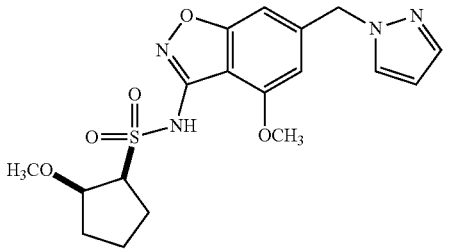<br>rac-(1S,2R)-2-methoxy-N-{4-methoxy-6-[(1H-pyrazol-1-yl)methyl]-1,2-benzoxazol-3-yl}cyclopentane-1-sulfonamide | m/z (ESI+) 407.3 (M + H)+. |

TABLE 3-continued

| Example Number | Structure and Name | Analytical Data |
|---|---|---|
| 19 | 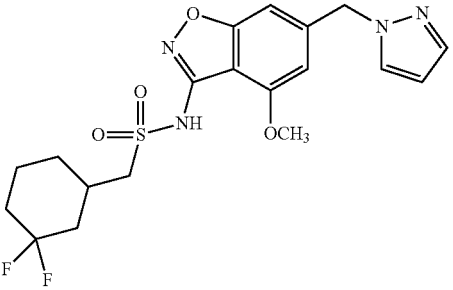<br>1-(3,3-difluorocyclohexyl)-N-{4-methoxy-6-[(1H-pyrazol-1-yl)methyl]-1,2-benzoxazol-3-yl}methanesulfonamide | m/z (ESI+) for 441.3 (M + H)+. |
| 20 | 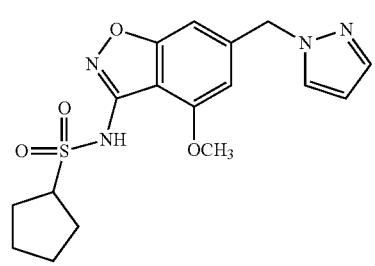<br>N-{4-methoxy-6-[(1H-pyrazol-1-yl)methyl]-1,2-benzoxazol-3-yl}cyclopentanesulfonamide | m/z (ESI+) 377.1 (M + H)+. |
| 21 | 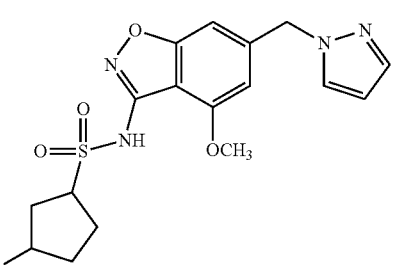<br>N-{4-methoxy-6-[(1H-pyrazol-1-yl)methyl]-1,2-benzoxazol-3-yl}-3-methylcyclopentane-1-sulfonamide | m/z (ESI+) 391.3 (M + H)+. |
| 22 | 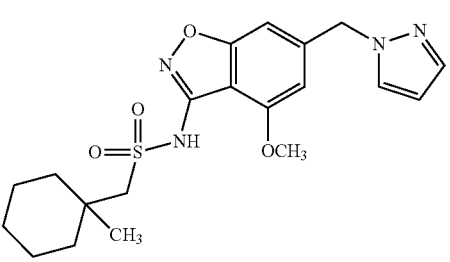<br>N-{4-methoxy-6-[(1H-pyrazol-1-yl)methyl]-1,2-benzoxazol-3-yl}-1-(1-methylcyclohexyl)methanesulfonamide | m/z (ESI+) 419.3 (M + H)+. |

TABLE 3-continued

| Example Number | Structure and Name | Analytical Data |
|---|---|---|
| 23 | 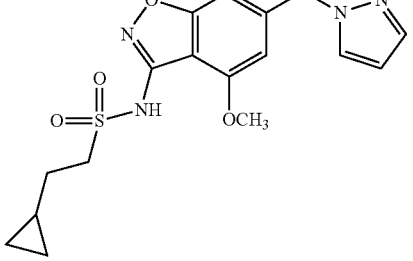2-cyclopropyl-N-{4-methoxy-6-[(1H-pyrazol-1-yl)methyl]-1,2-benzoxazol-3-yl}ethane-1-sulfonamide | m/z (ESI+) 377.3 (M + H)+. |
| 24 | 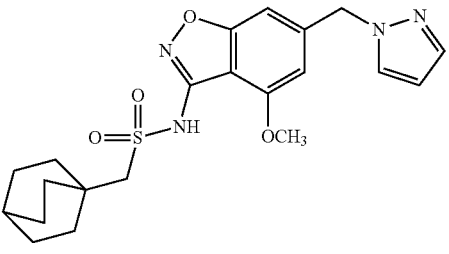1-(bicyclo[2.2.2]octan-1-yl)-N-{4-methoxy-6-[(1H-pyrazol-1-yl)methyl]-1,2-benzoxazol-3-yl}methanesulfonamide | m/z (ESI+) for 431.3 (M + H)+. |
| 25 | 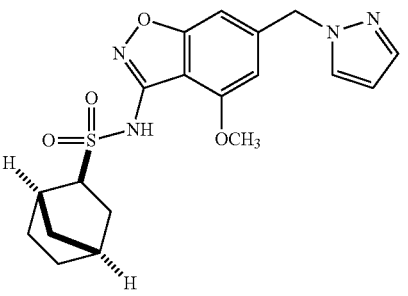rac-(1R,2R,4S)-N-{4-methoxy-6-[(1H-pyrazol-1-yl)methyl]-1,2-benzoxazol-3-yl}bicyclo[2.2.1]heptane-2-sulfonamide | m/z (ESI+) 403.3 (M + H)+. |
| 26 | 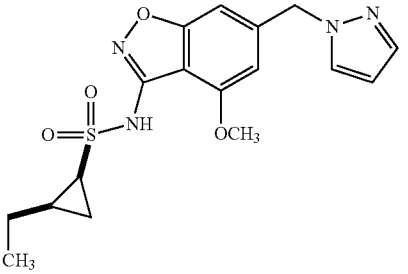rac-(1S,2R)-2-ethyl-N-{4-methoxy-6-[(1H-pyrazol-1-yl)methyl]-1,2-benzoxazol-3-yl}cyclopropane-1-sulfonamide | m/z (ESI+) 377.1 (M + H)+. |

TABLE 3-continued

| Example Number | Structure and Name | Analytical Data |
|---|---|---|
| 27 | rac-(1S,2R)-2-(4-fluorophenyl)-N-{4-methoxy-6-[(1H-pyrazol-1-yl)methyl]-1,2-benzoxazol-3-yl}cyclopropane-1-sulfonamide | m/z (ESI+) 443.1 (M + H)+. |
| 28 | rac-(1S,2R)-N-{4-methoxy-6-[(1H-pyrazol-1-yl)methyl]-1,2-benzoxazol-3-yl}-2-phenylcyclopropane-1-sulfonamide | m/z (ESI+) 425.1 (M + H)+. |
| 29 | 2-cyclobutyl-N-{4-methoxy-6-[(1H-pyrazol-1-yl)methyl]-1,2-benzoxazol-3-yl}ethane-1-sulfonamide | m/z (ESI+) 391.3 (M + H)+. |

TABLE 3-continued

| Example Number | Structure and Name | Analytical Data |
| --- | --- | --- |
| 30 | 1-(bicyclo[2.2.1]heptan-2-yl)-N-{4-methoxy-6-[(1H-pyrazol-1-yl)methyl]-1,2-benzoxazol-3-yl}methanesulfonamide | m/z (ESI+) 417.3 (M + H)+. |
| 31 | 2-cyclohexyl-N-{4-methoxy-6-[(1H-pyrazol-1-yl)methyl]-1,2-benzoxazol-3-yl}ethane-1-sulfonamide | m/z (ESI+) 419.3 (M + H)+. |
| 32 | 3-cyclopropyl-N-{4-methoxy-6-[(1H-pyrazol-1-yl)methyl]-1,2-benzoxazol-3-yl}-3-methylbutane-1-sulfonamide | m/z (ESI+) 419.3 (M + H)+. |

TABLE 3-continued

| Example Number | Structure and Name | Analytical Data |
|---|---|---|
| 33 | 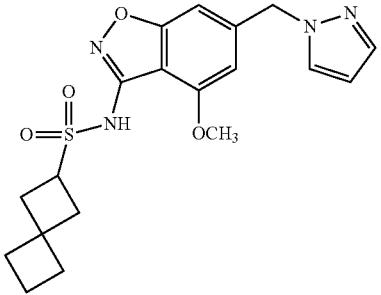<br>N-{4-methoxy-6-[(1H-pyrazol-1-yl)methyl]-1,2-benzoxazol-3-yl}spiro[3.3]heptane-2-sulfonamide | m/z (ESI+) 403.3 (M + H)+. |
| 34 | 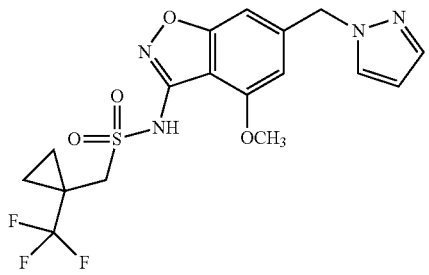<br>N-{4-methoxy-6-[(1H-pyrazol-1-yl)methyl]-1,2-benzoxazol-3-yl}-1-[1-(trifluoromethyl)cyclopropyl]methanesulfonamide | m/z (ESI+) 431.3 (M + H)+. |
| 35 | 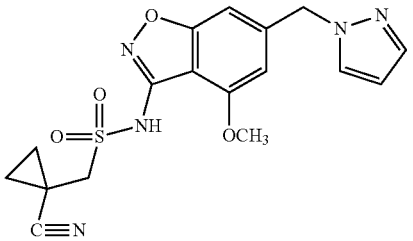<br>1-(1-cyanocyclopropyl)-N-{4-methoxy-6-[(1H-pyrazol-1-yl)methyl]-1,2-benzoxazol-3-yl}methanesulfonamide | m/z (ESI+) 388.3 (M + H)+. |
| 36 | 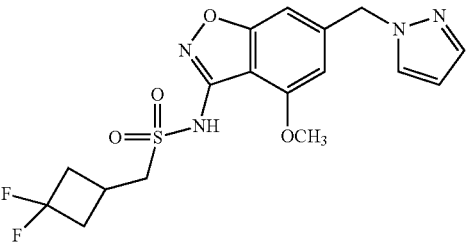<br>1-(3,3-difluorocyclobutyl)-N-{4-methoxy-6-[(1H-pyrazol-1-yl)methyl]-1,2-benzoxazol-3-yl}methanesulfonamide | m/z (ESI+) 413.3 (M + H)+. |

TABLE 3-continued

| Example Number | Structure and Name | Analytical Data |
|---|---|---|
| 37 | 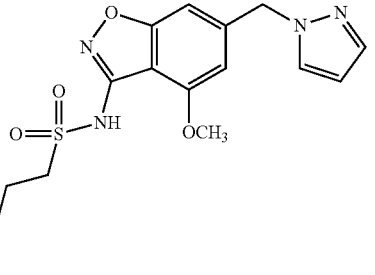<br>3-cyclohexyl-N-{4-methoxy-6-[(1H-pyrazol-1-yl)methyl]-1,2-benzoxazol-3-yl}propane-1-sulfonamide | m/z (ESI+) 433.3 (M + H)+. |
| 38 | 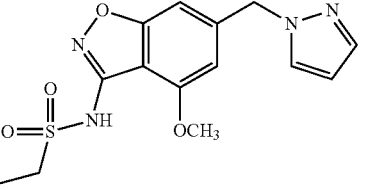<br>N-{4-methoxy-6-[(1H-pyrazol-1-yl)methyl]-1,2-benzoxazol-3-yl}-1-(spiro[3.3]heptan-2-yl)methanesulfonamide | m/z (ESI+) 417.3 (M + H)+. |
| 39 | 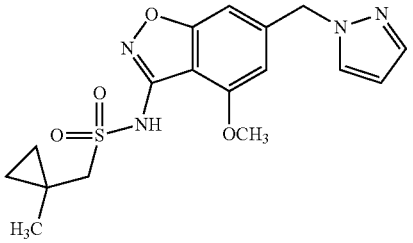<br>N-{4-methoxy-6-[(1H-pyrazol-1-yl)methyl]-1,2-benzoxazol-3-yl}-1-(1-methylcyclopropyl)methanesulfonamide | m/z (ESI+) 377.3 (M + H)+. |
| 40 | 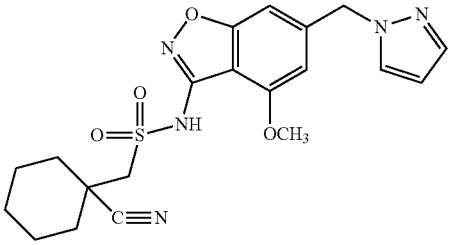<br>1-(1-cyanocyclohexyl)-N-{4-methoxy-6-[(1H-pyrazol-1-yl)methyl]-1,2-benzoxazol-3-yl}methanesulfonamide | m/z (ESI+) 430.3 (M + H)+. |

TABLE 3-continued

| Example Number | Structure and Name | Analytical Data |
|---|---|---|
| 41 | 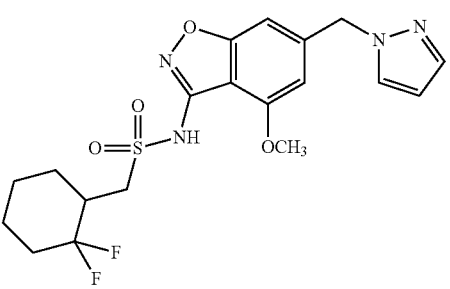<br>1-(2,2-difluorocyclohexyl)-N-{4-methoxy-6-[(1H-pyrazol-1-yl)methyl]-1,2-benzoxazol-3-yl}methanesulfonamide | m/z (ESI+) 441.3 (M + H)+. |
| 42 | 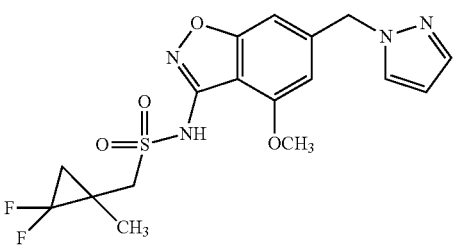<br>1-(2,2-difluroo-1-methylcyclopropyl)-N-{4-methoxy-6-[(1H-pyrazol-1-yl)methyl]-1,2-benzoxazol-3-yl}methanesulfonamide | m/z (ESI+) 413.3 (M + H)+. |
| 43 | 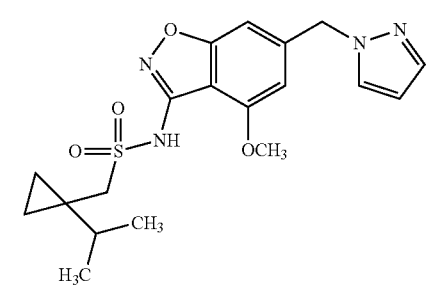<br>N-{4-methoxy-6-[(1H-pyrazol-1-yl)methyl]-1,2-benzoxazol-3-yl}-1-[1-(propan-2-yl)cyclopropyl]methanesulfonamide | m/z (ESI+) 391.3 (M + H)+. |

TABLE 3-continued

| Example Number | Structure and Name | Analytical Data |
|---|---|---|
| 44 | 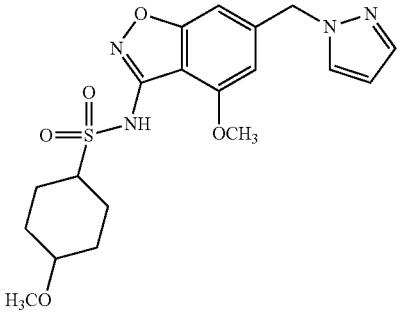<br>4-methoxy-N-{4-methoxy-6-[(1H-pyrazol-1-yl)methyl]-1,2-benzoxazol-3-yl}cyclohexane-1-sulfonamide | m/z (ESI+) 421.3 (M + H)+. |
| 45 | 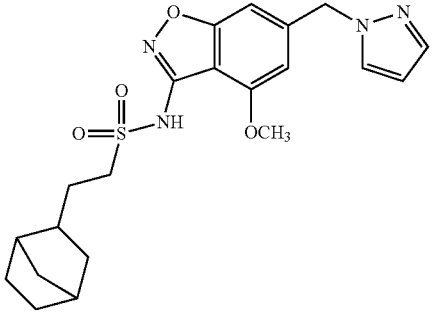<br>2-(bicyclo[2.2.1]heptan-2-yl)-N-{4-methoxy-6-[(1H-pyrazol-1-yl)methyl]-1,2-benzoxazol-3-yl}ethane-1-sulfonamide | m/z (ESI+) 431.3 (M + H)+. |
| 46 | 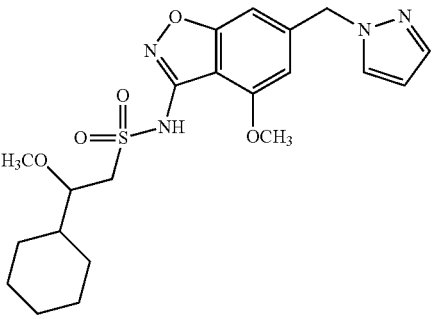<br>2-cyclohexyl-2-methoxy-N-{4-methoxy-6-[(1H-pyrazol-1-yl)methyl]-1,2-benzoxazol-3-yl}ethane-1-sulfonamide | m/z (ESI+) 449.3 (M + H)+. |

TABLE 3-continued

| Example Number | Structure and Name | Analytical Data |
|---|---|---|
| 47 | 1-(methoxymethyl)-N-{4-methoxy-6-[(1H-pyrazol-1-yl)methyl]-1,2-benzoxazol-3-yl}cyclopropane-1-sulfonamide | m/z (ESI+) 393.3 (M + H)+. |
| 48 | 2-cyclopropyl-N-{4-methoxy-6-[(1H-pyrazol-1-yl)methyl]-1,2-benzoxazol-3-yl}propane-1-sulfonamide | m/z (ESI+) 391.3 (M + H)+. |
| 49 | N-{4-methoxy-6-[(1H-pyrazol-1-yl)methyl]-1,2-benzoxazol-3-yl}-1-(3-methylcyclohexyl)methanesulfonamide | m/z (ESI+) 421.3 (M + H)+. |

TABLE 3-continued

| Example Number | Structure and Name | Analytical Data |
|---|---|---|
| 50 | 1-[1-(difluoromethyl)cyclopropyl]-N-{4-methoxy-6-[(1H-pyrazol-1-yl)methyl]-1,2-benzoxazol-3-yl}methanesulfonamide | m/z (ESI+) 413.2 (M + H)+. |
| 51 | 4,4-difluoro-N-{4-methoxy-6-[(1H-pyrazol-1-yl)methyl]-1,2-benzoxazol-3-yl}cyclohexane-1-sulfonamide | m/z (ESI+) 427.3 (M + H)+. |
| 52 | 1-(1-methoxycyclohexyl)-N-{4-methoxy-6-[(1H-pyrazol-1-yl)methyl]-1,2-benzoxazol-3-yl}methanesulfonamide | m/z (ESI+) 435.3 (M + H)+. |

TABLE 3-continued

| Example Number | Structure and Name | Analytical Data |
| --- | --- | --- |
| 53 | 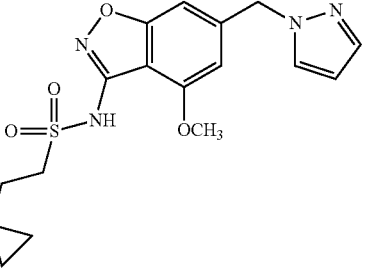<br>N-{4-methoxy-6-[(1H-pyrazol-1-yl)methyl]-1,2-benzoxazol-3-yl}-2-(1-methylcyclopropyl)ethane-1-sulfonamide | m/z (ESI+) 391.3 (M + H)+. |
| 54 | 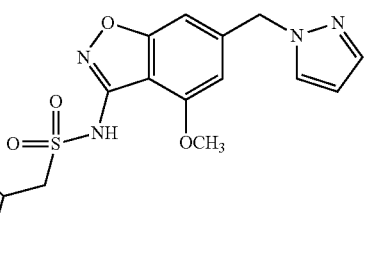<br>1-(3-fluorocyclohexyl)-N-{4-methoxy-6-[(1H-pyrazol-1-yl)methyl]-1,2-benzoxazol-3-yl}methanesulfonamide | m/z (ESI+) 423.3 (M + H)+. |
| 55 | 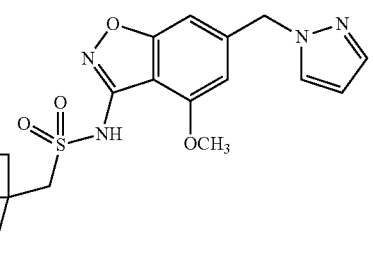<br>1-[1-(methoxymethyl)cyclobutyl]-N-{4-methoxy-6-[(1H-pyrazol-1-yl)methyl]-1,2-benzoxazol-3-yl}methanesulfonamide | m/z (ESI+) 421.3 (M + H)+. |
| 56 | 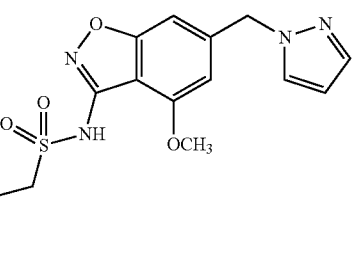<br>1-(1-methoxycyclobutyl)-N-{4-methoxy-6-[(1H-pyrazol-1-yl)methyl]-1,2-benzoxazol-3-yl}methanesulfonamide | m/z (ESI+) 407.3 (M + H)+. |

TABLE 3-continued

| Example Number | Structure and Name | Analytical Data |
|---|---|---|
| 57 | 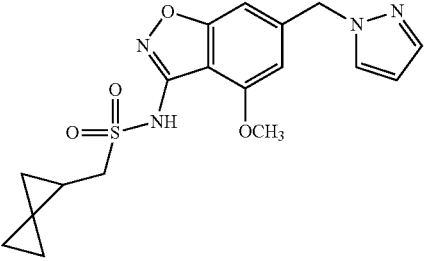<br>N-{4-methoxy-6-[(1H-pyrazol-1-yl)methyl]-1,2-benzoxazol-3-yl}-1-(spiro[2.2]pentan-1-yl)methanesulfonamide | m/z (ESI+) 389.3 (M + H)+. |
| 58 | 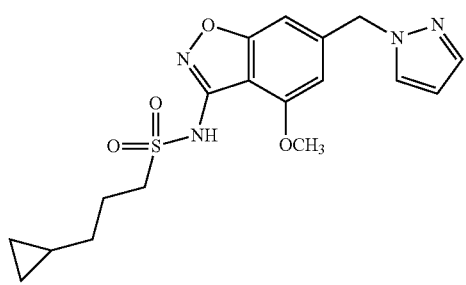<br>3-cyclopropyl-N-{4-methoxy-6-[(1H-pyrazol-1-yl)methyl]-1,2-benzoxazol-3-yl}propane-1-sulfonamide | m/z (ESI+) 391.3 (M + H)+. |
| 59 | 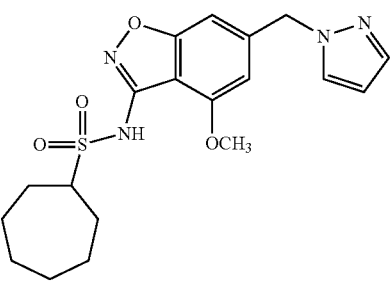<br>N-{4-methoxy-6-[(1H-pyrazol-1-yl)methyl]-1,2-benzoxazol-3-yl}cycloheptanesulfonamide | m/z (ESI+) 405.3 (M + H)+. |
| 60 | 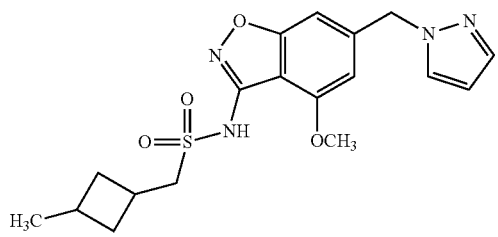<br>N-{4-methoxy-6-[(1H-pyrazol-1-yl)methyl]-1,2-benzoxazol-3-yl}-1-(3-methylcyclobutyl)methanesulfonamide | m/z (ESI+) 391.3 (M + H)+. |

TABLE 3-continued

| Example Number | Structure and Name | Analytical Data |
|---|---|---|
| 61 | 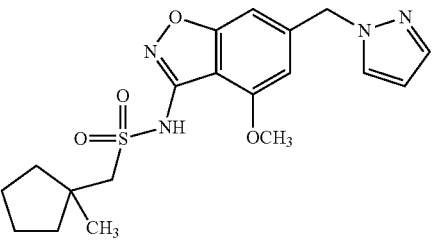<br>N-{4-methoxy-6-[(1H-pyrazol-1-yl)methyl]-1,2-benzoxazol-3-yl}-1-(1-methylcyclopentyl)methanesulfonamide | m/z (ESI+) 405.3 (M + H)+. |
| 62 | 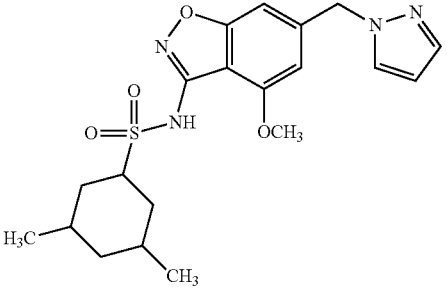<br>N-{4-methoxy-6-[(1H-pyrazol-1-yl)methyl]-1,2-benzoxazol-3-yl}-3,5-dimethylcyclohexane-1-sulfonamide | m/z (ESI+) 419.3 (M + H)+. |
| 63 | 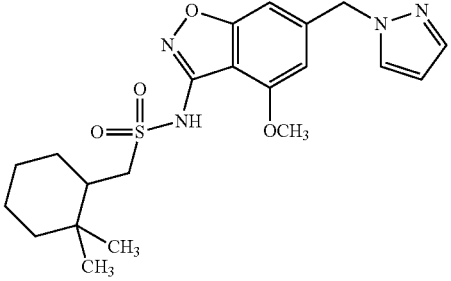<br>1-(2,2-dimethylcyclohexyl)-N-{4-methoxy-6-[(1H-pyrazol-1-yl)methyl]-1,2-benzoxazol-3-yl}methanesulfonamide | m/z (ESI+) 433.3 (M + H)+. |

TABLE 3-continued

| Example Number | Structure and Name | Analytical Data |
|---|---|---|
| 64 | 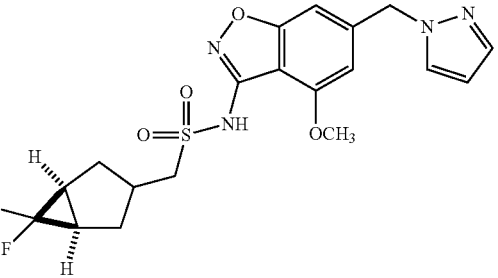<br>rac-1-[(1R,5S)-6,6-difluorobicyclo[3.1.0]hexan-3-yl]-N-{4-methoxy-6-[(1H-pyrazol-1-yl)methyl]-1,2-benzoxazol-3-yl}methanesulfonamide | m/z (ESI+) 439.3 (M + H)+. |
| 65 | 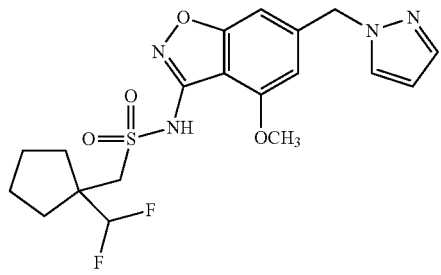<br>1-[1-(difluoromethyl)cyclopentyl]-N-{4-methoxy-6-[(1H-pyrazol-1-yl)methyl]-1,2-benzoxazol-3-yl}methanesulfonamide | m/z (ESI+) 441.3 (M + H)+. |
| 66 | 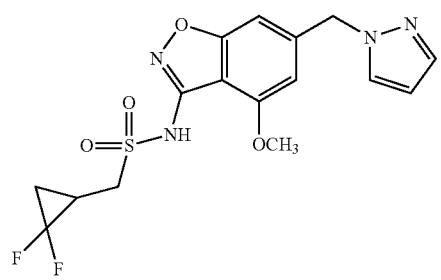<br>1-(2,2-difluorocyclopropyl)-N-{4-methoxy-6-[(1H-pyrazol-1-yl)methyl]-1,2-benzoxazol-3-yl}methanesulfonamide | m/z (ESI+) 399.2 (M + H)+. |

TABLE 3-continued

| Example Number | Structure and Name | Analytical Data |
|---|---|---|
| 67 | 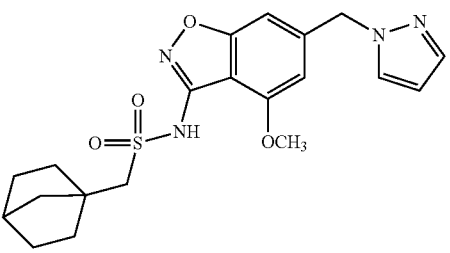<br>1-(bicyclo[2.2.1]heptan-1-yl)-N-{4-methoxy-6-[(1H-pyrazol-1-yl)methyl]-1,2-benzoxazol-3-yl}methanesulfonamide | m/z (ESI+) 417.3 (M + H)+. |
| 68 | 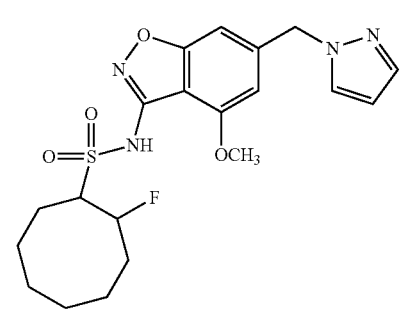<br>2-fluoro-N-{4-methoxy-6-[(1H-pyrazol-1-yl)methyl]-1,2-benzoxazol-3-yl}cyclooctane-1-sulfonamide | m/z (ESI+) 373.3 (M + H)+. |
| 69 | 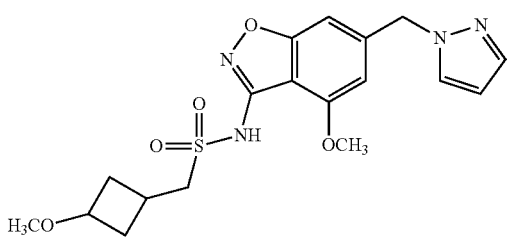<br>1-(3-methoxycyclobutyl)-N-{4-methoxy-6-[(1H-pyrazol-1-yl)methyl]-1,2-benzoxazol-3-yl}methanesulfonamide | m/z (ESI+) 407.3 (M + H)+. |
| 70 | 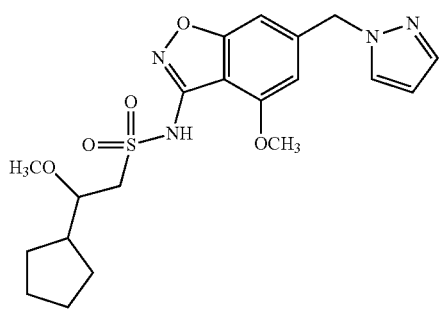<br>2-cyclopentyl-2-methoxy-N-{4-methoxy-6-[(1H-pyrazol-1-yl)methyl]-1,2-benzoxazol-3-yl}ethane-1-sulfonamide | m/z (ESI+) 435.3 (M + H)+. |

TABLE 3-continued

| Example Number | Structure and Name | Analytical Data |
|---|---|---|
| 71 | 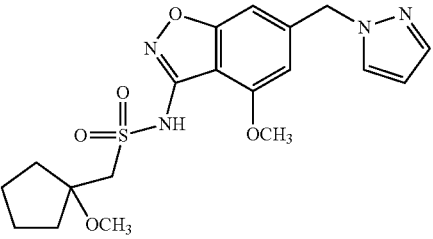

1-(1-methoxycyclopentyl)-N-{4-methoxy-6-[(1H-pyrazol-1-yl)methyl]-1,2-benzoxazol-3-yl}methanesulfonamide | m/z (ESI+) 421.3 (M + H)+. |
| 72 | 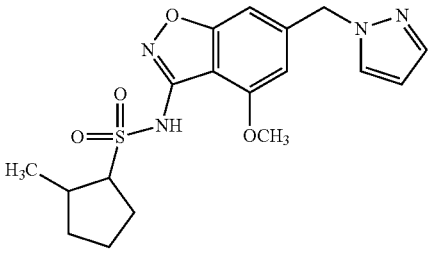

N-{4-methoxy-6-[(1H-pyrazol-1-yl)methyl]-1,2-benzoxazol-3-yl}-2-methylcyclopentane-1-sulfonamide | m/z (ESI+) 391.3 (M + H)+. |
| 73 | 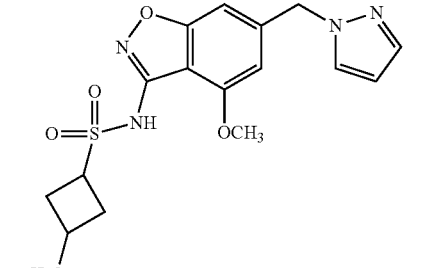

N-{4-methoxy-6-[(1H-pyrazol-1-yl)methyl]-1,2-benzoxazol-3-yl}-3-methylcyclobutane-1-sulfonamide | m/z (ESI+) 377.3 (M + H)+. |
| 74 | 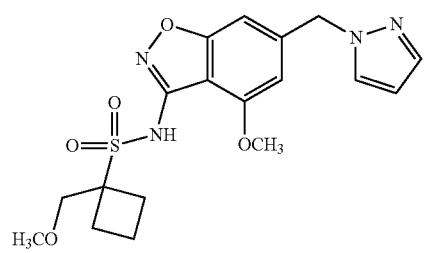

1-(methoxymethyl)-N-{4-methoxy-6-[(1H-pyrazol-1-yl)methyl]-1,2-benzoxazol-3-yl}cyclobutane-1-sulfonamide | m/z (ESI+) 407.3 (M + H)+. |

TABLE 3-continued

| Example Number | Structure and Name | Analytical Data |
|---|---|---|
| 75 | 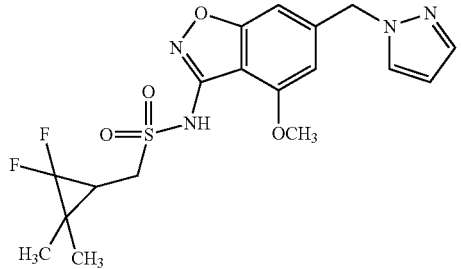<br>1-(2,2-difluoro-3,3-dimethylcyclopropyl)-N-{4-methoxy-6-[(1H-pyrazol-1-yl)methyl]-1,2-benzoxazol-3-yl}methanesulfonamide | m/z (ESI+) 427.3 (M + H)+. |
| 76 | 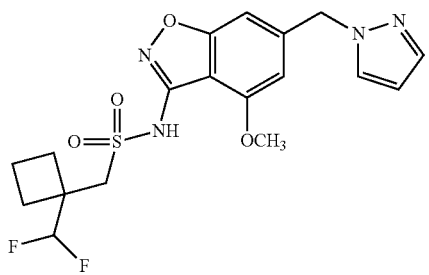<br>1-[1-(difluoromethyl)cyclobutyl]-N-{4-methoxy-6-[(1H-pyrazol-1-yl)methyl]-1,2-benzoxazol-3-yl}methanesulfonamide | m/z (ESI+) 427.3 (M + H)+. |
| 77 | 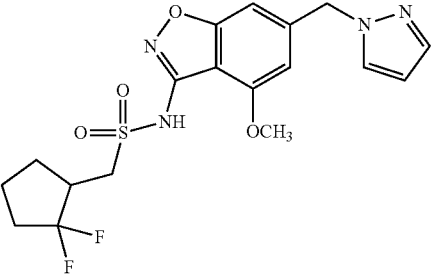<br>1-(2,2-difluorocyclopentyl)-N-{4-methoxy-6-[(1H-pyrazol-1-yl)methyl]-1,2-benzoxazol-3-yl}methanesulfonamide | m/z (ESI+) 427.3 (M + H)+. |

TABLE 3-continued

| Example Number | Structure and Name | Analytical Data |
|---|---|---|
| 78 | 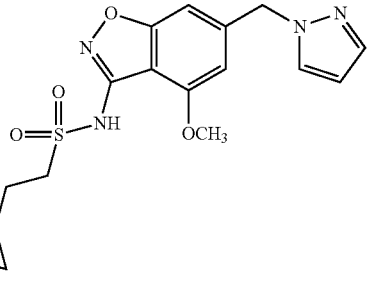<br>2-(2,2-difluorocyclopropyl)-N-{4-methoxy-6-[(1H-pyrazol-1-yl)methyl]-1,2-benzoxazol-3-yl}ethane-1-sulfonamide | m/z (ESI+) 413.3 (M + H)+. |
| 79 | 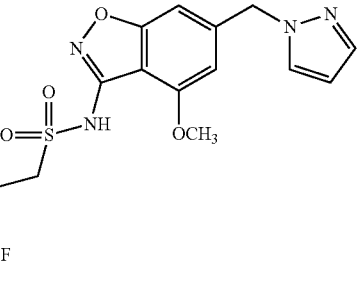<br>1-(2,2-difluorocyclobutyl)-N-{4-methoxy-6-[(1H-pyrazol-1-yl)methyl]-1,2-benzoxazol-3-yl}methanesulfonamide | m/z (ESI+) 413.3 (M + H)+. |
| 80 | 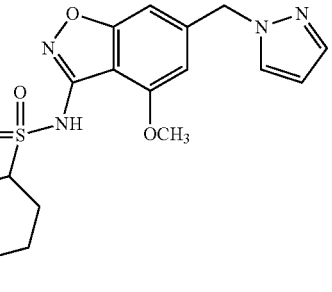<br>N-{4-methoxy-6-[(1H-pyrazol-1-yl)methyl]-1,2-benzoxazol-3-yl}-4-oxocyclohexane-1-sulfonamide | m/z (ESI+) 405.3 (M + H)+. |
| 81 | 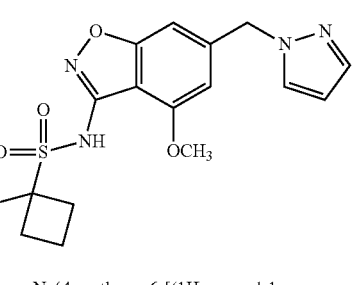<br>N-{4-methoxy-6-[(1H-pyrazol-1-yl)methyl]-1,2-benzoxazol-3-yl}-1-methylcyclobutane-1-sulfonamide | m/z (ESI+) 377.3 (M + H)+. |

TABLE 3-continued
| Example Number | Structure and Name | Analytical Data |
|---|---|---|
| 82 | 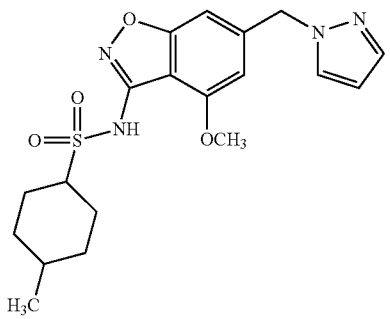<br>N-{4-methoxy-6-[(1H-pyrazol-1-yl)methyl]-1,2-benzoxazol-3-yl}-4-methylcyclohexane-1-sulfonamide | m/z (ESI+) 405.3 (M + H)+. |
| 83 | 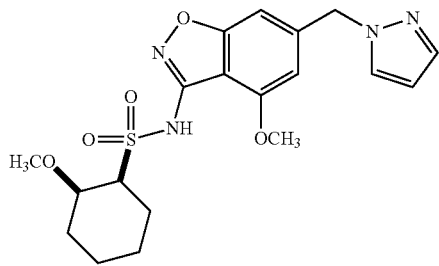<br>rac-(1S,2R)-2-methoxy-N-{4-methoxy-6-[(1H-pyrazol-1-yl)methyl]-1,2-benzoxazol-3-yl}cyclohexane-1-sulfonamide | m/z (ESI+) 421.3 (M + H)+. |
| 84 | 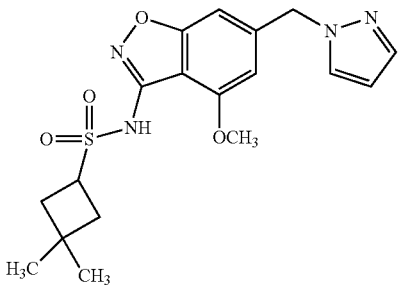<br>N-{4-methoxy-6-[(1H-pyrazol-1-yl)methyl]-1,2-benzoxazol-3-yl}-3,3-dimethylcyclobutane-1-sulfonamide | m/z (ESI+) 391.3 (M + H)+. |

TABLE 3-continued

| Example Number | Structure and Name | Analytical Data |
|---|---|---|
| 85 | 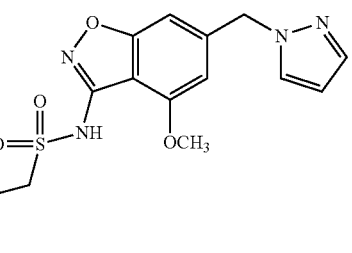<br>1-[1-(methanesulfonyl)azetidin-3-yl]-N-{4-methoxy-6-[(1H-pyrazol-1-yl)methyl]-1,2-benzoxazol-3-yl}methanesulfonamide | m/z (ESI+) 456.2 (M + H)+. |
| 86 | 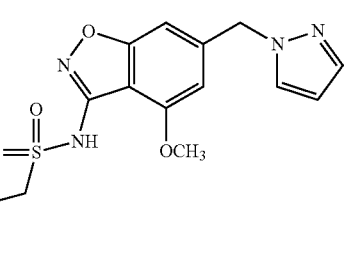<br>N-{4-methoxy-6-[(1H-pyrazol-1-yl)methyl]-1,2-benzoxazol-3-yl}-1-(2,2,5,5-tetramethyloxolan-3-yl)methanesulfonamide | m/z (ESI+) 431.3 (M + H)+. |
| 87 | 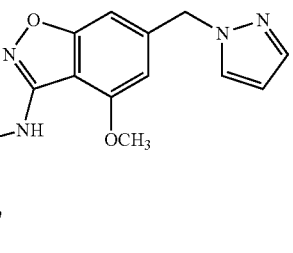<br>N-{4-methoxy-6-[(1H-pyrazol-1-yl)methyl]-1,2-benzoxazol-3-yl}oxane-3-sulfonamide | m/z (ESI+) 393.9 (M + H)+. |

TABLE 3-continued
| Example Number | Structure and Name | Analytical Data |
|---|---|---|
| 88 | 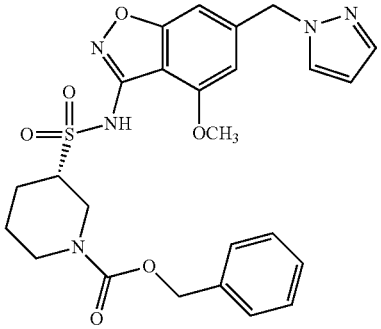<br>benzyl (3S)-3-({4-methoxy-6-[(1H-pyrazol-1-yl)methyl]-1,2-benzoxazol-3-yl}sulfamoyl)piperidine-1-carboxylate | m/z (ESI+) 526.1 (M + H)+. |
| 89 | 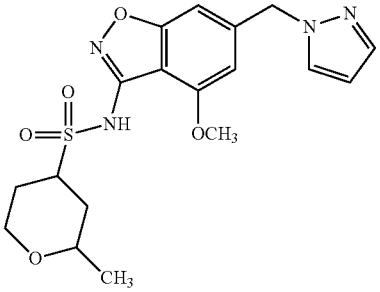<br>N-{4-methoxy-6-[(1H-pyrazol-1-yl)methyl]-1,2-benzoxazol-3-yl}-2-methyloxane-4-sulfonamide | m/z (ESI+) 407.3 (M + H)+. |
| 90 | 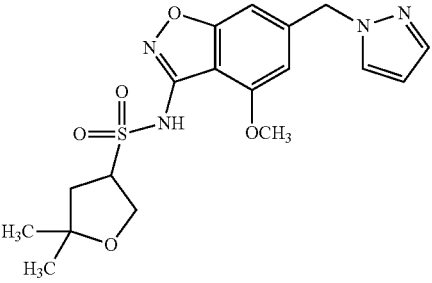<br>N-{4-methoxy-6-[(1H-pyrazol-1-yl)methyl]-1,2-benzoxazol-3-yl}-5,5-dimethyloxolane-3-sulfonamide | m/z (ESI+) 407.3 (M + H)+. |

TABLE 3-continued

| Example Number | Structure and Name | Analytical Data |
|---|---|---|
| 91 | 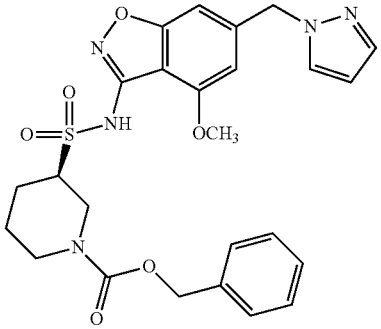<br>benzyl (3R)-3-({4-methoxy-6-[(1H-pyrazol-1-yl)methyl]-1,2-benzoxazol-3-yl}sulfamoyl)piperidine-1-carboxylate | m/z (ESI+) 526.1 (M + H)+. |
| 92 | 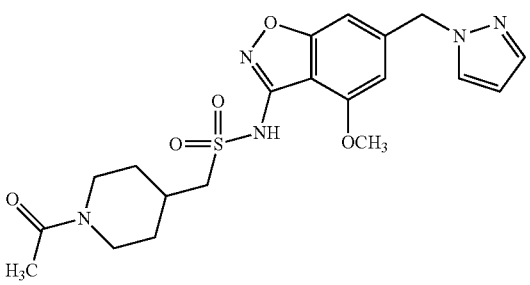<br>1-(1-acetylpiperidin-4-yl)-N-{4-methoxy-6-[(1H-pyrazol-1-yl)methyl]-1,2-benzoxazol-3-yl}methanesulfonamide | m/z (ESI+) 448.3 (M + H)+. |
| 93 | 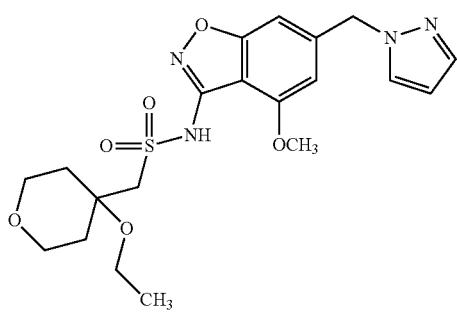<br>1-(4-ethoxyoxan-4-yl)-N-{4-methoxy-6-[(1H-pyrazol-1-yl)methyl]-1,2-benzoxazol-3-yl}methanesulfonamide | m/z (ESI+) 451.3 (M + H)+. |

TABLE 3-continued
| Example Number | Structure and Name | Analytical Data |
|---|---|---|
| 94 | 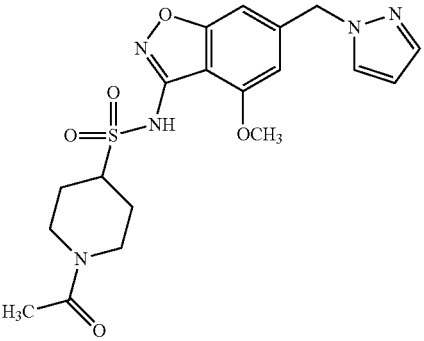<br>1-acetyl-N-{4-methoxy-6-[(1H-pyrazol-1-yl)methyl]-1,2-benzoxazol-3-yl}piperidine-4-sulfonamide | m/z (ESI+) 434.3 (M + H)+. |
| 95 | 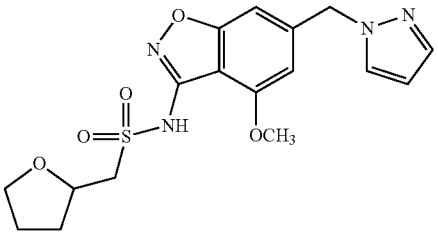<br>N-{4-methoxy-6-[(1H-pyrazol-1-yl)methyl]-1,2-benzoxazol-3-yl}-1-(oxolan-2-yl)methanesulfonamide | m/z (ESI+) 493.3 (M + H)+. |
| 96 | 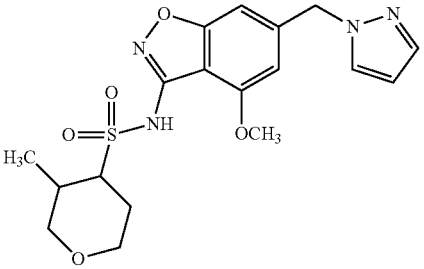<br>N-{4-methoxy-6-[(1H-pyrazol-1-yl)methyl]-1,2-benzoxazol-3-yl}-3-methyloxane-4-sulfonamide | m/z (ESI+) 407.3 (M + H)+. |

TABLE 3-continued

| Example Number | Structure and Name | Analytical Data |
|---|---|---|
| 97 | 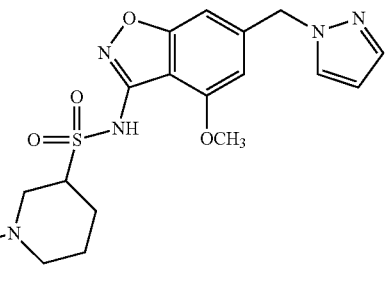<br>1-acetyl-N-{4-methoxy-6-[(1H-pyrazol-1-yl)methyl]-1,2-benzoxazol-3-yl}piperidine-3-sulfonamide | m/z (ESI+) 434.3 (M + H)$^+$. |
| 98 | 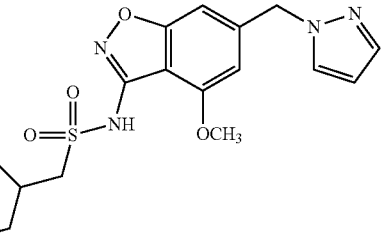<br>N-{4-methoxy-6-[(1H-pyrazol-1-yl)methyl]-1,2-benzoxazol-3-yl}-1-(oxan-3-yl)methanesulfonamide | m/z (ESI+) 407.3 (M + H)$^+$. |
| 99 | 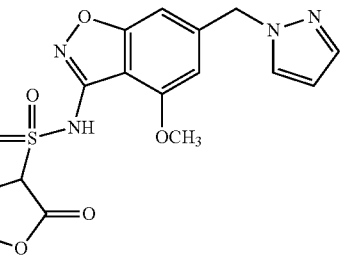<br>N-{4-methoxy-6-[(1H-pyrazol-1-yl)methyl]-1,2-benzoxazol-3-yl}-2-oxooxolane-3-sulfonamide | m/z (ESI+) 393.2 (M + H)$^+$. |
| 100 | 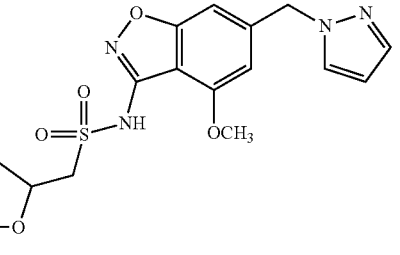<br>N-{4-methoxy-6-[(1H-pyrazol-1-yl)methyl]-1,2-benzoxazol-3-yl}-1-(5-methyloxolan-2-yl)methanesulfonamide | m/z (ESI+) 407.3 (M + H)$^+$. |

TABLE 3-continued

| Example Number | Structure and Name | Analytical Data |
|---|---|---|
| 101 | N-{4-methoxy-6-[(1H-pyrazol-1-yl)methyl]-1,2-benzoxazol-3-yl}-1-(oxan-2-yl)methanesulfonamide | m/z (ESI+) 407.3 (M + H)+. |
| 102 | N-{4-methoxy-6-[(1H-pyrazol-1-yl)methyl]-1,2-benzoxazol-3-yl}-2-(oxolan-2-yl)ethane-1-sulfonamide | m/z (ESI+) 407.3 (M + H)+. |
| 103 | N-{4-methoxy-6-[(1H-pyrazol-1-yl)methyl]-1,2-benzoxazol-3-yl}-1-(2-methyloxan-4-yl)methanesulfonamide | m/z (ESI+) 421.3 (M + H)+. |

TABLE 3-continued

| Example Number | Structure and Name | Analytical Data |
|---|---|---|
| 104 | 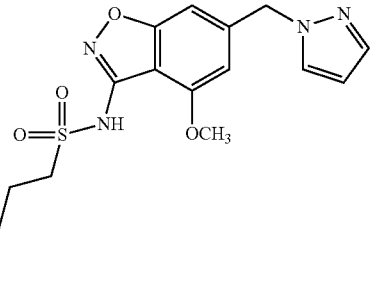<br>N-{4-methoxy-6-[(1H-pyrazol-1-yl)methyl]-1,2-benzoxazol-3-yl}-3-(oxan-4-yl)propane-1-sulfonamide | m/z (ESI+) 435.3 (M + H)+. |
| 105 | 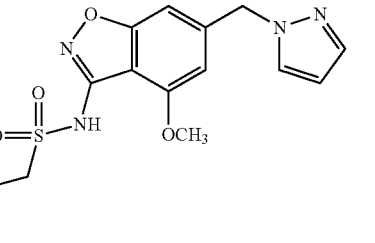<br>1-(1-azabicyclo[3.2.1]octan-5-yl)-N-{4-methoxy-6-[(1H-pyrazol-1-yl)methyl]-1,2-benzoxazol-3-yl}methanesulfonamide | m/z (ESI+) 432.3 (M + H)+. |
| 106 | 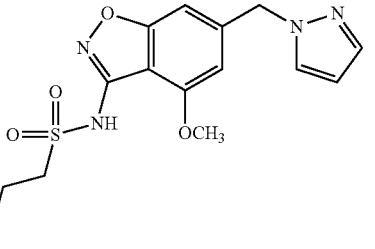<br>N-{4-methoxy-6-[(1H-pyrazol-1-yl)methyl]-1,2-benzoxazol-3-yl}-3-(oxolan-3-yl)propane-1-sulfonamide | m/z (ESI+) 421.3 (M + H)+. |
| 107 | 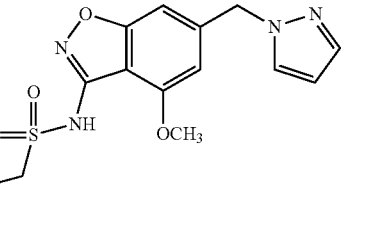<br>N-{4-mthoxy-6-[(1H-pyrazol-1-yl)methyl]-1,2-benzoxazol-3-yl}-1-(oxolan-3-yl)methanesulfonamide | m/z (ESI+) 493.3 (M + H)+. |

TABLE 3-continued

| Example Number | Structure and Name | Analytical Data |
|---|---|---|
| 108 | 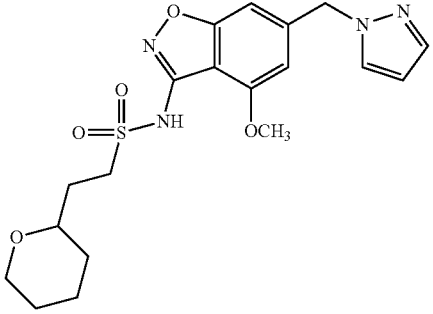<br>N-{4-methoxy-6-[(1H-pyrazol-1-yl)methyl]-1,2-benzoxazol-3-yl}-2-(oxan-2-yl)ethane-1-sulfonamide | m/z (ESI+) 421.3 (M + H)+. |
| 109 | 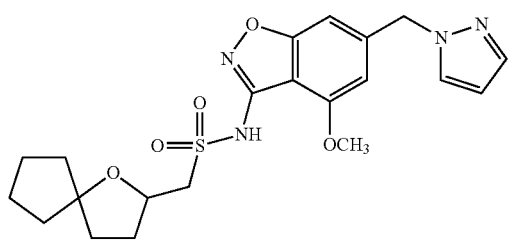<br>N-{4-methoxy-6-[(1H-pyrazol-1-yl)methyl]-1,2-benzoxazol-3-yl}-1-(1-oxaspiro[4.4]nonan-2-yl)methanesulfonamide | m/z (ESI+) 421.3 (M + H)+. |
| 110 | 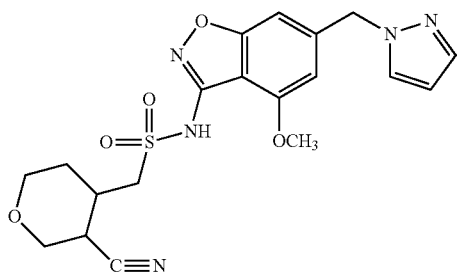<br>1-(4-cyanooxan-4-yl)-N-{4-methoxy-6-[(1H-pyrazol-1-yl)methyl]-1,2-benzoxazol-3-yl}methanesulfonamide | m/z (ESI+) 435.3 (M + H)+. |
| 111 | 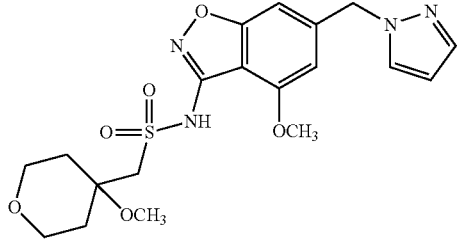<br>1-(4-methoxyoxan-4-yl)-N-{4-methoxy-6-[(1H-pyrazol-1-yl)methyl]-1,2-benzoxazol-3-yl}methanesulfonamide | m/z (ESI+) 433.3 (M + H)+. |

TABLE 3-continued

| Example Number | Structure and Name | Analytical Data |
|---|---|---|
| 112 | 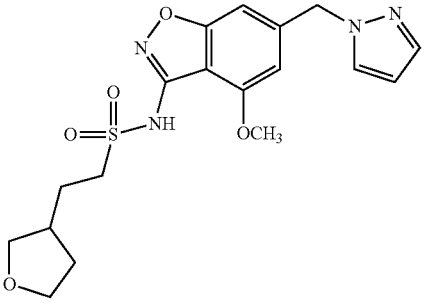<br>N-{4-methoxy-6-[(1H-pyrazol-1-yl)methyl]-1,2-benzoxazol-3-yl}-2-(oxolan-3-yl)ethane-1-sulfonamide | m/z (ESI+) 405.3 (M + H)+. |
| 113 | 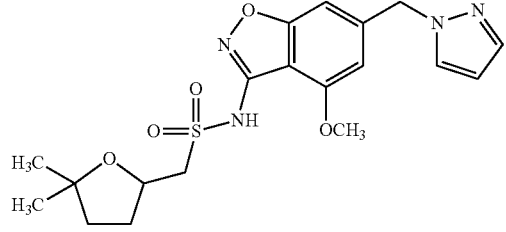<br>1-(5,5-dimethyloxolan-2-yl)-N-{4-methoxy-6-[(1H-pyrazol-1-yl)methyl]-1,2-benzoxazol-3-yl}methanesulfonamide | m/z (ESI+) 447.3 (M + H)+. |
| 114 | 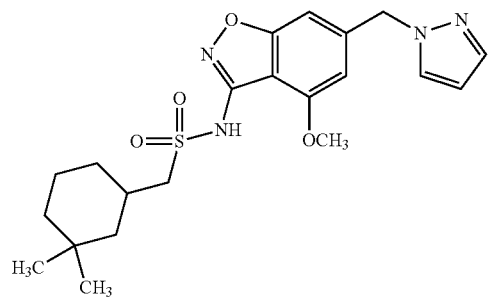<br>1-(6,6-dimethyloxan-2-yl)-N-{4-methoxy-6-[(1H-pyrazol-1-yl)methyl]-1,2-benzoxazol-3-yl}methanesulfonamide | m/z (ESI+) 432.3 (M + H)+. |
| 115 | 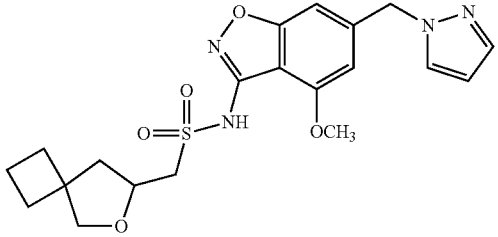<br>N-{4-methoxy-6-[(1H-pyrazol-1-yl)methyl]-1,2-benzoxazol-3-yl}-1-(6-oxaspiro[3.4]octan-7-yl)methanesulfonamide | m/z (ESI+) 437.3 (M + H)+. |

TABLE 3-continued

| Example Number | Structure and Name | Analytical Data |
|---|---|---|
| 116 | 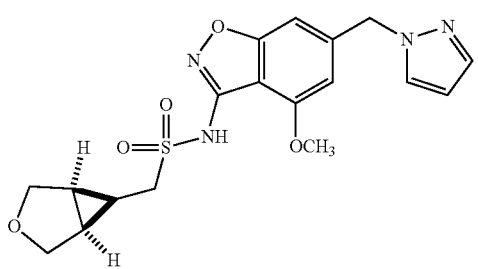<br>rac-N-{4-methoxy-6-[(1H-pyrazol-1-yl)methyl]-1,2-benzoxazol-3-yl}-1-[(1R,5S)-3-oxabicyclo[3.1.0]hexan-6-yl]methanesulfonamide | m/z (ESI+) 407.3 (M + H)+. |
| 117 | 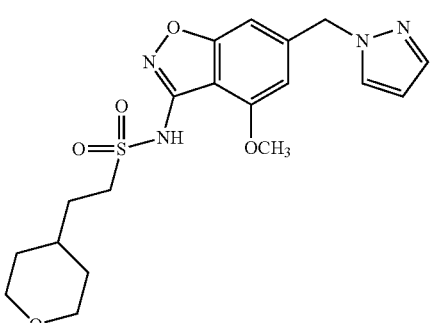<br>N-{4-methoxy-6-[(1H-pyrazol-1-yl)methyl]-1,2-benzoxazol-3-yl}-2-(oxan-4-yl)ethane-1-sulfonamide | m/z (ESI+) 421.3 (M + H)+. |
| 118 | 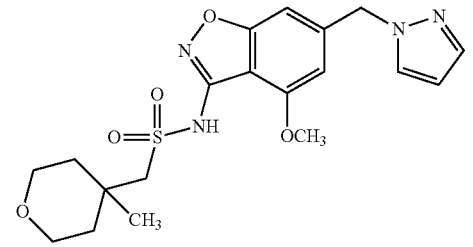<br>N-{4-methoxy-6-[(1H-pyrazol-1-yl)methyl]-1,2-benzoxazol-3-yl}-1-(4-methyloxan-4-yl)methanesulfonamide | m/z (ESI+) 421.3 (M + H)+. |

TABLE 3-continued

| Example Number | Structure and Name | Analytical Data |
|---|---|---|
| 119 | 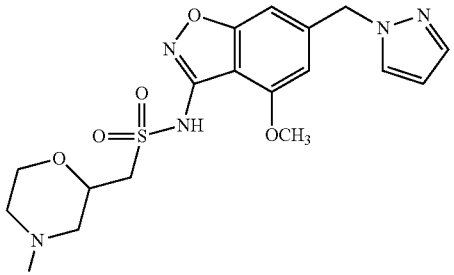<br>N-{4-methoxy-6-[(1H-pyrazol-1-yl)methyl]-1,2-benzoxazol-3-yl}-1-(4-methylmorpholin-2-yl)methanesulfonamide | m/z (ESI+) 422.3 (M + H)+. |
| 120 | 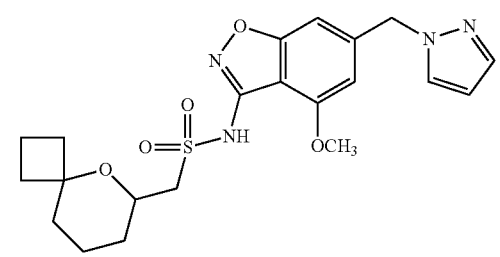<br>N-{4-methoxy-6-[(1H-pyrazol-1-yl)methyl]-1,2-benzoxazol-3-yl}-1-(5-oxaspiro[3.5]nonan-6-yl)methanesulfonamide | m/z (ESI+) 447.3 (M + H)+. |
| 121 | 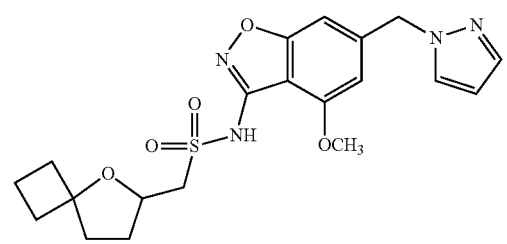<br>N-{4-methoxy-6-[(1H-pyrazol-1-yl)methyl]-1,2-benzoxazol-3-yl}-1-(5-oxaspiro[3.4]octan-6-yl)methanesulfonamide | m/z (ESI+) 433.3 (M + H)+. |
| 122 | 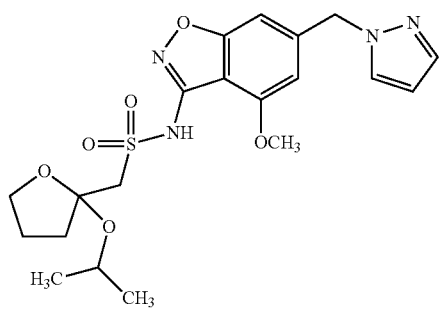<br>N-{4-methoxy-6-[(1H-pyrazol-1-yl)methyl]-1,2-benzoxazol-3-yl}-1-{3-[(propan-2-yl)oxy]oxolan-3-yl}methanesulfonamide | m/z (ESI+) 451.3 (M + H)+. |

Sulfonamide Formation Method AA:

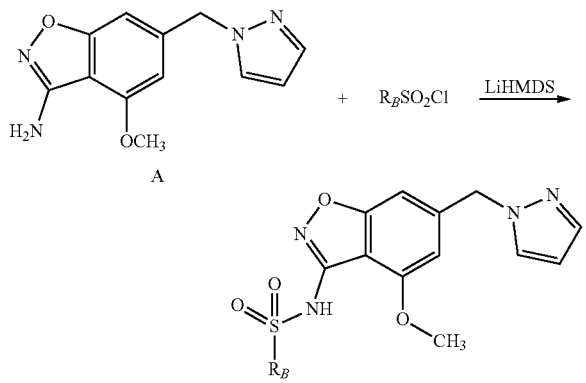

To a solution of the amine (0.5 mmol, 1.0 eq.) of Type A in anhydrous THF (10 mL) at −78° C. under $N_2$ was added LiHMDS (1 M solution in THF, 3 eq.) dropwise and the mixture was stirred at −78° C. for 30 min. A solution of the sulfonyl chloride (1.5 eq.) in anhydrous THF (2.0 mL) was then added dropwise and the mixture was allowed to warm to RT and stirred overnight. Water was added and the mixture was extracted with EtOAc. The combined organic extracts were washed with brine, dried over anhydrous $Na_2SO_4$, filtered and concentrated under reduced pressure. The residue was purified by column chromatography or prep. TLC to give the title compound. Variations to above conditions have been noted in Table 4 below.

TABLE 4

| Example | Name and Structure | Analytical | $R_BSO_2Cl$ | Notes |
|---|---|---|---|---|
| 123 | N-(6-((1H-pyrazol-1-yl)methyl)-4-methoxybenzo[d]isoxazol-3-yl)-1-cyclohexylmethane-sulfonamide | $^1$H NMR (400 MHz, DMSO-$_6$) δ 7.88 (d, J = 2.0 Hz, 1H), 7.50 (d, J = 1.6 Hz, 1H), 6.83 (s, 1H), 6.72 (s, 1H), 6.30 (t, J = 2.0 Hz, 1H), 5.44 (s, 2H), 3.89 (s, 3H), 3.29 (d, J = 5.6 Hz, 2H), 1.87-1.83 (m, 2H), 1.64-1.54 (m, 3H), 1.22-1.13 (m, 3H), 1.09-1.04 (m, 3H); m/z 405.0 [M + H]$^+$. | cyclohexyl methane-sulfonyl chloride (Int-03) | 1.5 eq. LiHMDS used; 0.5 eq. sulfonyl chloride used. Pre. TLC (Pet. ether/EtOAc = 1/2) |
| 124 | N-(6-((1H-pyrazol-1-yl)methyl)-4-methoxybenzo[d]isoxazol-3-yl)cyclohexanesulfonamide | $^1$H NMR (400 MHz, DMSO-d$_6$) δ 10.3 (br s, 1H), 7.89 (d, J = 2.0 Hz, 1H), 7.50 (s, 1H), 6.89 (s, 1H), 6.77 (s, 1H), 6.31 (s, 1H), 5.46 (s, 2H), 3.89 (s, 3H), 3.51-3.45 (m, 1H), 2.12-2.09 (m, 2H), 1.83-1.79 (m, 2H), 1.51-1.48 (m, 2H), 1.29-1.23 (m, 4H); m/z 391.0 [M + H]$^+$. | cyclohexane-sulfonyl chloride | Purified by prep. HPLC |
| 125 | N-[4-methoxy-6-(1H-pyrazol-1-ylmethyl)-1,2-benzoxazol-3-yl]pyrrolidine-1-sulfonamide | $^1$H NMR (400 MHz, DMSO-d) δ 8.16 (s, 1H), 7.80 (d, J = 8.1 Hz, 1H), 7.72 (d, J = 8.4 Hz, 1H), 7.50-7.36 (m, 2H), 7.16 (t, J = 7.5 Hz, 1H), 6.81 (s, 2H), 6.75 (d, J = 8.4 Hz, 1H), 6.77-6.70 (m, 1H), 5.77 (s, 2H), 3.85 (s, 3H), 3.74 (s, 6H); m/z 495.0 [M + H]$^+$. | pyrrolidine-1-sulfonyl chloride | Purified by prep. HPLC |

TABLE 4-continued

| Example | Name and Structure | Analytical | R_BSO_2Cl | Notes |
|---|---|---|---|---|
| 126 | 2-(cyclobutylmethoxy)-N-[4-methoxy-6-(1H-pryazol-1-ylmethyl)-1,2-benzoxazol-3-yl]ethanesulfonamide | m/z 421.3 [M + H]$^+$ | 2-cyclobutyl methoxy)ethane-1-sulfonyl chloride | Purified by prep. HPLC |
| 127 | 3-(cyclopentyloxy)-N-[4-methoxy-6-(1H-pyrazol-1-ylmethyl)-1,2-benzoxazol-3-yl]-2-methylpropane-1-sulfonamide | m/z 449.3 [M + H]$^+$ | 2-(cyclopentylmethoxy)propane-1-sulfonyl chloride | Purified by prep. HPLC |
| 128 | N-[4-methoxy-6-(1H-pyrazol-1-ylmethyl)-1,2-benzoxazol-3-yl]-2-methylpropane-1-sulfonamide | m/z 365.3 [M + H]$^+$ | 2-methylpropane-1-sulfonyl chloride | Purified by prep. HPLC |
| 129 | N-[4-methoxy-6-(1H-pyrazol-1-ylmethyl)-1,2-benzoxazol-3-yl]-2-(pyrrolidin-1-yl)ethanesulfonamide | m/z 406.3 [M + H]$^+$ | 2-(pyrrolidin-1-yl)ethane-1-sulfonyl chloride | Purified by prep. HPLC |

TABLE 4-continued

| Example | Name and Structure | Analytical | R$_B$SO$_2$Cl | Notes |
|---|---|---|---|---|
| 130 | 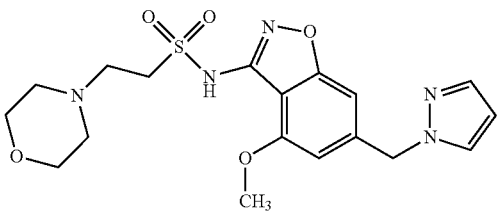<br>N-[4-methoxy-6-(1H-pyrazol-1-ylmethyl)-1,2-benzoxazol-3-yl]-2-(morpholin-4-yl)ethanesulfonamide | m/z 422.3 [M + H]$^+$ | 2-morpholin-oethane-1-sulfonyl chloride | Purified by prep. HPLC |
| 131 | 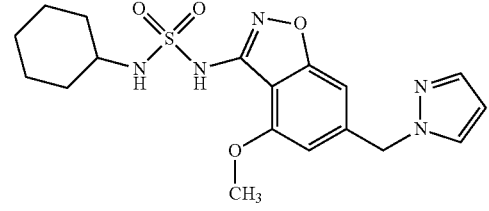<br>N-cyclohexyl-N′-[4-methoxy-6-(1H-pyrazol-1-ylmethyl)-1,2-benzoxazol-3-yl]sulfuric diamine | $^1$H NMR (400 MHz, DMSO-d$_6$) δ 9.75 (br. s, 1H), 7.89 (d, J = 1.8 Hz, 1H), 7.64 (br. s, 1H), 7.50 (d, J = 1.3 Hz, 1H), 6.85 (s, 1H), 6.74 (s, 1H), 6.31 (t, J = 2.1 Hz, 1H), 5.45 (s, 2H), 3.88 (s, 3H), 3.19 (br. s, 1H), 1.70 (br. s, 2H), 1.61 (br. s, 2H), 1.46 (br d, J = 11.5 Hz, 1H), 1.24-1.08 (m, 4H), 1.01 (br. s, 1H). | Piperidine sulfonyl chloride | Purified by prep. HPLC |
| 132 | 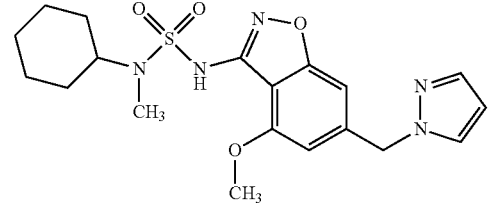<br>N-cyclohexyl-N-[4-methoxy-6-(1H-pyrazol-1-ylmethyl)-1,2-benzoxazol-3-yl]-N-methylsulfuric diamine | $^1$H NMR (400 MHz, DMSO-d$_6$) δ 9.99 (s, 1H), 7.89 (d, J = 2.3 Hz, 1H), 7.50 (d, J = 1.3 Hz, 1H), 6.86 (s, 1H), 6.75 (s, 1H), 6.31 (t, J = 2.0 Hz, 1H), 5.45 (s, 2H), 3.88 (s, 3H), 3.77-3.67 (m, 1H), 2.81 (s, 3H), 1.70 (br. d, J = 12.5 Hz, 2H), 1.63-1.49 (m, 3H), 1.45-1.33 (m, 2H), 1.23 (q, J = 2 12.7 Hz, 2H), 1.01 (q, J = 12.9 Hz, 1H); m/z 420.0 [M + H]$^+$ | cyclohexyl (methyl)sul-famoyl chloride | Purified by prep. HPLC |
| 133 | 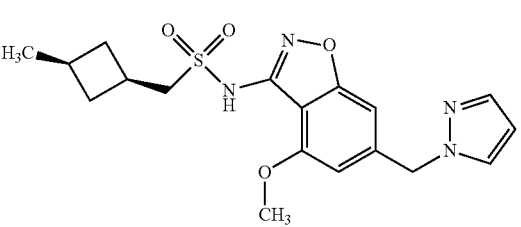<br>N-[4-methoxy-6-(1H-pyrazol-1-ylmethyl)-1,2-benzoxazol-3-yl]-1-(cis-3-methylcyclobutyl)methanesulfonamide | $^1$H NMR (400 MHz, DMSO-d$_6$) δ = 10.27 (s, 1H), 7.89 (d, J = 1.8 Hz, 1H), 7.51 (d, J = 1.3 Hz, 1H), 6.89 (s, 1H), 6.77 (s, 1H), 6.32 (t, J = 2.0 Hz, 1H), 5.47 (s, 2H), 3.90 (s, 3H), 3.53 (br d, J = 7.1 Hz, 2H), 2.32-2.14 (m, 4H), 1.41 (br d, J = 9.3 Hz, 2H), 0.98 (d, J = 6.2 Hz, 3H); m/z 391.2 [M + H]$^+$ | (3-methylcyclo-butyl)meth-anesulfon-yl chloride | Purified by prep. SFC Princeton SFC HA-Morpholine 4.6 × 150 mm 5 um column 10-50% MeOH in CO$_2$ ramping over 3.4 minutes, 160 bar, flow of 4.0 mL/min. Peak at 2.05 minutes (>98%). |

TABLE 4-continued

| Example | Name and Structure | Analytical | $R_B SO_2 Cl$ | Notes |
|---|---|---|---|---|
| 134 | 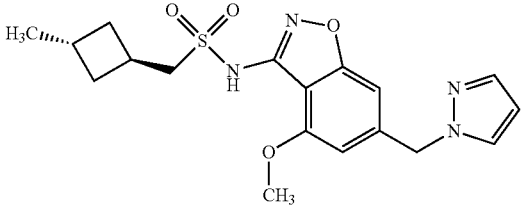<br><br>N-[4-methoxy-6-(1H-pyrazol-1-ylmethyl)-1,2-benzoxazol-3-yl]-1-(trans-3-methylcyclobutyl-methanesulfonamide | $^1$H NMR (400 MHz, DMSO-d$_6$) δ = 10.29 (s, 1H), 7.89 (d, J = 2.3 Hz, 1H), 7.51 (d, J = 1.8 Hz, 1H), 6.90 (s, 1H), 6.77 (s, 1H), 6.31 (t, J = 2.1 Hz, 1H), 5.47 (s, 2H), 3.89 (s, 3H), 3.61 (d, J = 7.3 Hz, 2H), 2.84 (br d, J = 8.1 Hz, 1H), 2.45-2.19 (m, 1H), 2.08-1.92 (m, 2H), 1.77 (ddd, J = 4.7, 8.1, 12.5 Hz, 2H), 1.08 (d, J = 6.8 Hz, 3H); m/z 391.2 [M + H]$^+$ | (3-methylcyclobutyl)methanesulfonyl chloride | Purified by prep. SFC Princeton SFC HA-Morpholine 4.6 × 150 mm 5 um column 10-50% MeOH in CO$_2$ ramping over 3.4 minutes, 160 bar, flow of 4.0 mL/min. Peak at 2.05 minutes (>98%). |

Biological Assay Section 1
KAT Assay Protocol:
  A. Compound Preparation
  1. Prepare 10 mM stock solutions in 100% DMSO from solid material
  2. Serial dilute 10 mM, 1 mM or 0.1 mM compound stocks 3-fold in 100% DMSO for 11-point dose response
  B. Reagent Preparation
  1. Prepare 1× assay buffer containing 10 mM Tris HCL pH 8.0, 2.5 mM NaCl, 0.5 mM EDTA, 0.005% BSG and 0.02% Tween-20
  2. Dilute Histone peptide (CPC Scientific) and AcCoA (Sigma) together in assay buffer to 2×.
  3. Dilute KAT enzyme in assay buffer to 2×.
  C. Enzyme Reaction
  1. Final reaction conditions for each KAT assay in a 20 ul assay reaction volume:
    i. KAT6A 15 nM, 1 uM AcCoA, 2 uM H3 1-21 peptide, 45-minute reaction
  2. Add 0.5 ul of diluted compound to the assay plate (384-well V-bottom polypropylene plates) or 0.5 ul of DMSO for control wells.
  3. Add 10 ul of 2× Histone peptide/2× AcCoA mix to the assay plate.
  4. Add 10 ul of 2× enzyme to the assay plate.
  5. Stop the reaction after the indicated time with the addition of 2 ul of 5% formic acid
  6. Each reaction was analyzed using self-assembled monolayer desorption/ionization time-of-flight mass spectrometry (Mrksich, Milan (2008) Mass Spectrometry of Self-Assembled Monolayers: A New Tool for Molecular Surface Science ACS Nano 2008 2 (1), 7-18; SAMDI Tech, Inc. (Chicago, IL)).
  7. Area under the curve (AUC) for both substrate and product peaks was determined for KAT6A at M.W. 2723 [Substrate+H]$^+$ and 2765 [Product+H]$^+$ with a +/−1 Da tolerance, respectively.
  8. Percent conversion to product was calculated by: $AUC_{Product}/(AUC_{Substrate}+AUC_{Product})$.
  D. Data Analysis
  1. IC$_{50}$ values were determined by fitting the % conversion at each inhibitor concentration to the 4-parameter IC$_{50}$ equation using Pfizer proprietary curve fitting software.
  2. K$_i$ values were determined by fitting the % conversion at each inhibitor concentration to the Morrison equation for tightbinding competitive inhibitors using Pfizer proprietary curve fitting software.

Materials

KAT enzymes were expressed using a baculovirus expression system and purified at Pfizer, La Jolla. Histone H3 (1-21) peptide (ARTKQTARKSTGGKAPRKQLA, SEQ ID NO:3) was purchased from CPC Scientific (Sunnyvale, CA). Acetyl coenzyme A was purchased from Sigma-Aldrich (St. Louis, MO). All other biochemical reagents were purchased from Sigma-Aldrich or ThermoFisher Scientific (Waltham, MA).

KAT Reactions

KAT assays were performed at room temperature in assay buffer containing 1 μM AcCoA, 2 μM histone peptide, 10 mM Tris HCL pH 8.0, 2.5 mM NaCl, 0.5 mM EDTA, 0.005% BSG and 0.02% Tween-20. 10 ul of 2× Histone peptide/AcCoA mix was added to a 384-well V-bottom polypropylene assay plate containing 0.5 ul of serially diluted test compound in 100% dimethyl sulfoxide (DMSO). To start the reaction, 10 ul of 2× enzyme solution was added to the assay plate. KAT assays were terminated after 30-60 minutes with the addition of 2 ul of 5% formic acid. KAT6A used histone H3 (1-21) peptide. The final enzyme concentration for KAT6A was 15 nM. Each reaction was analyzed using self-assembled monolayer desorption/ionization time-of-flight mass spectrometry (Mrksich, Milan (2008) Mass Spectrometry of Self-Assembled Monolayers: A New Tool for Molecular Surface Science ACS Nano 2008 2 (1), 7-18; SAMDI Tech, Inc. (Chicago, IL)).

Data Processing and Analysis

Area under the curve (AUC) for both substrate and product peaks was determined for KAT6A at M.W. 2723 [Substrate+H]$^+$ and 2765 [Product+H]$^+$ with a +/−1 Da tolerance, respectively. Percent conversion to product was calculated by: $AUC_{Product}/(AUC_{Substrate}+AUC_{Product})$. IC50 values were determined by fitting the % conversion at each inhibitor concentration to the 4-parameter IC50 equation using Pfizer proprietary curve fitting software. Ki values were determined by fitting the % conversion at each inhibitor concentration to the Morrison equation for tightbinding competitive inhibitors using Pfizer proprietary curve fitting software.

KAT6a % inhibition, IC50 and Ki's are provided in Table 5 below.

TABLE 5

| Example No. | KAT6A % inhibition at 1 µM | KAT6A IC$_{50}$ at 1 µM AcCoA (nM) | KAT6A K$_i$ at 10 µM AcCoA (nM) |
|---|---|---|---|
| 1 | 88 | 117 | N/D |
| 2 | N/D | 270 | N/D |
| 3 | N/D | 301 | N/D |
| 4 | N/D | 349 | N/D |
| 5 | N/D | 323 | N/D |
| 6 | N/D | 371 | N/D |
| 7 | 51 | N/D | 177 |
| 8 | 77 | N/D | N/D |
| 9 | 91 | N/D | 60.1 |
| 10 | 48 | N/D | 89.4 |
| 11 | 45 | N/D | 371 |
| 12 | 59 | N/D | 199 |
| 13 | N/D | N/D | 224 |
| 14 | N/D | N/D | 160 |
| 15 | 71 | N/D | N/D |
| 16 | 81 | N/D | N/D |
| 17 | 83 | N/D | 82.4 |
| 18 | 83 | N/D | 71.9 |
| 19 | 81 | N/D | 65.3 |
| 20 | N/D | N/D | 36.5 |
| 21 | 84 | N/D | 34.5 |
| 22 | 60 | N/D | 33.2 |
| 23 | 92 | N/D | 31.6 |
| 24 | 93 | N/D | 19.5 |
| 25 | 87 | N/D | 16.5 |
| 26 | 71 | N/D | N/D |
| 27 | N/D | N/D | 13.8 |
| 28 | N/D | N/D | 14.2 |
| 29 | 103 | N/D | 13.1 |
| 30 | 98 | N/D | 7.32 |
| 31 | 93 | N/D | 4.94 |
| 32 | 108 | N/D | 4.88 |
| 33 | 65 | N/D | N/D |
| 34 | 46 | N/D | N/D |
| 35 | 40 | N/D | N/D |
| 36 | 51 | N/D | N/D |
| 37 | 98 | N/D | N/D |
| 38 | 92 | N/D | N/D |
| 39 | 52 | N/D | N/D |
| 40 | 58 | N/D | N/D |
| 41 | 91 | N/D | N/D |
| 42 | 50 | N/D | N/D |
| 43 | 66 | N/D | N/D |
| 44 | 89 | N/D | N/D |
| 45 | 108 | N/D | N/D |
| 46 | 103 | N/D | N/D |
| 47 | 68 | N/D | N/D |
| 48 | 55 | N/D | N/D |
| 49 | 87 | N/D | N/D |
| 50 | 87 | N/D | N/D |
| 51 | 65 | N/D | N/D |
| 52 | 66 | N/D | 127 |
| 53 | 97 | N/D | N/D |
| 54 | 82 | N/D | N/D |
| 55 | 64 | N/D | N/D |
| 56 | 71 | N/D | N/D |
| 57 | 104 | N/D | 13.9 |
| 58 | 87 | N/D | N/D |
| 59 | 48 | N/D | N/D |
| 60 | 42 | N/D | N/D |
| 61 | 55 | N/D | N/D |
| 62 | 97 | N/D | N/D |
| 63 | 48 | N/D | N/D |
| 64 | 92 | N/D | 28.0 |
| 65 | 95 | N/D | N/D |
| 66 | 88 | N/D | N/D |
| 67 | 104 | N/D | N/D |
| 68 | 91 | N/D | N/D |
| 69 | 78 | N/D | N/D |
| 70 | 80 | N/D | N/D |
| 71 | 72 | N/D | N/D |
| 72 | 70 | N/D | N/D |
| 73 | 96 | N/D | N/D |
| 74 | 92 | N/D | N/D |
| 75 | 91 | N/D | N/D |
| 76 | 90 | N/D | N/D |
| 77 | N/D | N/D | 15.5 |
| 78 | 77 | N/D | 45.8 |
| 79 | 106 | N/D | N/D |
| 80 | 60 | N/D | N/D |
| 81 | 41 | N/D | N/D |
| 82 | 61 | N/D | N/D |
| 83 | 85 | N/D | N/D |
| 84 | 62 | N/D | N/D |
| 85 | 36 | N/D | 1342 |
| 86 | 77 | N/D | 107 |
| 87 | 73 | N/D | 100.1 |
| 88 | N/D | N/D | 99.4 |
| 89 | 84 | N/D | 87.3 |
| 90 | 83 | N/D | 66.2 |
| 90 | N/D | N/D | 58.1 |
| 91 | 53 | N/D | N/D |
| 92 | 40 | N/D | N/D |
| 93 | 59 | N/D | N/D |
| 94 | 76 | N/D | N/D |
| 95 | 57 | N/D | N/D |
| 96 | 58 | N/D | N/D |
| 97 | 83 | N/D | N/D |
| 98 | 41 | N/D | N/D |
| 99 | 83 | N/D | N/D |
| 100 | 69 | N/D | N/D |
| 101 | 65 | N/D | N/D |
| 102 | 70 | N/D | 116 |
| 103 | 75 | N/D | N/D |
| 104 | 80 | N/D | N/D |
| 105 | 101 | N/D | N/D |
| 106 | 48 | N/D | N/D |
| 107 | 83 | N/D | N/D |
| 108 | 67 | N/D | N/D |
| 109 | 12 | N/D | N/D |
| 110 | 51 | N/D | N/D |
| 111 | 83 | N/D | N/D |
| 112 | 68 | N/D | N/D |
| 113 | 57 | N/D | N/D |
| 114 | 72 | N/D | N/D |
| 115 | 64 | N/D | N/D |
| 116 | 108 | N/D | N/D |
| 117 | 91 | N/D | N/D |
| 118 | 56 | N/D | N/D |
| 119 | 58 | N/D | N/D |
| 120 | 35 | N/D | N/D |
| 121 | 75 | N/D | N/D |
| 122 | 85 | 38.4 | 14.9 |
| 123 | 85 | 28.9 | 5.44 |
| 124 | 88 | 117 | N/D |
| 125 | N/D | 136 | N/D |
| 126 | N/D | 133 | N/D |
| 127 | N/D | 36 | N/D |
| 128 | N/D | 128 | N/D |
| 129 | 16 | N/D | N/D |
| 130 | N/D | 187 | N/D |
| 131 | N/D | 6 | 3 |
| 132 | N/D | 9 | 4 |
| 133 | N/D | 40 | N/D |
| 134 | N/D | 40 | N/D |

Biological Assay Section 2
Protein Preparation
KAT5

Molecular Biology: A codon optimized DNA sequence (for expression in *Escherichia coli*) encoding amino acid residues 2 to 461 (Uniprot Q92993-2) of human KAT5 isoform was synthesised by GenScript USA Inc (Piscataway, New Jersey, USA). This was ligated into a modified pET43a *E. coli* expression vector designed to encode an N-terminal hexahistidine tag followed by a tobacco etch virus protease (TEV) cleavage site and by the KAT5 sequence. The resulting protein sequence is listed below (SEQ ID NO:4).

```
MGHHHHHHGTENLYFQGSAEVGEIIEGCRLPVLRRNQDNEDEWPLAEILS

VKDISGRKLFYVHYIDFNKRLDEWVTHERLDLKKIQFPKKEAKTPTKNGL

PGSRPGSPEREVKRKVEVVSPATPVPSETAPASVFPQNGAARRAVAAQPG

RKRKSNCLGTDEDSQDSSDGIPSAPRMTGSLVSDRSHDDIVTRMKNIECI

ELGRHRLKPWYFSPYPQELTTLPVLYLCEFCLKYGRSLKCLQRHLTKCDL

RHPPGNEIYRKGTISFFEIDGRKNKSYSQNLCLLAKCFLDHKTLYYDTDP

FLFYVMTEYDCKGFHIVGYFSKEKESTEDYNVACILTLPPYQRRGYGKLL

IEFSYELSKVEGKTGTPEKPLSDLGLLSYRSYWSQTILEILMGLKSESGE

RPQITINEISEITSIKKEDVISTLQYLNLINYYKGQYILTLSEDIVDGHE

RAMLKRLLRIDSKCLHFTPKDWSKRGKWAS*
```

Protein Expression: To produce recombinant KAT5 protein, expression plasmid was transformed into E. coli BL21 DE3 strain and grown with shaking at 37° C. in 1 L volumes of Terrific broth (TB) supplemented with 100 μg/mL Ampicillin and 50 μM zinc until an OD600 of 0.8 was reached. Cultures were transferred to 18° C. and protein expression induced by the addition of Isopropyl β-D-1-thiogalactopyranoside to a final concentration of 0.5 mM and the cultures shaken overnight for further 16 hours. Following expression, cell cultures were centrifuged at 5000×g for 20 min and cell pellet stored frozen at −20° C.

Protein Purification: Protein purification was initiated by thawing the cell pellet (25 g wet weight) in Lysis buffer (50 mM Hepes pH 7.4, 500 mM NaCl, 5 mM imidazole, 5% [v/v] glycerol, 0.1% [w/v] CHAPS, 2 mM 2-mercaptoethanol, 3 mM $MgCl_2$, 0.5 mg/mL lysozyme, benzonase endonuclease [EMD Millipore], 1 mM PMSF, complete protease inhibitor tablets EDTA-free [Roche]) using a ratio of 6 mL of buffer per 1 g of cells. Cells were further lysed by sonication using a Misonix Liquid Processor (6×30 second pulses, amplitude 60 [70 watts]) and then centrifuged at 48,000×g at 4° C. Supernatant (cell lysate) was mixed with 20 mL of Q-Sepharose FF resin (GE Healthcare) pre-equilibrated with Q buffer (20 mM Hepes pH 7.4, 1 M NaCl). The unbound fraction from Q-Sepharose FF was then incubated with 5 mL of cOmplete His-Tag Purification Resin (Roche), pre-equilibrated with IMAC Wash Buffer (20 mM hepes pH 7.4, 500 mM NaCl, 35 mM imidazole). The resin was washed with IMAC Wash Buffer, and bound KAT5 eluted with IMAC Elution buffer (20 mM hepes pH 7.4, 500 mM NaCl, 300 mM imidazole). IMAC-eluted protein was immediately desalted into Storage buffer (50 mM Na citrate pH 6.5, 500 mM NaCl, 5% [v/v] glycerol) using 2× HiPrep 26/10 desalting columns (GE Healthcare) in series. Desalted protein was further purified by passing through a HiLoad 26/60 Superdex 75 column pre-equilibrated in Storage buffer. Finally, KAT5 protein was concentrated to 1.5 mg/mL using Amicon Ultra centrifugal filter unit (Utra-15 MWCO 10 kDa), flash-frozen in liquid nitrogen and stored in −70° C. freezer.

KAT6A

Molecular Biology: The DNA sequence encoding amino acid residues 507 to 778 (Uniprot O92794-1) of human KAT6A was amplified by PCR and was ligated into a modified pET E. coli expression vector designed to encode a NusA solubility tag followed by a hexahistidine tag and a tobacco etch virus protease (TEV) cleavage site and by the KAT6A sequence. The resulting protein sequence is listed below (SEQ ID NO:5).

```
MNKEILAVVEAVSNEKALPREKIFEALESALATATKKKYEQEIDVRVOID

RKSGDFDTFRRWLVVDEVTQPTKEITLEAARYEDESLNLGDYVEDQIESV

TFDRITTQTAKQVIVQKVREAERAMVVDQFREHEGEIITGVVKKVNRDNI

SLDLGNNAEAVILREDMLPRENFRPGDRVRGVLYSVRPEARGAQLFVTRS

KPEMLIELFRIEVPEIGEEVIEIKAAARDPGSRAKIAVKTNDKRIDPVGA

CVGMRGARVQAVSTELGGERIDIVLWDDNPAQFVINAMAPADVASIVVDE

DKHTMDIAVEAGNLAQAIGRNGQNVRLASQLSGWELNVMTVDDLQAKHQA

EAHAAIDTFTKYLDIDEDFATVLVEEGFSTLEELAYVPMKELLEIEGLDE

PTVEALRERAKNALATIAQAQEESLGDNKPADDLLNLEGVDRDLAFKLAA

RGVCTLEDLAEQGIDDLADIEGLTDEKAGALIMAARNICWFGDEATSGSG

HHHHHHSAGENLYFQGAMGRCPSVIEFGKYEIHTWYSSPYPQEYSRLPKL

YLCEFCLKYMKSRTILQQHMKKCGWFHPPVNEIYRKNNISVFEVDGNVST

IYCQNLCLLAKLFLDHKTLYYDVEPFLFYVLTQNDVKGCHLVGYFSKEKH

CQQKYNVSCIMILPQYQRKGYGRFLIDFSYLLSKREGQAGSPEKPLSDLG

RLSYMAYWKSVILECLYHQNDKQISIKKLSKLTGICPQDITSTLHHLRML

DFRSDQFVIIRREKLIQDHMAKLQLNLRPVDVDPECLRWTP
```

Protein Expression: To produce recombinant KAT6A protein, expression plasmid was transformed into E. coli BL21 DE3 strain and grown with shaking at 37° C. in 1 L volumes of Terrific broth (TB) supplemented with 100 μg/mL Ampicillin until an OD600 of 0.8 was reached. Cultures were transferred to 18° C. and protein expression induced by the addition of Isopropyl β-D-1-thiogalactopyranoside to a final concentration of 0.5 mM and the cultures shaken overnight for further 16 hours. Following expression, cell cultures were centrifuged at 5000×g for 20 min and cell pellet stored frozen at −20° C.

Protein Purification: Protein purification was initiated by thawing the cell pellet (40 g wet weight) in Lysis buffer (25 mM Tris-HCl pH 7.8, 500 mM NaCl, 5 mM DTT, 0.01% [v/v] Triton-X 100, 5% [v/v] glycerol, 2 mM $MgCl_2$, 10 mM Imidazole, 0.5 mg/mL lysozyme, benzonase endonuclease [EMD Millipore], 1 mM PMSF, complete protease inhibitor tablets EDTA-free [Roche]) using a ratio of 5 mL of buffer per 1 g of cells. Cells were further lysed by 3 passes (at 15000 psi) through an ice cooled Avestin $C_5$ cell crusher and then centrifuged at 48,000×g at 4° C. Supernatant (cell lysate) was filtered through a 5 μm filter and applied onto 5 mL HiTrap IMAC Sepharose FF column (GE Healthcare) pre-equilibrated with IMAC wash buffer (25 mM Tris-HCl pH 7.8, 500 mM NaCl, 5 mM DTT, 0.01% [v/v] Triton-X 100, 5% [v/v] glycerol, 20 mM Imidazole) using a Profinia Affinity chromatography purification system (Bio-Rad). The IMAC column was then washed with IMAC Wash buffer and bound KAT6A protein eluted with IMAC Elution buffer (25 mM Tris-HCl pH 7.8, 500 mM NaCl, 5% [v/v] glycerol, 5 mM DTT, 250 mM Imidazole). IMAC-eluted protein was further purified by passing through a HiLoad 26/60 Superdex 200 column pre-equilibrated in Storage buffer (25 mM Tris-HCl pH 7.8, 500 mM NaCl, 5 mM DTT, 5% [v/v] glycerol). Finally, KAT6A protein was concentrated to ≤1 mg/mL using Amicon Ultra centrifugal filter unit (Utra-15 MWCO 10 kDa), flash-frozen in liquid nitrogen and stored in −70° C. freezer.

KAT7

Molecular Biology: A codon optimized DNA sequence encoding amino acid residues 325 to 611 (Uniprot O95251-1) of human KAT7 was synthesised by GenScript USA Inc (Piscataway, New Jersey, USA). This was ligated into a modified pET43a E. coli expression vector designed to encode an N-terminal hexahistidine tag followed by a tobacco etch virus protease (TEV) cleavage site and by the KAT7 sequence. The resulting protein sequence is listed below (SEQ ID NO:6).

MGHHHHHHGTENLYFQGSRLQGQITEGSNMIKTIAFGRYELDTWYHSPYP

EEYARLGRLYMCEFCLKYMKSQTILRRHMAKCVWKHPPGDEIYRKGSISV

FEVDGKKNKIYCQNLCLLAKLFLDHKTLYYDVEPFLFYVMTEADNTGCHL

IGYFSKEKNSFLNYNVSCILTMPQYMRQGYGKMLIDFSYLLSKVEEKVGS

PERPLSDLGLISYRSYWKEVLLRYLHNFQGKEISIKEISQETAVNPVDIV

STLQALQMLKYWKGKHLVLKRQDLIDEWIAKEAKRSNSNKTMDPSCLKWT

PPKGTAS

Protein Expression: To produce recombinant KAT7 protein, expression plasmid was transformed into E. coli BL21 DE3 RIL strain and grown with shaking at 37° C. in 1 L volumes of Terrific broth (TB) supplemented with 100 µg/mL Ampicillin and 50 µM zinc until an OD600 of 0.8 was reached. Cultures were transferred to 18° C. and protein expression induced by the addition of Isopropyl β-D-1-thiogalactopyranoside to a final concentration of 0.5 mM and the cultures shaken overnight for further 16 hours. Following expression, cell cultures were centrifuged at 5000×g for 20 min and cell pellet stored frozen at −20° C.

Protein Purification: Protein purification was initiated by thawing the cell pellet (10 g wet weight) in Lysis buffer (50 mM Hepes pH 7.5, 300 mM NaCl, 5 mM DTT, 5 mM Imidazole, 0.05% [v/v] Brij 35, 10% [v/v] glycerol, 3 mM $MgCl_2$, 0.5 mg/mL lysozyme, benzonase endonuclease [EMD Millipore], 1 mM PMSF, complete protease inhibitor tablets EDTA-free [Roche]) using a ratio of 10 mL of buffer per 1 g of cells. Cells were further lysed by sonication using a Misonix Liquid Processor (6×30 second pulses, amplitude 60 [70 watts]) and then centrifuged at 48,000×g at 4° C. Supernatant (cell lysate) was incubated with 1 mL of cOmplete His-Tag Purification Resin (Roche), pre-equilibrated with IMAC Wash Buffer 1 (25 mM Hepes pH 7.5, 800 mM NaCl, 5 mM imidazole, 10% [v/v] glycerol, 5 mM DTT, 0.01% [v/v] Brij 35, 50 mM arginine, 50 mM glutamic acid). The resin was sequentially washed with IMAC Wash buffer 1 and IMAC Wash buffer 2 (25 mM hepes pH 7.5, 300 mM NaCl, 20 mM imidazole, 10% [v/v] glycerol, 5 mM DTT, 0.01% [v/v] Brij 35, 50 mM arginine, 50 mM glutamic acid). Bound KAT7 protein was eluted with IMAC Elution buffer (25 mM hepes pH 7.5, 200 mM NaCl, 500 mM imidazole, 10% [v/v] glycerol, 5 mM DTT 0.01% [v/v] Brij 35, 50 mM arginine, 50 mM glutamic acid). The eluting protein was collected directly into 4 volumes of Desalt Buffer (50 mM Na citrate pH 6.5, 200 mM NaCl, 0.01% [v/v] Brij 35, 10% [v/v] glycerol, 5 mM DTT) to bring the final imidazole concentration to 100 mM. IMAC-eluted protein was immediately desalted into Desalt buffer using 2×HiPrep 26/10 desalting columns (GE Healthcare) in series. Desalted protein was further purified by passing through a HiLoad 26/60 Superdex 75 column pre-equilibrated in Storage Buffer (50 mM Na citrate pH 6.5, 200 mM NaCl, 10% [v/v] glycerol, 5 mM DTT). Finally, KAT7 protein was concentrated to 3.5 mg/mL using Amicon Ultra centrifugal filter unit (Utra-15 MWCO 10 kDa), flash-frozen in liquid nitrogen and stored in −70° C. freezer.

Acetyltransferase Biochemical Assay

To determine the inhibition of KAT enzymatic activity by test compounds, assay reactions were conducted in a volume of 8 µL in 384-well low volume assay plates. The reactions were performed in assay buffer (100 mM Tris-HCl, pH 7.8, 15 mM NaCl, 1 mM EDTA, 0.01% Tween-20, 1 mM Dithiothreitol, and 0.01% m/v chicken egg white albumin).

Reactions were set up with 1 µM Acetyl coenzyme A, 100 nM of full-length recombinant histone labelled by limited biotinylation (KAT6A, KAT7: H3.1, KAT5), 10/5/8/40/20 nM of KAT5/KAT6A/KAT7 enzyme respectively, and an acetyl-lysine specific antibody (H3.1: Cell Signaling Technology, H4: Abcam). 11-point dilution series of the test compounds were prepared in DMSO; a volume of 100 nL was transferred using a pin tool into assay plates containing substrates, before adding enzyme to start the reaction. Positive (no compound, DMSO only) and negative (AcCoA omitted) control reactions were included on the same plates and received the same amount of DMSO as the compound treated wells. After adding all reagents, the plates were sealed with adhesive seals and incubated for 90 min at room temperature. An additional 4 µL of assay buffer containing AlphaScreen® Protein A acceptor beads and Streptavidin donor beads (PerkinElmer, Waltham, MA) to a final concentration of 8 µg/mL was then added. After incubation for 2 hours the plates were read using an EnVision 2103 multi label plate reader (PerkinElmer) in HTS AlphaScreen® mode. IC50 values were obtained from the raw readings by calculating percent inhibition (% I) for each reaction relative to controls on the same plate (% I=(I−CN)/(CP−CN) where CN/CP are the averages of the negative/positive reactions, respectively), then fitting the % I data vs. compound concentration [I] to % I=(A+((B−A)/(1+((C/[1])^D)))) where A is the lower asymptote, B is the upper asymptote, C is the IC50 value, and D is the slope.

The results are shown in the Table 6 below:

TABLE 6

| Example | TIP60-KAT5 IC50 (µM) | MOZ-KAT6A IC50 (µM) | HBO1-KAT7 IC50 (µM) |
|---|---|---|---|
| 123 | = 9.04 | = 0.015 | = 1.26 |
| 124 | = 2.40 | = 0.03 | = 0.44 |

REFERENCES

Aggarwal and Calvi, Nature, 2004, 430, 372-376 doi: 10.1038/nature02694

Avvakumov et al., Oncogene, 2007, 26, 5395-5407 doi: 10.1038/sj.onc.1210608

Berge et al., J. Pharm. Sci., 1977, 66, 1-19 doi:10.1002/jps.2600660104

Borrow et al., Nat. Genet., 1996, 14, 33-41 doi:10.1038/ng0996-33

Dekker et al., Drug, Discov. Today, 2014, 19, 654-660 doi:10.1016/j.drudis.2013.11.012

Doyon et al., Mol. Cell., 2006, 21, 51-64 doi:10.1016/j.molcel.2005.12.007

Dhuban et al., *Sci. Immunol.*, 2017, 2, 9297 doi:10.1126/sciimmunol.aai9297

Duong et al., *Cancer Res.*, 2013, 73, 5556-5568 doi: 10.1158/0008-5472.CAN-13-0013

Ghizzoni et al., *Eur. J. Med. Chem.*, 2012, 47, 337-344 doi:10.1016/j.ejmech.2011.11.001

Gil et al., *J. Proteomics*, 2017, 150, 297-309 doi:10.1016/j.jprot.2016.10.003

Gobert, M. et al., *Cancer Research*, 2009, 69, 2000-2009 doi:10.1158/0008-5472.CAN-08-2360

Holbert et al., *J. Biol. Chem.*, 2007, 282, 36603-36613 doi:10.1074/jbc.M705812200

Iizuka et al., *Mol. Cell. Biol.*, 2006, 26, 1098-1108 doi: 10.1128/MCB.26.3.1098-1108.2006

Iizuka et al., *Cancer Sci.*, 2013, 104, 1647-1655 doi: 10.1111/cas.12303

Jeong, et al., *Blood Res* 2016 51(3), 152-154 doi:10.5045/br.2016.51.3.152

Joshi, et al., *Immunity* 2015, 43, 579-590 doi:10.1016/j.immuni.2015.08.006

Li, B. et al., *PNAS*, 2007, 104, 4571-4576 doi:10.1073/pnas.0700298104

Melero, et al., *Nature Reviews Cancer*, 2015, 15, 457-472 doi:10.1038/nrc3973

Merson et al., *J. Neurosci.*, 2006, 26, 11359-11370 doi: 10.1523/JNEUROSCI.2247-06.2006

Miller, A. M. et al. *J. Immunol.*, 2006, 177, 7398-7405 doi:10.4049/jimmunol.177.10.7398

Persa, E. et al. *Cancer Letters*, 2015 368(2), 252-261 doi: 10.1016/j.canlet.2015.03.003

Sheikh et al., *Blood*, 2015, 125(12), 1910-21 doi:10.1182/blood-2014-08-594655

Shi et al, *Nature Biotech*, 2015, 33, 661-667 doi:10.1038/nbt.3235

Su et al., *Int. J. Mol. Sci.*, 2016, 17, 1-18 doi:10.3390/ijms17101594

Stern et al., *Crit. Rev. Oncol. Hematot*, 2005, 54, 11-29 doi:10.1016/j.critrevonc.2004.10.011

Thomas et al., *Development*, 2000, 127, 2537-2548 PMID: 10821753

Tao, H. et al., *Lung Cancer*, 2012, 75, 95-101 doi:10.1016/j.lungcan.2011.06.002

Turner-Ivey et al., *Neoplasia*, 2014, 16(8): 644-655 doi: 10.1016/j.neo.2014.07.007

Valerio et al., *Cancer Research*, 2017, 77(7), 1753-62 doi: 10.1158/0008-5472.CAN-16-2374

Vizmanos et al., *Genes Chromosomes Cancer*, 2003, 36(4), 402-405 doi:10.1002/gcc.10174

Voss et al., *BioEssays*, 2009, 31(10), 1050-1061 doi: 10.1002/bies.200900051

Wang, L., et al. *EBioMedicine*, 2016, 13, 99-112 doi: 10.1016/j.ebiom.2016.10.018

Wang, X. et al., *Oncogene*, 2017, 36, 3048-3058 doi: 10.1038/onc.2016.458

Xiao, Y. et al., *Cell reports*, 2014, 7, 1471-1480 doi:10.1016/j.celrep.2014.04.021

Yan, M. et al., *Breast Cancer Research*, 2011, 13, R47 doi:10.1186/bcr2869

Zack et al., *Nature Genetics* 2013 45, 1134-1140 doi: 10.1038/ng.2760

Zhang et al., *Mini. Rev. Med. Chem.*, 2017, 17, 1-8 doi: 10.2174/1389557516666160923125031

---

What is claimed is:

1. A compound of formula (I)

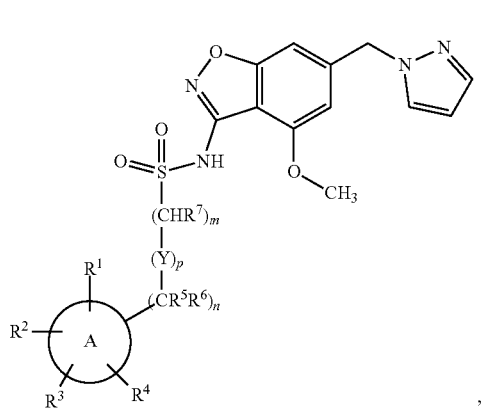

or a pharmaceutically acceptable salt thereof,
wherein
Ring A is absent, $C_3$-$C_9$ cycloalkyl or 4-9 membered heterocycloalkyl, provided that when Ring A is absent, p is 0;
Y is O or $NR^8$,
provided that when Y is $NR^8$, both of m and n are 0;
$R^1$ is hydrogen, fluoro, cyano, $C_1$-$C_3$ alkyl, —$CH_2CN$, —$CH_2F$, —$CHF_2$, —$CF_3$, oxo, $C_1$-$C_3$ alkoxy, —$CH_2OCH_3$, —$C(O)CH_3$, —$C(O)OCH_2$-phenyl, —$S(O)_2CH_3$, or phenyl, wherein the phenyl is optionally substituted by fluoro;
$R^2$, $R^3$, and $R^4$ are each independently selected from the group consisting of hydrogen, fluoro, and methyl;
$R^5$ is hydrogen, methyl, or methoxy;
each $R^6$, $R^7$ and $R^8$ are hydrogen or methyl;
m is 0, 1, 2 or 3; and
n is 0 or 1; and
p is 0 or 1.

2. The compound or salt of claim 1, wherein Ring A is absent and p is 0.
3. The compound or salt of claim 1, wherein Y is O.
4. The compound or salt of claim 1, wherein Y is $NR^8$, m is 0 and n is 0.
5. The compound or salt of claim 1, wherein p is 1.
6. The compound or salt of claim 1, wherein m is 2, n is 1, and p is 1.

7. The compound or salt of claim 1, having formula (II)

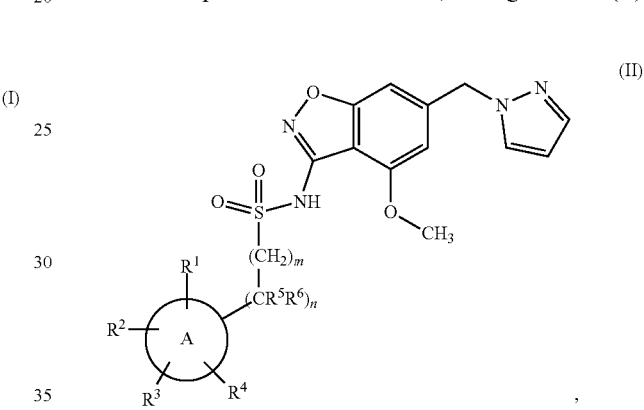

wherein
Ring A is $C_3$-$C_9$ cycloalkyl or 4-9 membered heterocycloalkyl;
$R^1$ is hydrogen, fluoro, cyano, $C_1$-$C_3$ alkyl, —$CH_2CN$, —$CH_2F$, —$CHF_2$, —$CF_3$, oxo, $C_1$-$C_3$ alkoxy, —$CH_2OCH_3$, —$C(O)CH_3$, —$C(O)OCH_2$-phenyl, —$S(O)_2CH_3$, or phenyl, wherein the phenyl is optionally substituted by fluoro;
$R^2$, $R^3$, and $R^4$ are each independently selected from the group consisting of hydrogen, fluoro, and methyl;
$R^5$ is hydrogen, methyl, or methoxy;
$R^6$ is hydrogen or methyl;
m is 0, 1 or 2; and
n is 0 or 1.

8. The compound or salt of claim 7, wherein Ring A is 3-6 membered cycloalkyl or 5-6 membered heterocycloalkyl.
9. The compound or salt of claim 7, wherein Ring A is cyclopropyl, cyclobutyl, cyclopentyl, cyclohexyl, cycloheptanyl, cyclooctanyl, azetidinyl, tetrahydrofuranyl, tetrahydropyranyl, piperidinyl, morpholinyl, bicyclo[2.2.2]octanyl, bicyclo[3.1.0]hexanyl, bicyclo[2.2.1]heptanyl, spiro[2.2]pentanyl, spiro[3.3]heptanyl, 1-azabicyclo[2.2.1]heptanyl, 1-oxaspiro[4.4]nonanyl, 6-oxaspiro[3.4]octanyl, 3-oxabicyclo[3.1.0]hexanyl, 5-oxaspiro[3.5]nonanyl, or 5-oxaspiro[3.4]octane.
10. The compound or salt of claim 7, wherein Ring A is cyclopropyl, cyclobutyl, cyclopentyl, or cyclohexyl.
11. The compound or salt of claim 7, wherein $R^1$ is hydrogen, fluoro, methyl, ethyl, methoxy, or ethoxy.
12. The compound or salt of claim 7, wherein $R^1$ is hydrogen, fluoro, or methyl.

13. The compound or salt of claim 7, wherein $R^1$ is fluoro, $R^2$ is fluoro, $R^3$ is hydrogen, and $R^4$ is hydrogen.

14. The compound or salt of claim 7, wherein $R^1$ is fluoro, $R^2$ is hydrogen, $R^3$ is hydrogen, and $R^4$ is hydrogen.

15. The compound or salt of claim 7, wherein:
$R^1$ is methyl, $R^2$ is methyl, $R^3$ is hydrogen, and $R^4$ is hydrogen;
$R^1$ is methyl, $R^2$ is hydrogen, $R^3$ is hydrogen, and $R^4$ is hydrogen; or
$R^1$ is hydrogen, $R^2$ is hydrogen, $R^3$ is hydrogen, and $R^4$ is hydrogen.

16. The compound or salt of claim 7, wherein
m is 0 and n is 0;
m is 1 and n is 0;
m is 1 and n is 1;
m is 2 and n is 0; or
m is 2 and n is 1.

17. A pharmaceutical composition comprising a compound of claim 1, or a pharmaceutically acceptable salt thereof, and a pharmaceutically acceptable carrier or diluent.

18. A method of treating breast cancer in a patient comprising administering to the patient an amount of a compound of claim 1, or a pharmaceutically acceptable salt thereof, that is effective in treating breast cancer.

19. The method of claim 18, wherein the breast cancer is ER positive breast cancer.

* * * * *

SEQUENCE LISTING

```
<160> NUMBER OF SEQ ID NOS: 6

<210> SEQ ID NO 1
<211> LENGTH: 20
<212> TYPE: PRT
<213> ORGANISM: Homo sapiens

<400> SEQUENCE: 1

Ser Gly Arg Gly Lys Gly Gly Lys Gly Leu Gly Lys Gly Gly Ala Lys
1               5                   10                  15

Arg His Arg Lys
            20

<210> SEQ ID NO 2
<211> LENGTH: 20
<212> TYPE: PRT
<213> ORGANISM: Homo sapiens

<400> SEQUENCE: 2

Ala Arg Thr Lys Gln Thr Ala Arg Lys Ser Thr Gly Gly Lys Ala Pro
1               5                   10                  15

Arg Lys Gln Leu
            20

<210> SEQ ID NO 3
<211> LENGTH: 21
<212> TYPE: PRT
<213> ORGANISM: Homo sapiens

<400> SEQUENCE: 3

Ala Arg Thr Lys Gln Thr Ala Arg Lys Ser Thr Gly Gly Lys Ala Pro
```

-continued

```
                1               5                  10                  15
Arg Lys Gln Leu Ala
                20
```

<210> SEQ ID NO 4
<211> LENGTH: 480
<212> TYPE: PRT
<213> ORGANISM: Artificial Sequence
<220> FEATURE:
<223> OTHER INFORMATION: modified KAT5 protein

<400> SEQUENCE: 4

```
Met Gly His His His His His His Gly Thr Glu Asn Leu Tyr Phe Gln
1               5                  10                  15

Gly Ser Ala Glu Val Gly Glu Ile Ile Glu Gly Cys Arg Leu Pro Val
                20                  25                  30

Leu Arg Arg Asn Gln Asp Asn Glu Asp Glu Trp Pro Leu Ala Glu Ile
            35                  40                  45

Leu Ser Val Lys Asp Ile Ser Gly Arg Lys Leu Phe Tyr Val His Tyr
        50                  55                  60

Ile Asp Phe Asn Lys Arg Leu Asp Glu Trp Val Thr His Glu Arg Leu
65                  70                  75                  80

Asp Leu Lys Lys Ile Gln Phe Pro Lys Lys Glu Ala Lys Thr Pro Thr
                85                  90                  95

Lys Asn Gly Leu Pro Gly Ser Arg Pro Gly Ser Pro Glu Arg Glu Val
            100                 105                 110

Lys Arg Lys Val Glu Val Val Ser Pro Ala Thr Pro Val Pro Ser Glu
        115                 120                 125

Thr Ala Pro Ala Ser Val Phe Pro Gln Asn Gly Ala Ala Arg Arg Ala
130                 135                 140

Val Ala Ala Gln Pro Gly Arg Lys Arg Lys Ser Asn Cys Leu Gly Thr
145                 150                 155                 160

Asp Glu Asp Ser Gln Asp Ser Ser Asp Gly Ile Pro Ser Ala Pro Arg
                165                 170                 175

Met Thr Gly Ser Leu Val Ser Asp Arg Ser His Asp Asp Ile Val Thr
            180                 185                 190

Arg Met Lys Asn Ile Glu Cys Ile Glu Leu Gly Arg His Arg Leu Lys
        195                 200                 205

Pro Trp Tyr Phe Ser Pro Tyr Pro Gln Glu Leu Thr Thr Leu Pro Val
210                 215                 220

Leu Tyr Leu Cys Glu Phe Cys Leu Lys Tyr Gly Arg Ser Leu Lys Cys
225                 230                 235                 240

Leu Gln Arg His Leu Thr Lys Cys Asp Leu Arg His Pro Pro Gly Asn
                245                 250                 255

Glu Ile Tyr Arg Lys Gly Thr Ile Ser Phe Phe Glu Ile Asp Gly Arg
            260                 265                 270

Lys Asn Lys Ser Tyr Ser Gln Asn Leu Cys Leu Leu Ala Lys Cys Phe
        275                 280                 285

Leu Asp His Lys Thr Leu Tyr Tyr Asp Thr Asp Pro Phe Leu Phe Tyr
290                 295                 300

Val Met Thr Glu Tyr Asp Cys Lys Gly Phe His Ile Val Gly Tyr Phe
305                 310                 315                 320

Ser Lys Glu Lys Glu Ser Thr Glu Asp Tyr Asn Val Ala Cys Ile Leu
                325                 330                 335

Thr Leu Pro Pro Tyr Gln Arg Arg Gly Tyr Gly Lys Leu Leu Ile Glu
```

```
                    340                 345                 350
Phe Ser Tyr Glu Leu Ser Lys Val Glu Gly Lys Thr Gly Thr Pro Glu
            355                 360                 365

Lys Pro Leu Ser Asp Leu Gly Leu Leu Ser Tyr Arg Ser Tyr Trp Ser
        370                 375                 380

Gln Thr Ile Leu Glu Ile Leu Met Gly Leu Lys Ser Glu Ser Gly Glu
385                 390                 395                 400

Arg Pro Gln Ile Thr Ile Asn Glu Ile Ser Glu Ile Thr Ser Ile Lys
                405                 410                 415

Lys Glu Asp Val Ile Ser Thr Leu Gln Tyr Leu Asn Leu Ile Asn Tyr
            420                 425                 430

Tyr Lys Gly Gln Tyr Ile Leu Thr Leu Ser Glu Asp Ile Val Asp Gly
        435                 440                 445

His Glu Arg Ala Met Leu Lys Arg Leu Leu Arg Ile Asp Ser Lys Cys
    450                 455                 460

Leu His Phe Thr Pro Lys Asp Trp Ser Lys Arg Gly Lys Trp Ala Ser
465                 470                 475                 480

<210> SEQ ID NO 5
<211> LENGTH: 791
<212> TYPE: PRT
<213> ORGANISM: Artificial Sequence
<220> FEATURE:
<223> OTHER INFORMATION: modified KAT6A protein

<400> SEQUENCE: 5

Met Asn Lys Glu Ile Leu Ala Val Val Glu Ala Val Ser Asn Glu Lys
1               5                   10                  15

Ala Leu Pro Arg Glu Lys Ile Phe Glu Ala Leu Glu Ser Ala Leu Ala
            20                  25                  30

Thr Ala Thr Lys Lys Lys Tyr Glu Gln Glu Ile Asp Val Arg Val Gln
        35                  40                  45

Ile Asp Arg Lys Ser Gly Asp Phe Asp Thr Phe Arg Arg Trp Leu Val
    50                  55                  60

Val Asp Glu Val Thr Gln Pro Thr Lys Glu Ile Thr Leu Glu Ala Ala
65                  70                  75                  80

Arg Tyr Glu Asp Glu Ser Leu Asn Leu Gly Asp Tyr Val Glu Asp Gln
                85                  90                  95

Ile Glu Ser Val Thr Phe Asp Arg Ile Thr Thr Gln Thr Ala Lys Gln
            100                 105                 110

Val Ile Val Gln Lys Val Arg Glu Ala Glu Arg Ala Met Val Val Asp
        115                 120                 125

Gln Phe Arg Glu His Glu Gly Glu Ile Ile Thr Gly Val Val Lys Lys
    130                 135                 140

Val Asn Arg Asp Asn Ile Ser Leu Asp Leu Gly Asn Asn Ala Glu Ala
145                 150                 155                 160

Val Ile Leu Arg Glu Asp Met Leu Pro Arg Glu Asn Phe Arg Pro Gly
                165                 170                 175

Asp Arg Val Arg Gly Val Leu Tyr Ser Val Arg Pro Glu Ala Arg Gly
            180                 185                 190

Ala Gln Leu Phe Val Thr Arg Ser Lys Pro Glu Met Leu Ile Glu Leu
        195                 200                 205

Phe Arg Ile Glu Val Pro Glu Ile Gly Glu Glu Val Ile Glu Ile Lys
    210                 215                 220

Ala Ala Ala Arg Asp Pro Gly Ser Arg Ala Lys Ile Ala Val Lys Thr
```

-continued

```
             225                 230                 235                 240
Asn Asp Lys Arg Ile Asp Pro Val Gly Ala Cys Val Gly Met Arg Gly
                 245                 250                 255
Ala Arg Val Gln Ala Val Ser Thr Glu Leu Gly Gly Glu Arg Ile Asp
                 260                 265                 270
Ile Val Leu Trp Asp Asp Asn Pro Ala Gln Phe Val Ile Asn Ala Met
                 275                 280                 285
Ala Pro Ala Asp Val Ala Ser Ile Val Val Asp Glu Asp Lys His Thr
                 290                 295                 300
Met Asp Ile Ala Val Glu Ala Gly Asn Leu Ala Gln Ala Ile Gly Arg
305                 310                 315                 320
Asn Gly Gln Asn Val Arg Leu Ala Ser Gln Leu Ser Gly Trp Glu Leu
                 325                 330                 335
Asn Val Met Thr Val Asp Asp Leu Gln Ala Lys His Gln Ala Glu Ala
                 340                 345                 350
His Ala Ala Ile Asp Thr Phe Thr Lys Tyr Leu Asp Ile Asp Glu Asp
                 355                 360                 365
Phe Ala Thr Val Leu Val Glu Glu Gly Phe Ser Thr Leu Glu Glu Leu
                 370                 375                 380
Ala Tyr Val Pro Met Lys Glu Leu Leu Glu Ile Glu Gly Leu Asp Glu
385                 390                 395                 400
Pro Thr Val Glu Ala Leu Arg Glu Arg Ala Lys Asn Ala Leu Ala Thr
                 405                 410                 415
Ile Ala Gln Ala Gln Glu Glu Ser Leu Gly Asp Asn Lys Pro Ala Asp
                 420                 425                 430
Asp Leu Leu Asn Leu Glu Gly Val Asp Arg Asp Leu Ala Phe Lys Leu
                 435                 440                 445
Ala Ala Arg Gly Val Cys Thr Leu Glu Asp Leu Ala Glu Gln Gly Ile
                 450                 455                 460
Asp Asp Leu Ala Asp Ile Glu Gly Leu Thr Asp Glu Lys Ala Gly Ala
465                 470                 475                 480
Leu Ile Met Ala Ala Arg Asn Ile Cys Trp Phe Gly Asp Glu Ala Thr
                 485                 490                 495
Ser Gly Ser Gly His His His His His Ser Ala Gly Glu Asn Leu
                 500                 505                 510
Tyr Phe Gln Gly Ala Met Gly Arg Cys Pro Ser Val Ile Glu Phe Gly
                 515                 520                 525
Lys Tyr Glu Ile His Thr Trp Tyr Ser Ser Pro Tyr Pro Gln Glu Tyr
                 530                 535                 540
Ser Arg Leu Pro Lys Leu Tyr Leu Cys Glu Phe Cys Leu Lys Tyr Met
545                 550                 555                 560
Lys Ser Arg Thr Ile Leu Gln Gln His Met Lys Lys Cys Gly Trp Phe
                 565                 570                 575
His Pro Pro Val Asn Glu Ile Tyr Arg Lys Asn Asn Ile Ser Val Phe
                 580                 585                 590
Glu Val Asp Gly Asn Val Ser Thr Ile Tyr Cys Gln Asn Leu Cys Leu
                 595                 600                 605
Leu Ala Lys Leu Phe Leu Asp His Lys Thr Leu Tyr Tyr Asp Val Glu
                 610                 615                 620
Pro Phe Leu Phe Tyr Val Leu Thr Gln Asn Asp Val Lys Gly Cys His
625                 630                 635                 640
Leu Val Gly Tyr Phe Ser Lys Glu Lys His Cys Gln Gln Lys Tyr Asn
                 645                 650                 655
```

```
Val Ser Cys Ile Met Ile Leu Pro Gln Tyr Gln Arg Lys Gly Tyr Gly
            660                 665                 670

Arg Phe Leu Ile Asp Phe Ser Tyr Leu Leu Ser Lys Arg Glu Gly Gln
            675                 680                 685

Ala Gly Ser Pro Glu Lys Pro Leu Ser Asp Leu Gly Arg Leu Ser Tyr
            690                 695                 700

Met Ala Tyr Trp Lys Ser Val Ile Leu Glu Cys Leu Tyr His Gln Asn
705                 710                 715                 720

Asp Lys Gln Ile Ser Ile Lys Lys Leu Ser Lys Leu Thr Gly Ile Cys
                725                 730                 735

Pro Gln Asp Ile Thr Ser Thr Leu His His Leu Arg Met Leu Asp Phe
            740                 745                 750

Arg Ser Asp Gln Phe Val Ile Ile Arg Arg Glu Lys Leu Ile Gln Asp
            755                 760                 765

His Met Ala Lys Leu Gln Leu Asn Leu Arg Pro Val Asp Val Asp Pro
            770                 775                 780

Glu Cys Leu Arg Trp Thr Pro
785                 790

<210> SEQ ID NO 6
<211> LENGTH: 307
<212> TYPE: PRT
<213> ORGANISM: Artificial Sequence
<220> FEATURE:
<223> OTHER INFORMATION: modified KAT7 protein

<400> SEQUENCE: 6

Met Gly His His His His His Gly Thr Glu Asn Leu Tyr Phe Gln
1               5                   10                  15

Gly Ser Arg Leu Gln Gly Gln Ile Thr Glu Gly Ser Asn Met Ile Lys
            20                  25                  30

Thr Ile Ala Phe Gly Arg Tyr Glu Leu Asp Thr Trp Tyr His Ser Pro
        35                  40                  45

Tyr Pro Glu Glu Tyr Ala Arg Leu Gly Arg Leu Tyr Met Cys Glu Phe
    50                  55                  60

Cys Leu Lys Tyr Met Lys Ser Gln Thr Ile Leu Arg Arg His Met Ala
65                  70                  75                  80

Lys Cys Val Trp Lys His Pro Pro Gly Asp Glu Ile Tyr Arg Lys Gly
                85                  90                  95

Ser Ile Ser Val Phe Glu Val Asp Gly Lys Lys Asn Lys Ile Tyr Cys
            100                 105                 110

Gln Asn Leu Cys Leu Leu Ala Lys Leu Phe Leu Asp His Lys Thr Leu
        115                 120                 125

Tyr Tyr Asp Val Glu Pro Phe Leu Phe Tyr Val Met Thr Glu Ala Asp
    130                 135                 140

Asn Thr Gly Cys His Leu Ile Gly Tyr Phe Ser Lys Glu Lys Asn Ser
145                 150                 155                 160

Phe Leu Asn Tyr Asn Val Ser Cys Ile Leu Thr Met Pro Gln Tyr Met
                165                 170                 175

Arg Gln Gly Tyr Gly Lys Met Leu Ile Asp Phe Ser Tyr Leu Leu Ser
            180                 185                 190

Lys Val Glu Glu Lys Val Gly Ser Pro Glu Arg Pro Leu Ser Asp Leu
        195                 200                 205

Gly Leu Ile Ser Tyr Arg Ser Tyr Trp Lys Glu Val Leu Leu Arg Tyr
    210                 215                 220
```

```
Leu His Asn Phe Gln Gly Lys Glu Ile Ser Ile Lys Glu Ile Ser Gln
225                 230                 235                 240

Glu Thr Ala Val Asn Pro Val Asp Ile Val Ser Thr Leu Gln Ala Leu
                    245                 250                 255

Gln Met Leu Lys Tyr Trp Lys Gly Lys His Leu Val Leu Lys Arg Gln
                260                 265                 270

Asp Leu Ile Asp Glu Trp Ile Ala Lys Glu Ala Lys Arg Ser Asn Ser
                275                 280                 285

Asn Lys Thr Met Asp Pro Ser Cys Leu Lys Trp Thr Pro Pro Lys Gly
    290                 295                 300

Thr Ala Ser
305
```